United States Patent
Jasmin et al.

(10) Patent No.: US 11,552,591 B2
(45) Date of Patent: *Jan. 10, 2023

(54) SOLAR PANEL RACKING SYSTEM AND DEVICES FOR THE SAME

(71) Applicant: Sunmodo Corporation, Vancouver, WA (US)

(72) Inventors: Roland Jasmin, Portland, OR (US); Jun Liu, Camas, WA (US); Steve Mumma, Oregon City, OR (US); Boutros Abou Chacra, San Francisco, CA (US)

(73) Assignee: Sunmodo Corporation, Vancouver, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/451,794

(22) Filed: Oct. 21, 2021

(65) Prior Publication Data

US 2022/0368276 A1 Nov. 17, 2022

Related U.S. Application Data

(63) Continuation of application No. 17/302,885, filed on May 14, 2021, now Pat. No. 11,296,648.

(51) Int. Cl.
*H02S 30/10* (2014.01)
*F16B 2/12* (2006.01)
(Continued)

(52) U.S. Cl.
CPC ............... *H02S 30/10* (2014.12); *F16B 2/06* (2013.01); *F16B 2/12* (2013.01); *F16B 2/02* (2013.01)

(58) Field of Classification Search
CPC .. H02S 30/10; H02S 20/23; F16B 2/06; F16B 2/12; F16B 2/02; F24S 25/65
(Continued)

(56) References Cited

U.S. PATENT DOCUMENTS

| 5,203,135 A | 4/1993 | Bastian |
| 6,588,713 B2 | 7/2003 | Kilkenny |

(Continued)

FOREIGN PATENT DOCUMENTS

| AU | 2009101276 A4 | 1/2010 |
| AU | 2013270609 A1 | 7/2014 |

(Continued)

OTHER PUBLICATIONS

Mounting equipment, rails, roll bars for solar panels, Yacht Services Preveza—George Bekas, Jul. 4, 2018, downloaded from the Internet from http://prevezasolarpanel.blogspot.com/2018/05/mounting-equipment-rails-roll-bars-for.html on Aug. 11, 2020.

(Continued)

*Primary Examiner* — Todd M Epps
(74) *Attorney, Agent, or Firm* — Stone Creek Services LLC; Alan M Flum

(57) ABSTRACT

A solar panel racking system that can include end clamps, mid clamps, bottom clamps, L-foot adapter assemblies, rails, and L-foot assemblies. The solar panel racking system minimizes the use of tools by snapping many of the mounting components in place. The end clamps, mid clamps, and bottom clamps can snap over the rail sides and lock into upper detented portions of the rail sides. The upper detented portions are structured to prevent upward movement of the end clamps, mid clamps, and bottom clamps. The L-foot adapter body of the L-foot adapter assembly snaps over lower detented portions of rail sides and secures the rail to an L-foot assembly. The end clamps, mid clamps, bottom clamps, rails, and L-foot adapter assemblies are independent of the L-foot assembly, allowing a selection of L-foot assemblies to be used as appropriate with the solar panel racking system.

17 Claims, 70 Drawing Sheets

(51) Int. Cl.
*F16B 2/06* (2006.01)
*F16B 2/02* (2006.01)

(58) Field of Classification Search
USPC .......................................................... 136/243
See application file for complete search history.

(56) References Cited

U.S. PATENT DOCUMENTS

| | | | |
|---|---|---|---|
| 8,695,290 | B1 | 4/2014 | Kim et al. |
| 9,057,542 | B2 | 6/2015 | Schuit et al. |
| 9,097,443 | B2 | 8/2015 | Liu et al. |
| 9,160,273 | B2 | 10/2015 | Schuit et al. |
| 9,876,463 | B2 * | 1/2018 | Jasmin .................. F24S 25/636 |
| 9,893,677 | B1 | 2/2018 | Liu |
| 10,097,133 | B2 | 10/2018 | Aliabadi et al. |
| 10,128,790 | B2 | 11/2018 | Ash |
| 10,151,114 | B2 | 12/2018 | Stearns et al. |
| 10,177,704 | B2 | 1/2019 | Kapla et al. |
| D853,954 | S | 7/2019 | McPheeters |
| 10,749,459 | B1 * | 8/2020 | Liu ........................ F16B 5/0685 |
| 10,797,634 | B1 * | 10/2020 | Jasmin .................... H02S 30/00 |
| 11,152,889 | B1 | 10/2021 | Affentranger, Jr. et al. |
| 11,296,648 | B1 * | 4/2022 | Jasmin ...................... F16B 2/06 |
| 2005/0045785 | A1 | 3/2005 | Cohen |
| 2006/0156651 | A1 | 7/2006 | Genschorek |
| 2009/0166494 | A1 | 7/2009 | Bartelt-Muszynski et al. |
| 2010/0276558 | A1 | 11/2010 | Faust et al. |
| 2013/0011187 | A1 | 1/2013 | Schuit et al. |
| 2014/0001129 | A1 | 1/2014 | Danning |
| 2015/0078806 | A1 | 3/2015 | Schrock |
| 2015/0270027 | A1 | 9/2015 | Schrock |
| 2016/0226434 | A1 | 8/2016 | Tomlinson |
| 2019/0036474 | A1 | 1/2019 | Schuit et al. |
| 2019/0178274 | A1 | 6/2019 | Katz |
| 2019/0222169 | A1 | 7/2019 | Yang et al. |
| 2021/0285596 | A1 | 9/2021 | Affentranger, Jr. et al. |
| 2021/0285689 | A1 | 9/2021 | Affentranger, Jr. |
| 2022/0221195 | A1 | 7/2022 | Affentranger, Jr. et al. |

FOREIGN PATENT DOCUMENTS

| | | |
|---|---|---|
| CN | 202025772 U | 11/2011 |
| CN | 202049989 U | 11/2011 |
| CN | 102709355 A | 10/2012 |
| CN | 205566178 U | 9/2016 |
| CN | 106452325 A | 2/2017 |
| CN | 206251017 U | 6/2017 |
| CN | 107248841 A | 10/2017 |
| CN | 206575356 U | 10/2017 |
| CN | 206575358 U | 10/2017 |
| CN | 209949044 U | 1/2020 |
| DE | 102012007535 A1 | 10/2013 |
| EP | 2592365 A2 | 5/2013 |
| EP | 2604949 A1 | 6/2013 |
| EP | 2698828 A1 | 2/2014 |
| EP | 3364124 A1 | 8/2018 |
| FR | 2950375 A1 | 3/2011 |
| JP | 2011237030 A | 11/2011 |
| KR | 20110058294 A | 6/2011 |
| KR | 101611358 B1 | 4/2016 |
| WO | 2014059760 A1 | 4/2014 |
| WO | 2021061866 A1 | 4/2021 |

OTHER PUBLICATIONS

Series 100 Roof Mount System, SnapNrack Residential PV Mounting Systems Code Compliant Installation, Oct. 2012, SnapNrack, San Luis Obispo, California (a subsidiary of Sunrun Inc.).
QRail System QClick Technology Rail Mounting System Installation Manual, Jan. 2020, Quick Mount PV, Walnut Creek, California.
EcoFasten The Rail-less Mounting System Rockit, Jul. 8, 2020, EcoFasten Solar LLC, Phoenix, Arizona (a division of Rillito River Solar, LLC).
SnapNrack Solar Mounting Solutions Ultra Rail Residential PV Mounting Systems Installation Manual, Jan. 2019, SnapNrack, San Luis Obispo, California (a subsidiary of Sunrun Inc.).
SnapNRack Ultra Rail Comp Kit Drawing Set, Revision B, Feb. 2019, SnapNrack, San Luis Obispo, California (a subsidiary of Sunrun Inc.).
SnapNRack UR-60 Splice Drawing Set May 2019, SnapNrack, San Luis Obispo, California (a subsidiary of Sunrun Inc.).
SnapNRack Ultra Rail Tile Hook F Drawing Set, Jan. 2019, SnapNrack, San Luis Obispo, California (a subsidiary of Sunrun Inc.).
SnapNRack Ultra Rail Mounting Hardware Drawing Set, Revision A, Jan. 2018, SnapNrack, San Luis Obispo, California (a subsidiary of Sunrun Inc.).
SnapNRack Ultra Rail Variable Tilt Hardware Kit Drawing Set, Revision A, Aug. 2019, SnapNrack, San Luis Obispo, California (a subsidiary of Sunrun Inc.).
SnapNRack UR-40 Rail Drawing Set, Oct. 2019, SnapNrack, San Luis Obispo, California (a subsidiary of Sunrun Inc.).
Big Sale Mounting Solar Pv / Solar Module / Panel Surya—Rail Splice, Tokopedia, Downloaded from the Internet from https://www.tokopedia.com/otikjeyagra/big-sale-mounting-solar-pv-solar-module-panel-surya-rail-splice on Aug. 12, 2020.
Wholesale solar panel mid clamp aluminum solar panel mid clamps for bracket pv mounting, Xiamen Megan Solar Co., Ltd. (MG Solar), Xiamen City, China, Downloaded from the Internet from https://www.alibaba.com/product-detail/Wholesale-solar-panel-mid-clamp-aluminum_62490677590.html?spm=a2700.icbuShop.87968.5.5071 on Aug. 15, 2020.
Yeti Clamp Technical Sheet US03, Jul. 2020, K2 Systems LLC, Vista, California.
Yeti Clamp Product Sheet, Jan. 2021, K2 Systems LLC, Vista, California.
Solar's Fastest Attachment NanoMount, Feb. 2020, Sunmodo Corp., Vancouver, Washington.
ClickFit: Complete Rail-Based Racking System for a variety of roof types, web page snapshot from Mar. 18, 2021 Internet Archive, EcoFasten Solar LLC, Phoenix, Arizona, downloaded from the Internet from https://web.archive.org/web/20210318140918/https://ecofastensolar.com/system/clickfit/ on Nov. 21, 2021.
EcoFasten ClickFit Installation Guide, V. 2.3, Dec. 9, 2020, EcoFasten Solar LLC, Phoenix, Arizona.
Magerack Technical Data Sheet End Clamps, Aug. 2017, Magerack Corporation, Fremont, California.
S:Flex Mounting Systems for Trapezoidal Sheet and Corrugated Sheet Roofs, Jan. 2019, S:Flex GmbH, Hamburg, Germany.
S:Flex End Clamp AK II Klick 30-50 a Technical Data Sheet, Nov. 2017, S:Flex GmbH, Hamburg, Germany.

* cited by examiner

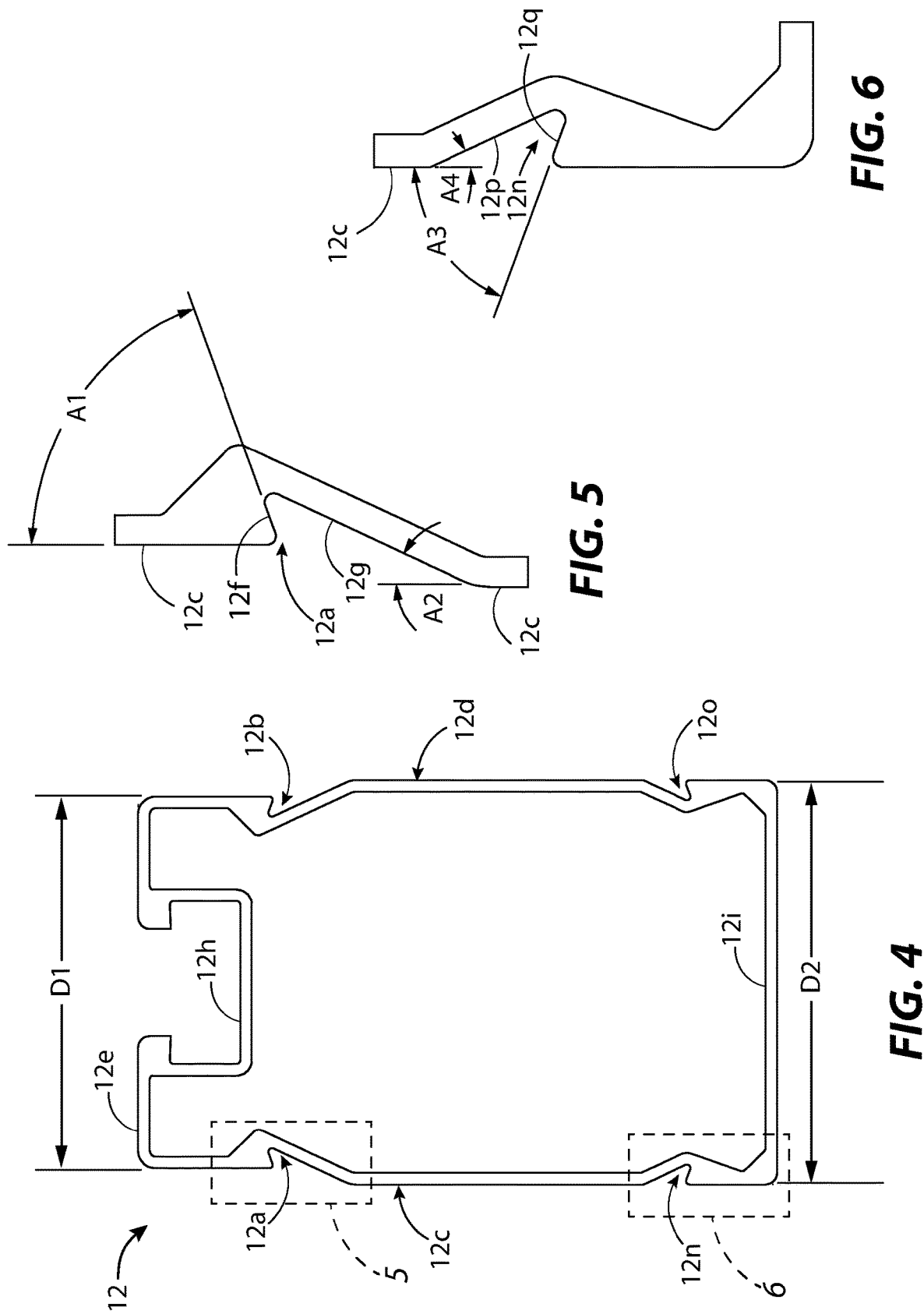

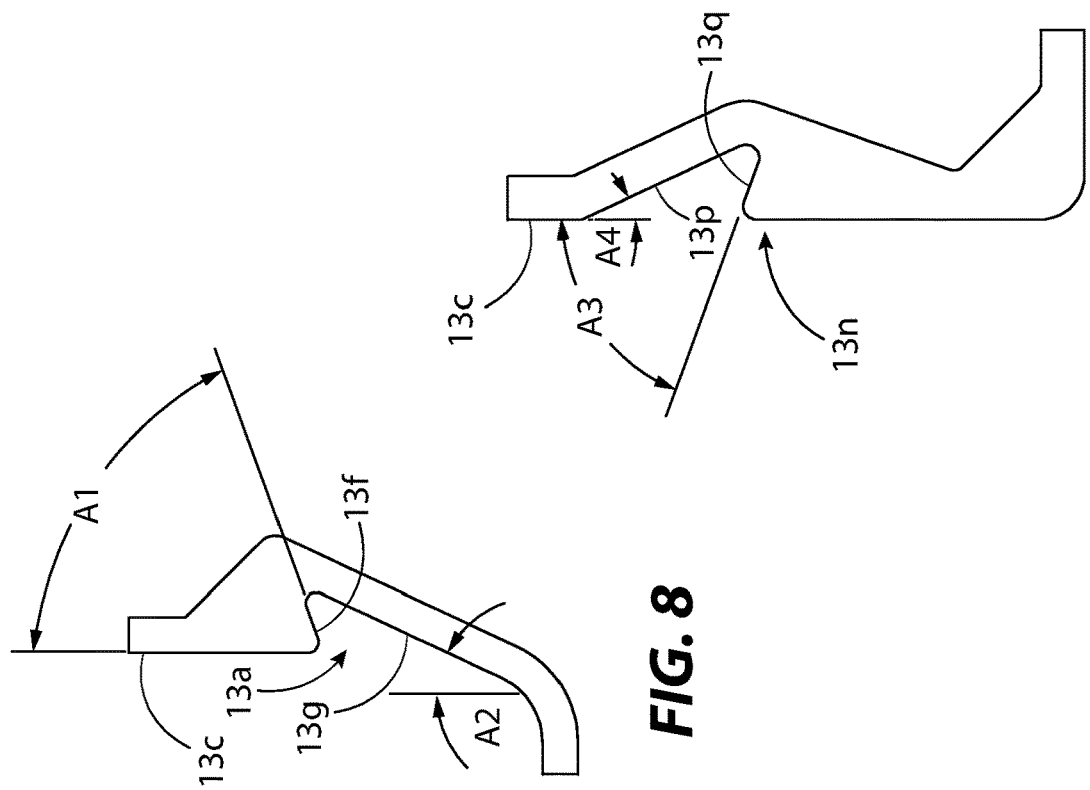
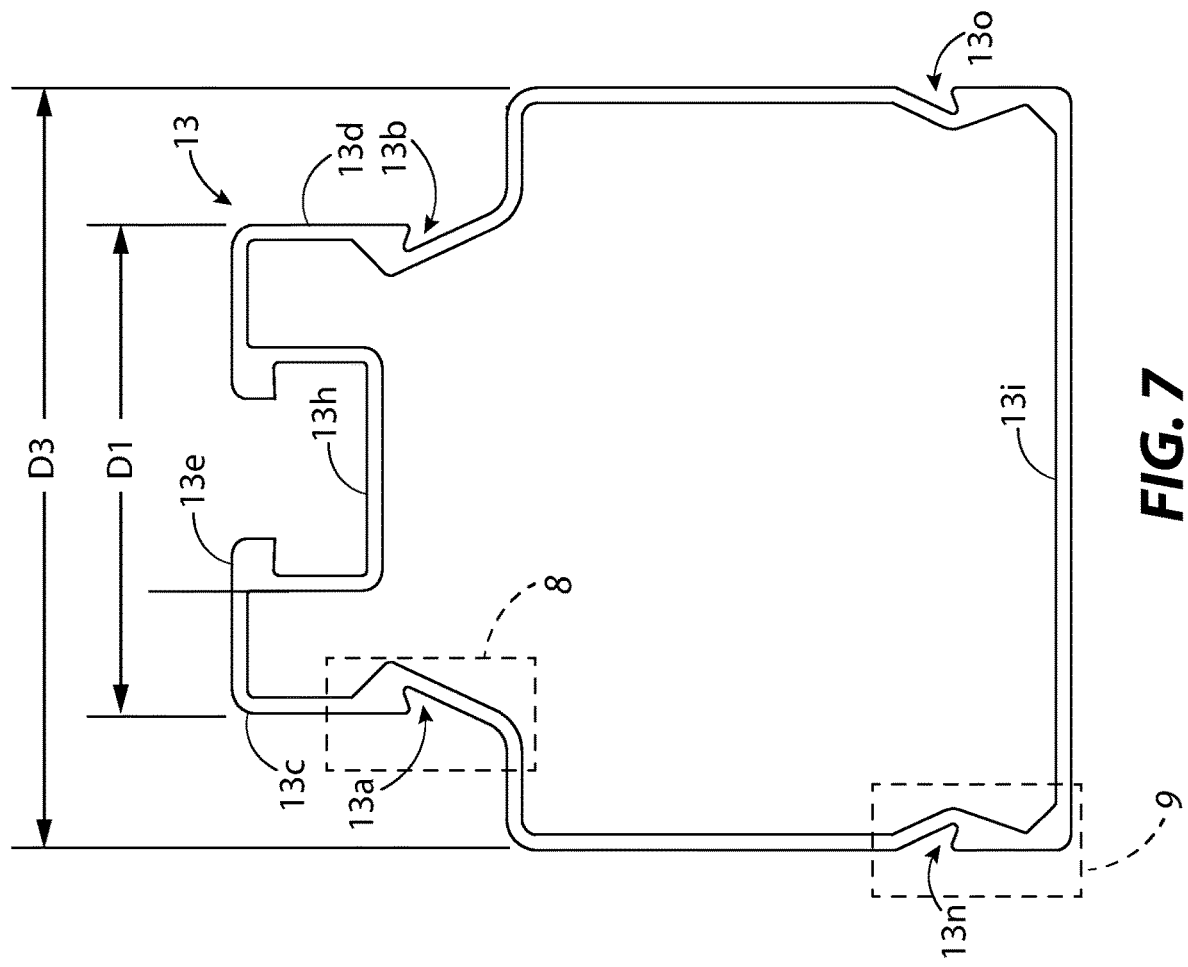

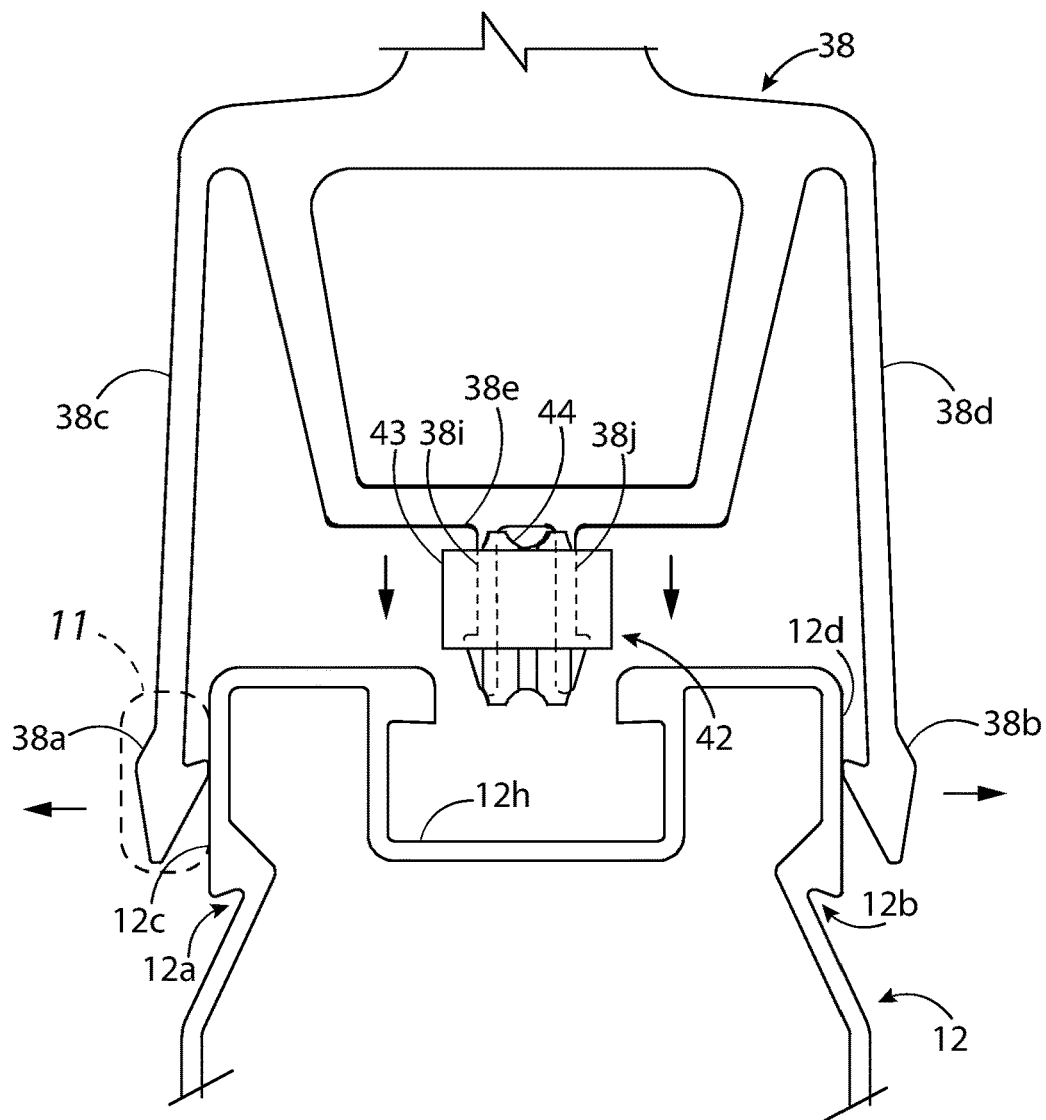

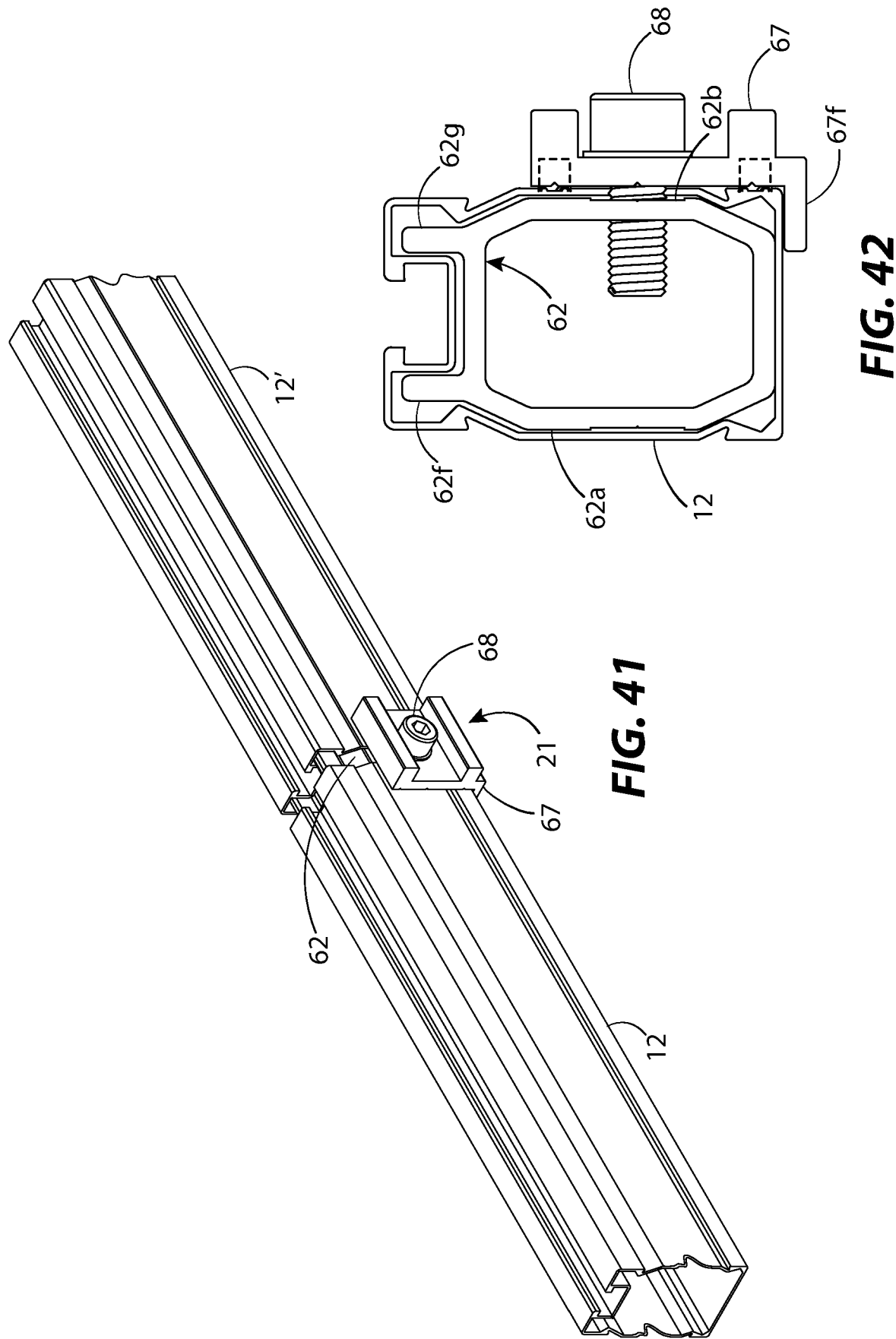

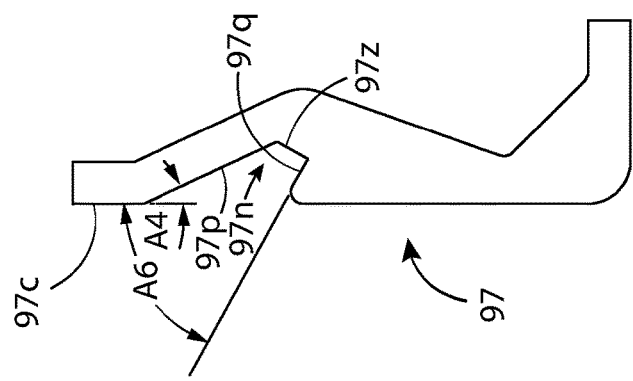
FIG. 86
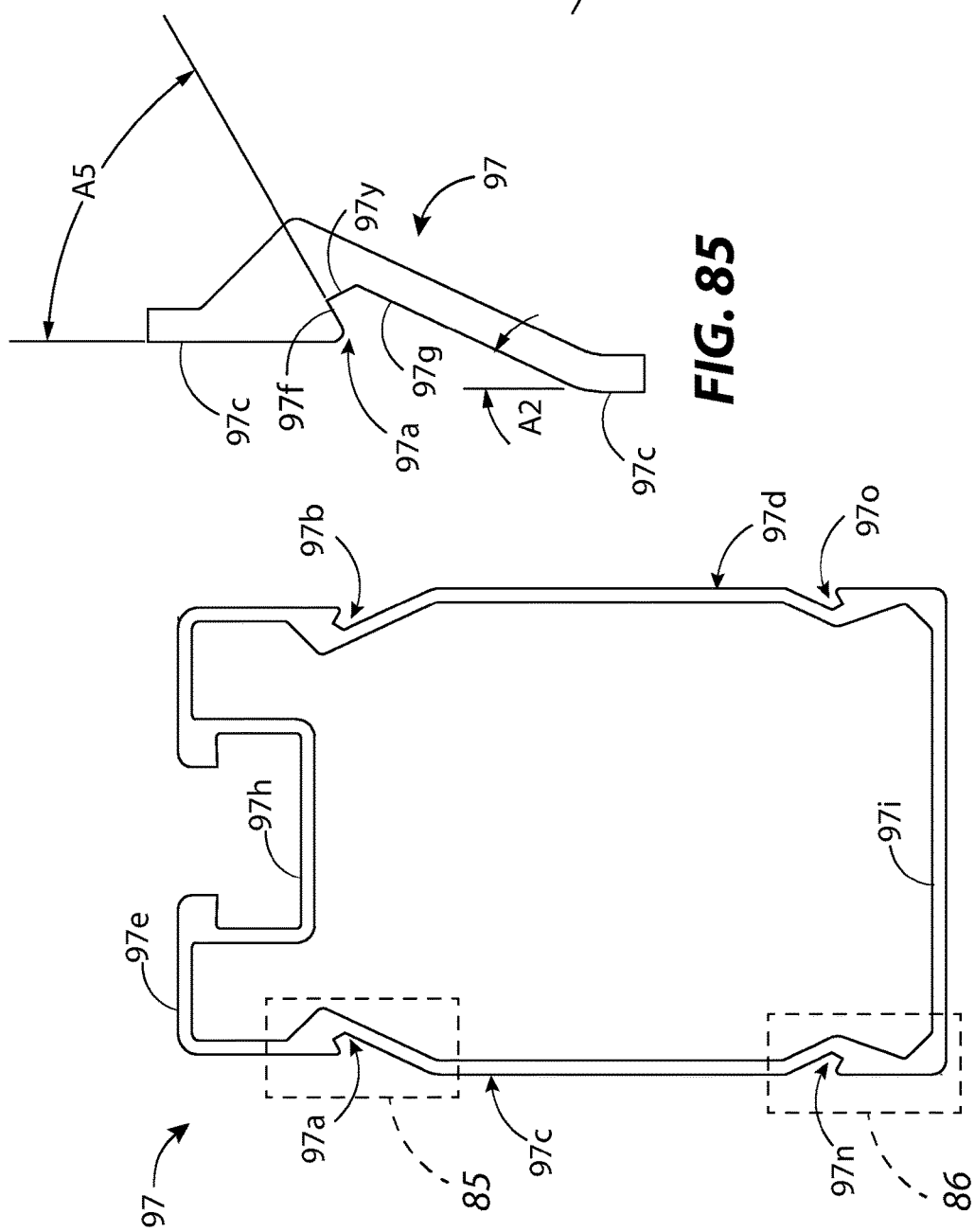
FIG. 85
FIG. 84

SOLAR PANEL RACKING SYSTEM AND DEVICES FOR THE SAME

CROSS REFERENCE TO RELATED APPLICATIONS

This application is a continuation of U.S. patent application Ser. No. 17/302,885, filed on May 14, 2021. The entire contents of U.S. patent application Ser. No. are hereby incorporated by reference.

BACKGROUND

The present disclosure relates to solar panel racking systems, also known as solar panel mountings systems, as well as devices, apparatus, and methods relating to solar panel racking systems.

Solar photovoltaic (PV) systems are used in commercial, residential, and utility-scale environments. For example, solar PV panel installations can be found on various types of residential and commercial roofs, shade structures such as awnings and carports, as well as building facades. In addition, solar panels can be installed on self-supporting ground-mounted structures, typically in commercial and utility-scale environments.

Solar PV systems are placed and secured within various residential, commercial, and utility-scale environments by solar panel racking systems. There are many costs associated with solar PV systems. These include solar panels, solar panel racking systems, electrical components, permitting, installation labor, and logistics costs.

SUMMARY

The solar panel racking system and associated devices developed by the inventors, and described hereafter by way of various examples, utilize components that can be snapped together and/or slid together. The inventors' solar panel racking system and associated devices can reduce the number of threaded fasteners used in a typical solar PV system installation, which potentially reduces labor costs. The solar panel racking system can include a common subset of components that can be used in a variety of installation environments. By using a common subset of components, inventory and material planning are simplified, which can reduce logistics costs.

The inventors developed a solar panel racking system and devices related to solar panel racking systems that can include solar panel clamps that snap over the sides of the rail. The rail can include a pair of upper detented portions that extend lengthwise along the rail and are positioned in an upper region of the rail (i.e., upper half of the rail as measured heightwise). Each upper detented portion of the pair of upper detented portions includes an upper first sloped surface sloping inward and upward from its corresponding rail side and an upper second sloped surface sloping downward and outward from below the upper first sloped surface. The panel clamps, which are secured to the upper detented portions on the outside-facing surfaces of the rails, include clamping portions with sloped surfaces that are shaped to engage the upper first sloped surface and the upper second sloped surface. This combination prevents upward movement of the panel clamps once they are snapped into place and tightens the clamp to the rail as more upward pressure is added.

The rail can also include a pair of lower detented portions that extend lengthwise along the rail and are positioned on a lower region of the rail (i.e. lower half of the rail as measured heightwise). Each lower detented portion of the pair of lower detented portions includes a lower first sloped surface sloping inward and downward from the rail side and a lower second sloped surface sloping upward and outward from below the lower first sloped surface. An L-foot adapter body of an L-foot adapter assembly is similarly structured with clamping portions that engage the lower sloped surfaces of the rail. The lower sloped surfaces of the rail in combination with the clamping portions of the L-foot adapter body prevent upward movement of the rail once the rail is snapped into the L-foot adapter body.

The L-foot adapter assembly can be secured to an L-foot assembly. The L-foot assembly can be secured to a mounting structure; for example, a mounting structure for a shingled roof, metal roof, tile roof, commercial flat roof, shade structure, or ground-mounted structure. The L-foot adapter body can be a one-piece structure and can have the L-foot adapter side that engages the L-foot of the L-foot assembly thinner and more flexible than the than the opposing other L-foot adapter side. As the rail is snapped into the L-foot adapter body, the L-foot adapter side that faces the L-foot will flex outward while the opposite and thicker and more rigid L-foot adapter side will remain stationary allowing the rail to be snapped into the L-foot adapter. The thinner and more flexible side that faces the L-foot will become stabilized and more rigid when it is tightened against the L-foot. This can allow the L-foot adapter assembly to be adjusted with respect to the L-foot assembly independent of whether or not the rail is secured to the L-foot adapter body.

The solar panel racking system and associated devices can also include a rail splice that can join adjacent rails together. The rail splice can include a rail splice body, bonding pins, a splice bracket with blind holes for receiving the bonding pins, and a threaded fastener for attaching the splice bracket to the rail splice body. The rails can include a hollow interior because it does not require internal support structures like other rails. The hollow interior of the rails allows the splice body slide inside the adjacent rails. The splice bracket and bonding pins slide over the outside surface of the adjacent rails. The splice bracket is tightened and secures the rails to the splice body. The bonding pins penetrate the oxide layer or paint layer of the rails and electrically bond the rails to one another. The splice bracket can include a foot that projects inward toward the splice body from the bottom of the splice bracket. The foot is positioned to engage the bottom of the rail and stabilize the splice bracket as it is tightened to the rail.

The solar panel racking system and associated devices developed by the inventors can have the following advantages. First, panel clamps, rails, and L-foot adapter assemblies can be secured to one another without any tools, saving assembly time and labor costs. Second, the solar panel racking system can be used with a variety of L-foot assembly types or alternatively be used without an L-foot assembly. The Description section of this disclosure will show examples of the solar panel racking system attached to several types of L-foot assemblies. Third, the panel racking system can have a common set of parts (i.e., panel clamps, rails, rail splices, and L-foot adapter assemblies) that are adaptable to different mounting structures and roof types. Fourth, the panel clamps can be adjusted to different solar panel heights independent of securement to the rail because the height adjustment mechanism is independent of the rail securement mechanism. Fifth, height adjustment of the L-foot adapter assembly with respect to the L-foot assembly and securement of the L-foot adapter assembly to the rail are independent. This allows for either pre-adjustment of the L-foot adapter assembly height or preassembly of the L-foot adapter assembly to the rail. Sixth, the rail splice can form a structural element between the rails. In addition, the splice bracket and bonding pins do not require any holes to be drilled in the rail so they can be adjusted and fitted on the job site.

The solar panel racking system can include over-the-panel clamps and under-the-panel clamps. For the purpose of this disclosure, over-the-panel clamps positionable at the edges of a solar PV panel system or array will be referred to as "end clamps." For the purpose of this disclosure, over-the-panel clamps that are positionable between two solar panels will be referred to as "mid clamps." For the purpose of this disclosure, under-the-panel clamps will be referred to as "bottom clamps." The over-the-panel clamps can optionally include a bonding block with bonding pins. The bonding block can snap into the mid-body of the over-the-panel clamp and reside in an optional slot that is detented lengthwise along the top of the rail.

This Summary introduces a selection of concepts in simplified form that are described in more detail in the Description. Some features included in the Summary may be optional. It is the inventors' intent not to limit the scope of the claims by inclusion or exclusion of features or examples in the Summary.

BRIEF DESCRIPTION OF THE DRAWINGS

FIG. 4 illustrates, in side view, a rail of the present disclosure.

FIG. 5 illustrates, in side view, an enlarged view an upper detented portion located on the left side of FIG. 4.

FIG. 6 illustrates, in side view, an enlarged view of a lower detented portion located on the left side of FIG. 4.

FIG. 7 illustrates, in side view, an alternative version of a rail that could be used in place of the rail of FIG. 4.

FIG. 8 illustrates, in side view, an enlarged view an upper detented portion located on the left side of FIG. 7.

FIG. 9 illustrates, in side view, an enlarged view of a lower detented portion located on the left side of FIG. 7.

FIG. 10 illustrates, in side view, a portion of a clamp body engaging the upper portion of the rail of FIG. 4 before the clamping portions of the clamp body engage the upper detented portions of the rail.

FIG. 11 illustrates, in side view, an enlarged view of the clamping portion of the clamp body of FIG. 10.

FIG. 41 illustrates in isometric view, the rails and rail splice assembly of FIG. 39 with both of the rails secured to the rail splice assembly.

FIG. 42 illustrates, in side view, the rails and rail splice assembly of FIG. 41.

FIG. 84 illustrates, in side view, an alternative rail of the present disclosure.

FIG. 85 illustrates an enlarged view an upper detented portion located on the left side of FIG. 84.

FIG. 86 illustrates an enlarged view of a lower detented portion located on the left side of FIG. 84.

DESCRIPTION

When describing the figures, the terms "top," "bottom," "front," "rear," and "side," are from the perspective of a person standing in front of a solar PV system. Specific dimensions are intended to help the reader understand the scale and advantage of the disclosed material. Dimensions given are typical and the claims are not limited to the recited dimensions. Ordinals such as "first," "second," or "third," are used in this Description and in the Claims to differentiate between similarly-named parts and do not imply a particular order, preference, or importance. For the purpose of this disclosure, multiple instances of equivalent parts are often differentiated by a "prime" symbol for clarity when discussing the parts. "Optional" or "optionally" is used throughout this disclosure to describe features or structures that are optional. Not using the word "optional" or "optionally" to describe a feature or structure does not imply that the feature or structure is not optional. Finally, the word "or" is used in the ordinary sense to mean an "inclusive or," unless preceded by a qualifier, such as the word "either," that signals an "exclusive or."

As discussed in the summary, the inventors developed a solar panel racking system and associated devices with advantages over previous such systems and devices. Examples utilizing principals of the inventors' solar panel racking system and associated devices are described in this Description. These examples utilize components that can be snapped together or slide together. This reduces the number of threaded fasteners used in a typical solar PV panel system installation, thereby reducing labor costs. Utilizing a common set of components across many installation environments and implementations can reduce logistics costs.

Figure 21:
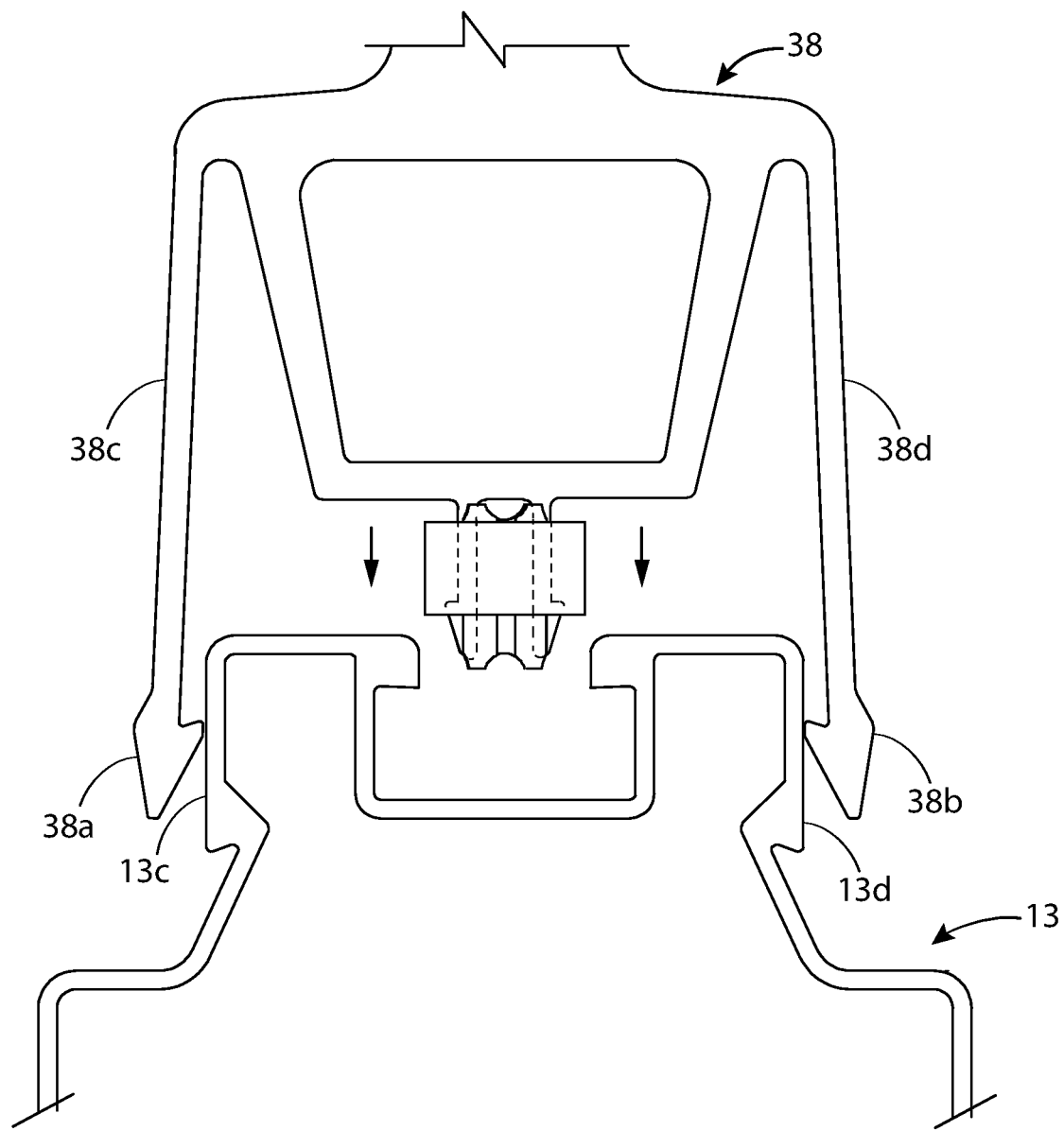
FIG. 21 illustrates, in side view, a portion of the clamp body of FIG. 10 engaging the upper portion of the rail of FIG. 7.
Figure 22:
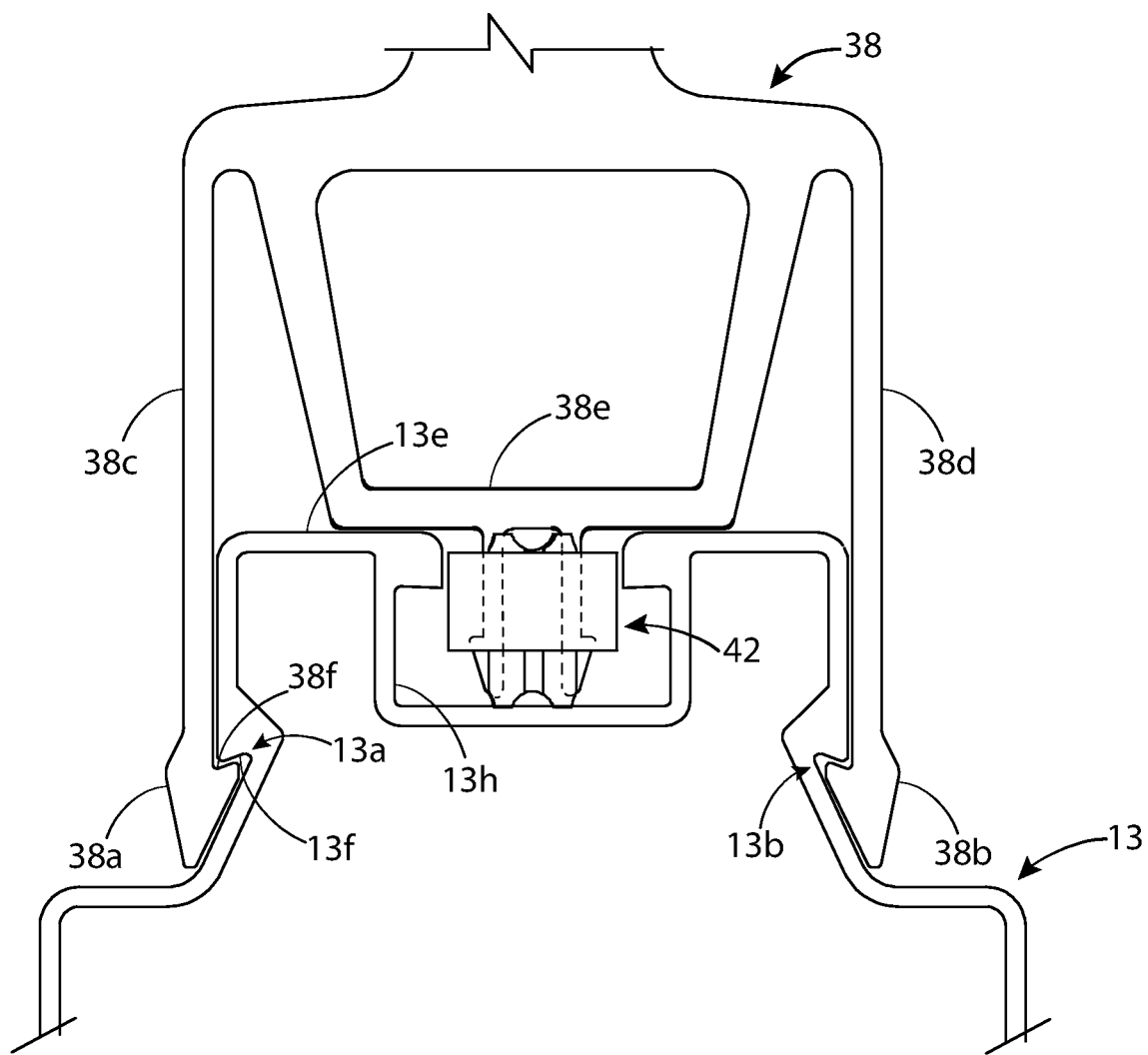
FIG. 22 illustrates, in side view, the portion of the clamp body portion and rail of FIG. 21 with the clamp body and rail engaged and secured together.

FIGS. 4-42 discuss examples a common set of components that includes rails, L-foot adapters, and rail splices. Three examples of rails are illustrated: rail 12 of FIG. 4, rail 13 of FIG. 7, and rail 97 of FIG. 84. Although rail 13 is wider than rail 12, the upper portion of the rails is structured to accept a common set of panel clamps. FIGS. 10, 12-14, 17, 18, and 20 illustrate how various panel clamps can attach and secure to rail 12. These same panel clamps can also attach and secure to rail 13. FIGS. 21 and 22, illustrate an example of a panel clamp securing to rail 13. Two examples of L-foot adapter assemblies are discussed in FIGS. 23-34 with L-foot adapter assembly 18 shown in FIG. 23 and L-foot adapter assembly 17 shown in FIG. 26. Two examples of rail splice assemblies are discussed in FIGS. 35-42: rail splice assembly 21 in FIG. 35 for use with rail 12 of FIG. 4 and rail splice assembly 22 in FIG. 36 for use with rail 13 of FIG. 7.

Figure 1:
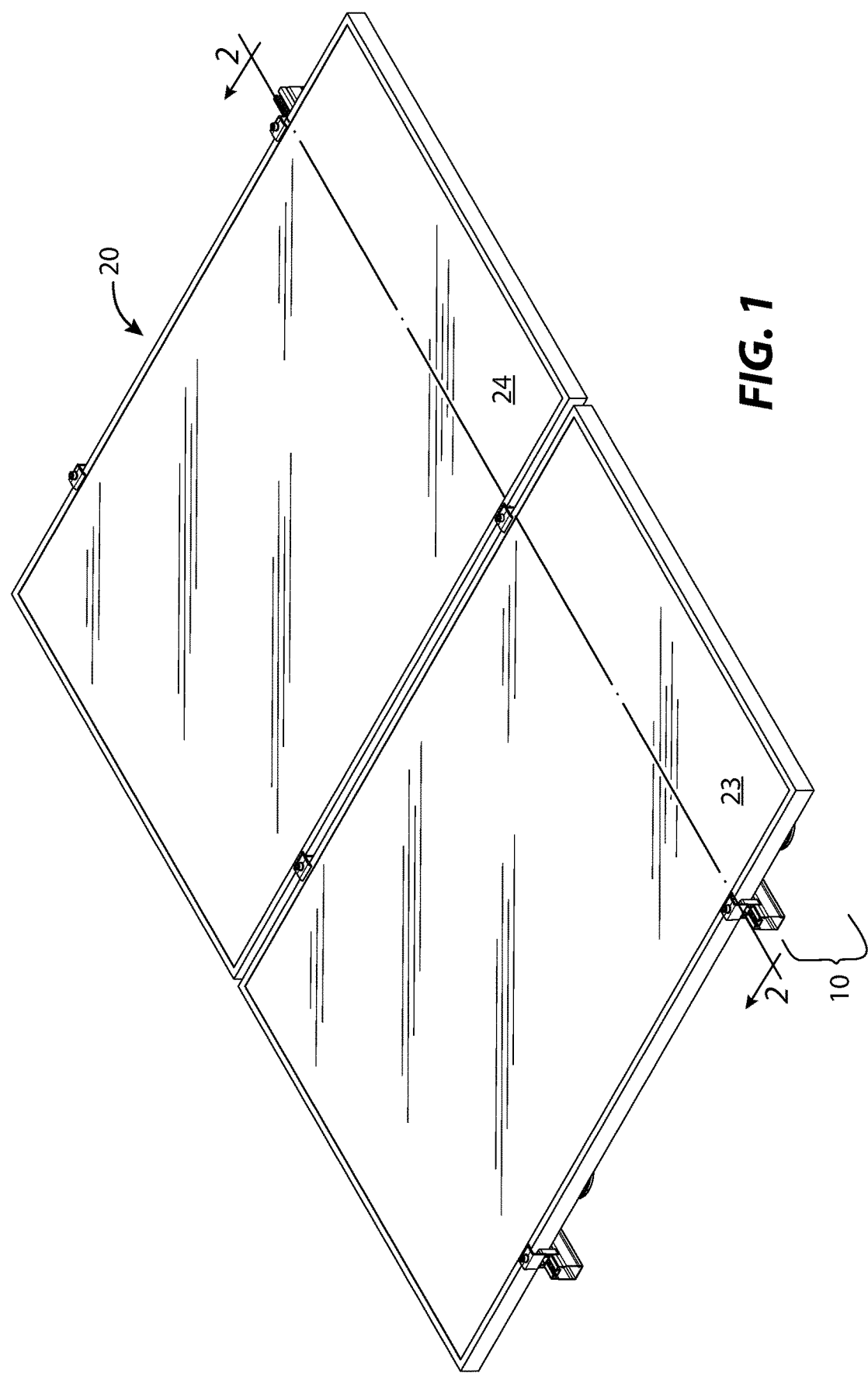
FIG. 1 illustrates in isometric view, a solar PV system with solar panels and a solar panel racking system with the solar panels arranged in portrait mode.
Figure 2:
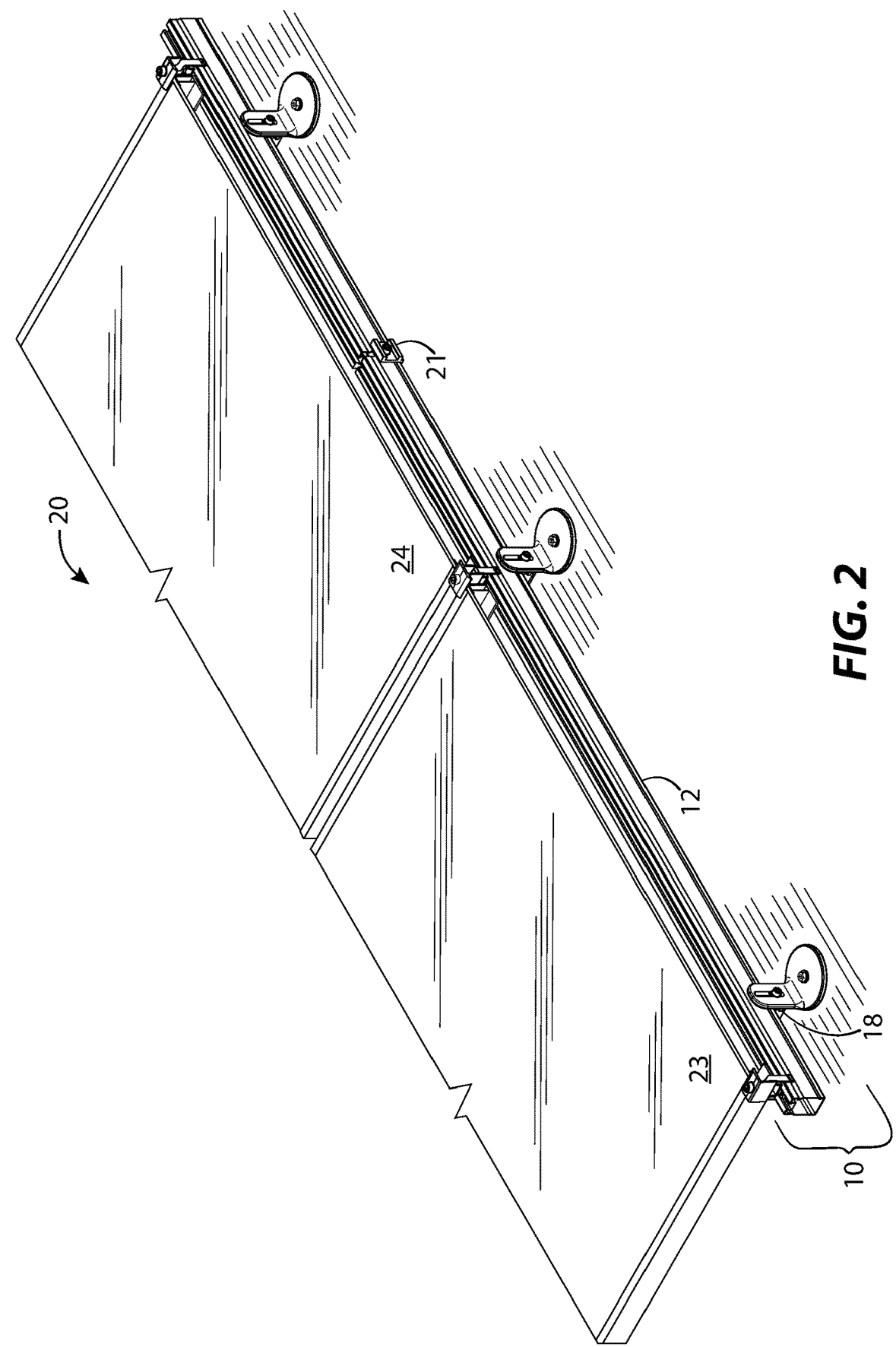
FIG. 2 illustrates in isometric view, an enlarged portion of the solar PV system of FIG. 1 with a frontward portion of the solar panel cutaway along section lines 2-2 in FIG. 1 to reveal end clamps, a mid clamp, a rail, a rail splice, L-foot adapter assemblies, and L-foot assemblies.
Figure 3:
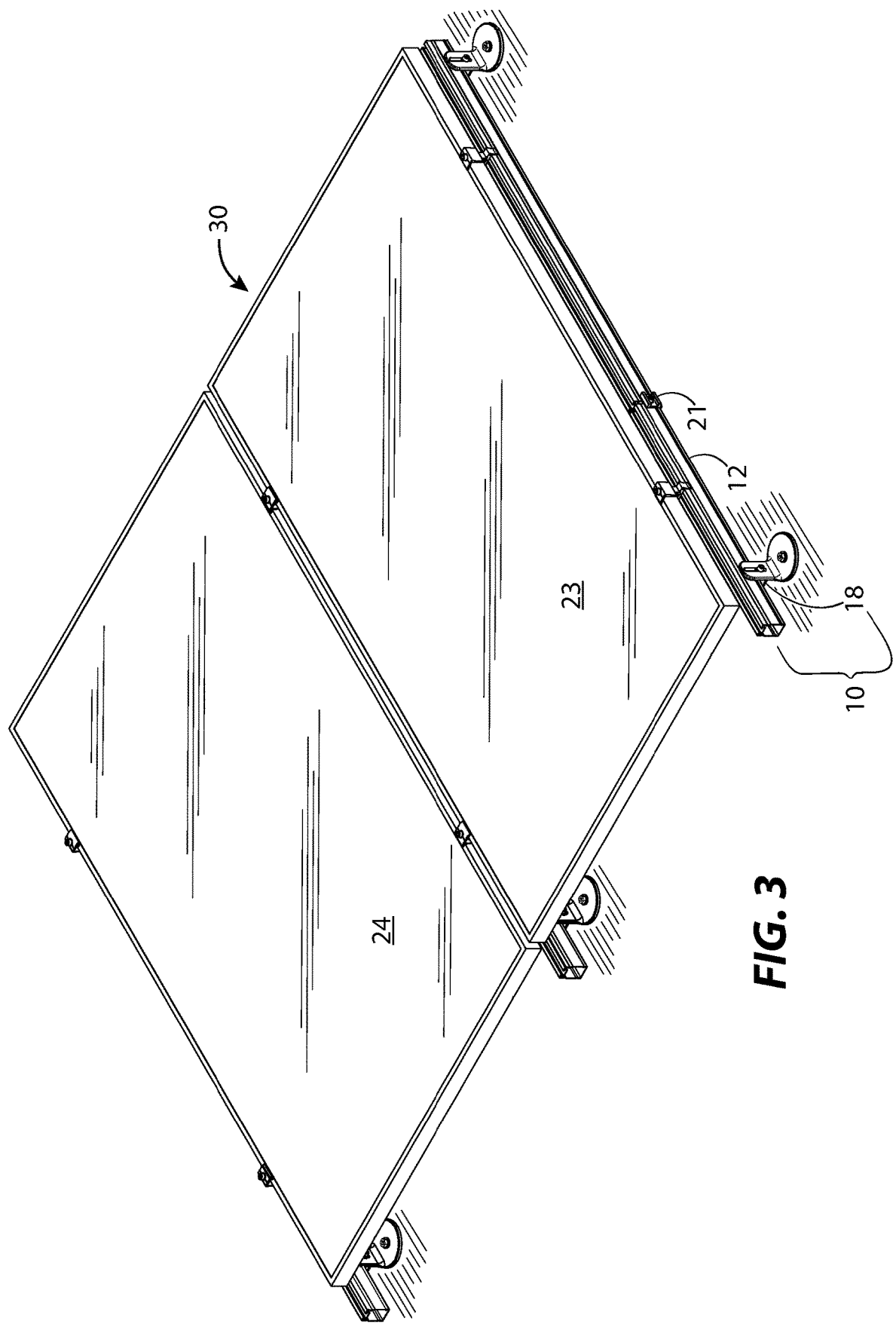
FIG. 3 illustrates, in isometric view, a solar PV system with solar panels and a solar panel racking system with the solar panels arranged in landscape mode and utilizing the rail, rail splice, L-foot adapter assemblies, and L-foot assemblies of FIG. 2.

One of the advantages of the solar panel racking system and devices of the present disclosure is that solar panels can be mounted in portrait mode and landscape mode using the common set of components introduced above. "Portrait mode" refers to orienting the solar panels so that the widthwise sides of the solar panels are parallel to the ground. "Landscape mode" refers to orienting solar panels so that their lengthwise sides are parallel to the ground. FIGS. 1 and 2 illustrate solar panel racking system 10 utilized in solar PV panel system 20 with solar panel 23 and solar panel 24 mounted in portrait mode. FIG. 2 shows a portion of solar panel racking system 10 with a common set of components (i.e. rail 12, L-foot adapter assembly 18, and rail splice assembly 21). FIG. 3 illustrates solar panel racking system 10 used in solar PV panel system 30 with solar panel 23 and solar panel 24 mounted in landscape mode. Solar panel racking system 10 in FIG. 3 also utilizes the same common set of components (i.e. rail 12, L-foot adapter assembly 18, and rail splice assembly 21).

Figure 59:
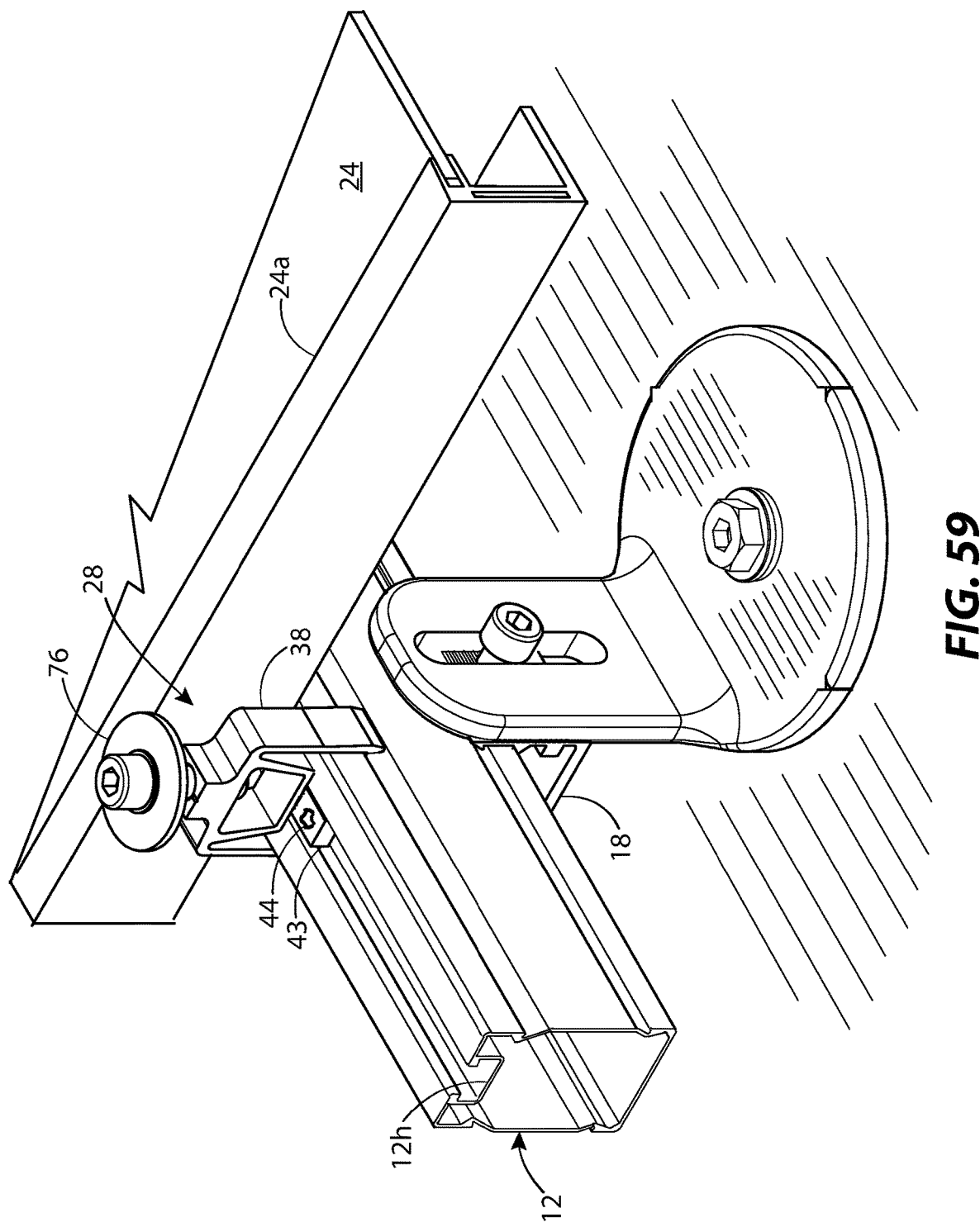
FIG. 59 illustrates, in top isometric view, a portion of FIG. 57 with one of the solar panels removed to show the relationship between the mid clamp, the bonding block, and rail slot.
Figure 60:
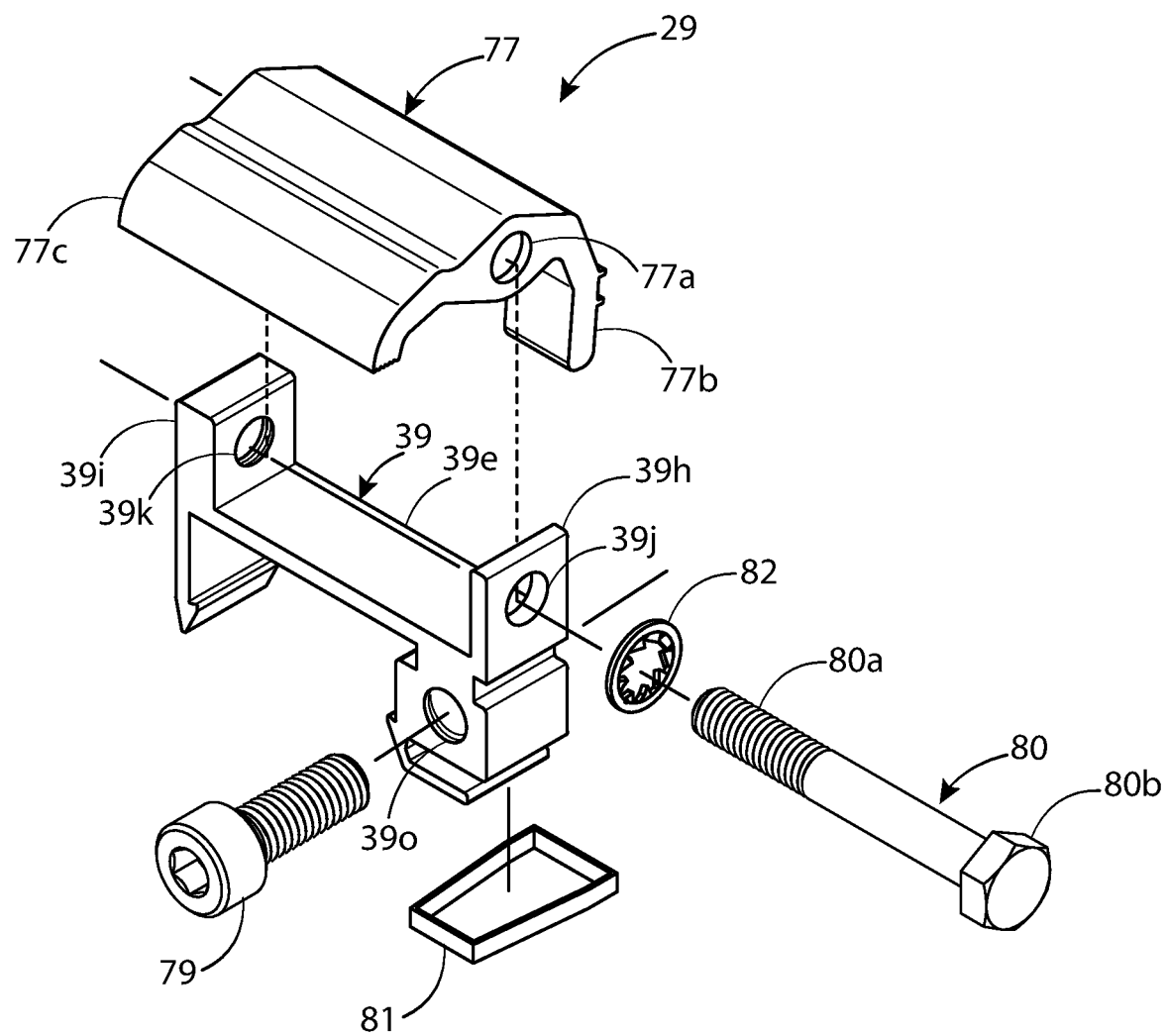
FIG. 60 illustrates, in exploded and isometric view, a bottom clamp of the present disclosure.

Solar panel racking system 10 of FIGS. 1-3 also includes panel clamps, several examples of which are illustrated in FIGS. 43-70. FIGS. 43-64 illustrate panel clamps that can be used when solar panels are to be mounted in portrait mode. Examples of portrait-mode end clamps include end clamp 25 in FIG. 43 and end clamp 26 in FIG. 44. Examples of portrait-mode mid clamps include mid clamp 27 of FIG. 45 and mid clamp 28 of FIG. 46. An example of a portrait-mode bottom clamp is illustrated in FIG. 60 as bottom clamp 29. FIGS. 65-70 illustrate panel clamps that can be used to mount solar panels in landscape mode with end clamp 31 illustrated in FIG. 65 and mid clamp 32 illustrated in FIG. 66.

Figure 82:
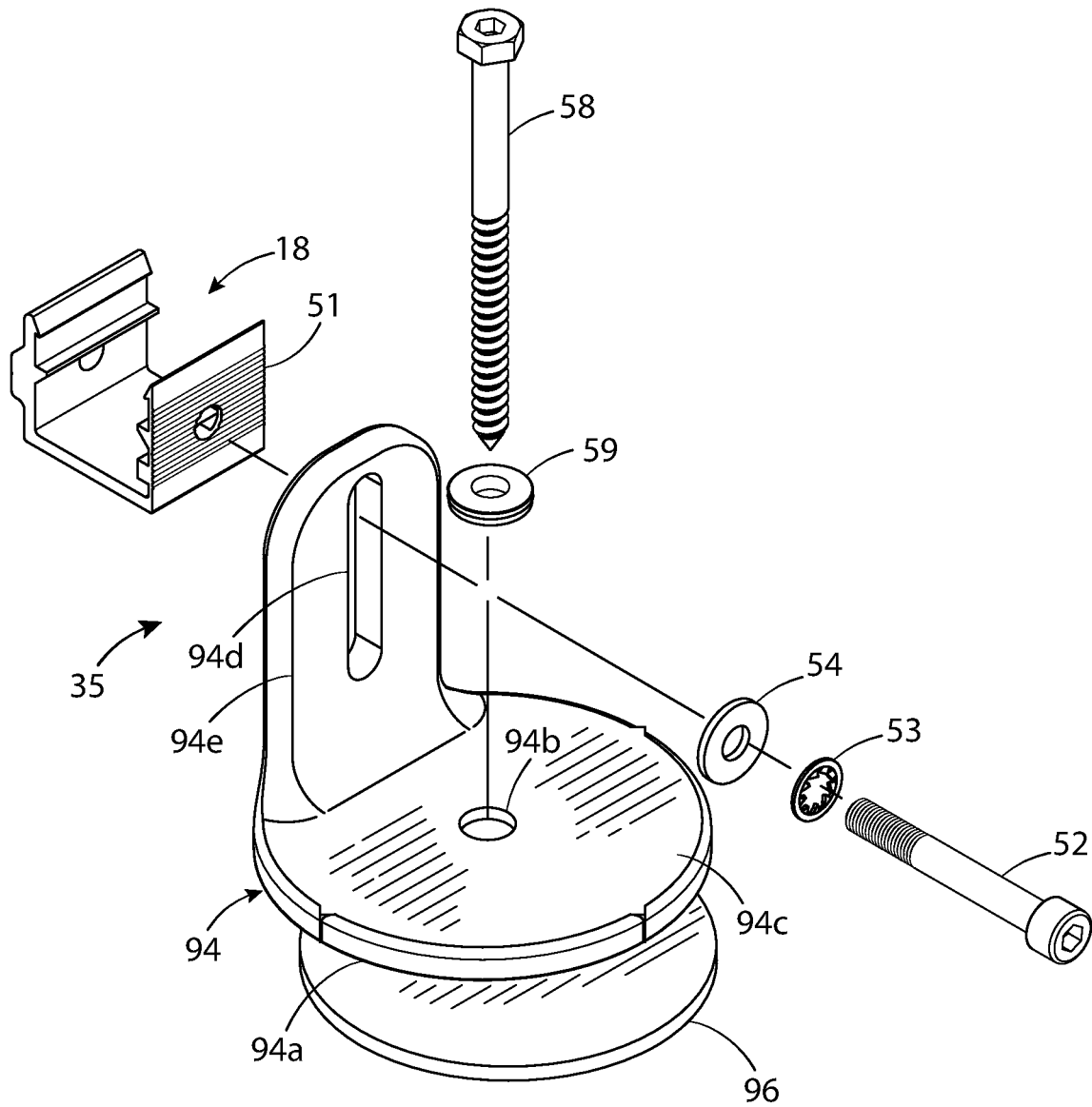
FIG. 82 illustrates, in exploded and isometric view, the L-foot assembly and L-foot adapter assembly used in FIGS. 1-3, 17, 27-29, 51-55, 57-59, 61-64, 69, and 70.
Figure 83:
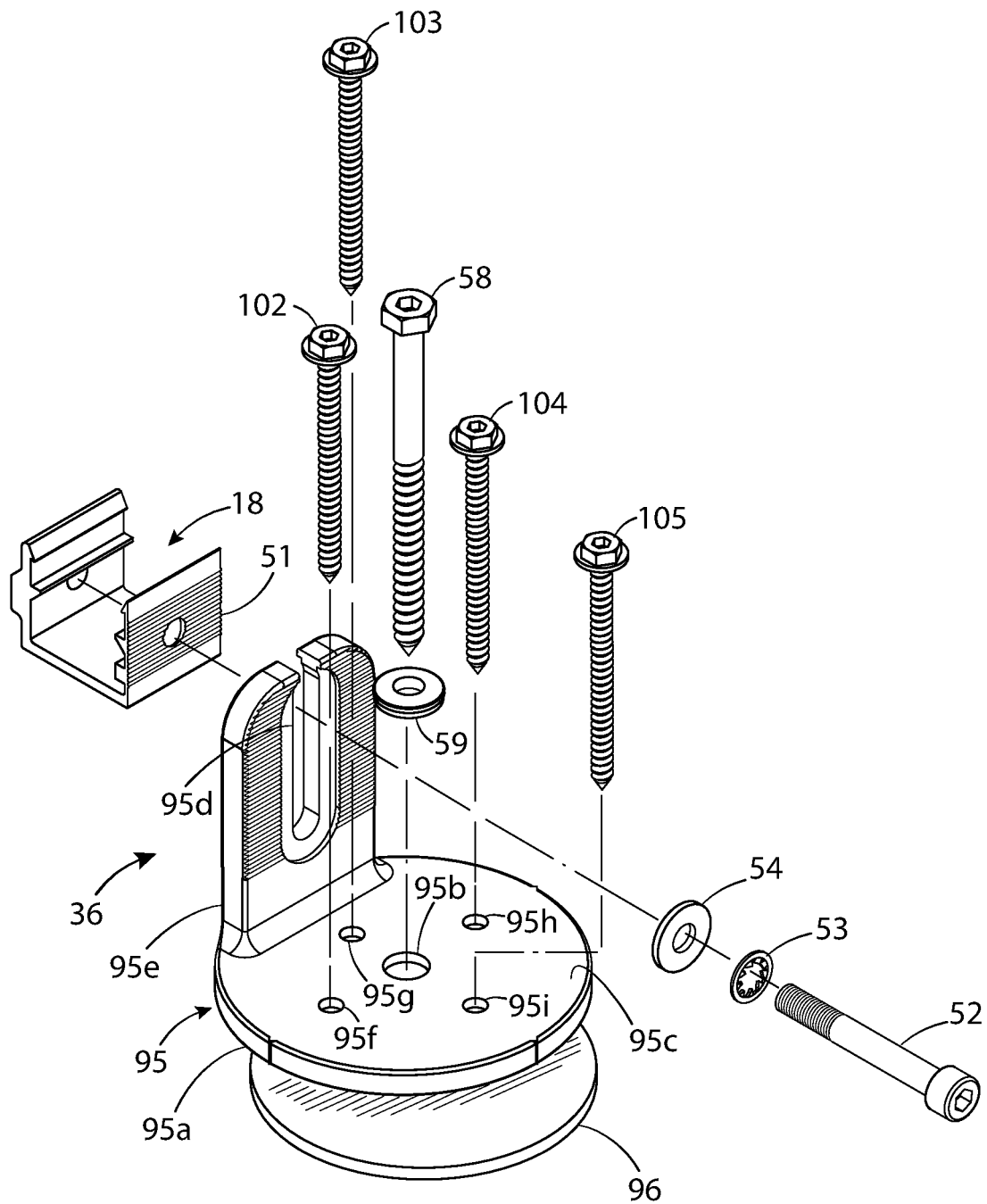
FIG. 83 illustrates, in exploded and isometric view, the L-foot assembly and L-foot adapter assembly with the L-foot assembly being similar to FIG. 82 but with an alternative hole pattern.

Another advantage of the solar panel racking system and devices of the present disclosure is that rails, L-foot adapters, rail splices, and panel clamps can be attached to a variety of L-foot assemblies. FIGS. 71-83 illustrates four examples of L-foot assemblies. L-foot assembly 33 is illustrated in FIGS. 71-75, L-foot assembly 34 is illustrated in FIGS. 76-81, L-foot assembly 35 is illustrated in FIG. 82, and L-foot assembly 36 is illustrated in FIG. 83. The system can optionally be mounted without an L-foot assembly. FIGS. 31-34 illustrate the solar panel racking system 10 mounted with the L-foot adapter assembly 17 mounted directly to a metal roof 37.

The rails, panel clamps, and L-foot adapters are structured so that they can be snapped or slid together without the use of tools. With rails often reaching over 4 meters (13.1 ft.), snapping together these components has an advantage over sliding. This is especially true for mid clamp and L-foot adapters, as these components can be located anywhere along the length of the rail.

Referring to FIG. 4, rail 12 includes a pair of upper detented portions, upper detented portion 12a and upper detented portion 12b located on rail side 12c and rail side 12d, respectively, on the upper region of the rail (i.e., upper half of the rail as measured heightwise). The pair of rail sides, rail side 12c and rail side 12d, form opposing outside-facing surfaces of rail 12. The pair of rail sides (i.e., rail side 12c and rail side 12d) extends downward from opposing sides of rail top 12e. FIG. 5 illustrates upper detented portion 12a in more detail. Upper detented portion 12a includes upper first sloped surface 12f and upper second sloped surface 12g. Upper first sloped surface 12f projects upward and inward at an angle A1 with respect to its corresponding rail side, rail side 12c. Upper second sloped surface 12g projects downward and outward with respect to upper first sloped surface 12f. Upper second sloped surface 12g makes an angle A2 with respect to rail side 12c. Angle A1 and A2 are illustrated as acute (i.e., less than 90°). Upper first sloped surface 12f is shown positioned above upper second sloped surface 12g. Upper first sloped surface 12f and upper second sloped surface 12g are positioned between two portions of their corresponding rail side, rail side 12c. The angular structure of upper first sloped surface 12f and upper second sloped surface 12g and arrangement with respect to rail side 12c described above resists upward movement and slippage of the clamping portions of the panel clamps once the clamping portions are snapped or slid into the detents.

The same principle of operation can apply to rails of other widths. For example, FIG. 7 illustrates rail 13 that has a wider body width than rail 12 of FIG. 4. Rail 12 of FIG. 4 has a body width of width D2 between rail side 12c and rail side 12d located below lower detented portion 12n and lower detented portion 12o. Rail 13 of FIG. 7 has a body width of width D3 between rail side 13c and rail side 13d located below lower detented portion 13n and lower detented portion 13o. Rail 12 and Rail 13 both can share the same upper body widths of width D1 (i.e., the width between rail sides where they engage their respective upper detented portions). This allows both rails to engage a common set of panel clamps as the panel clamps engage the upper detented portions.

Referring to FIG. 7, rail 13 includes a pair of upper detented portions, upper detented portion 13a and upper detented portion 13b, located on the upper region of rail side 13c and rail side 13d, respectively and on the upper region of rail (i.e., upper half of the rail as measured heightwise). The pair of rail sides, rail side 13c and rail side 13d, form opposing outside-facing surfaces of the rail. The upper region of the pair of rail sides (i.e., rail side 13c and rail side 13d) extends downward from opposing sides of rail top 13e.

FIG. 8 illustrates upper detented portion 13a in more detail. Upper detented portion 13a includes upper first sloped surface 13f and upper second sloped surface 13g. Upper first sloped surface 13f projects upward and inward at an angle A1 with respect to its corresponding rail side, rail side 13c. Upper second sloped surface 13g projects downward and outward with respect to upper first sloped surface 13f. Upper second sloped surface 13g makes an angle A2 with respect to its corresponding rail side, rail side 13c. Angle A1 and A2 is illustrated as acute (i.e., less than 90°). Upper first sloped surface 13f being positioned above upper second sloped surface 13g and both upper first sloped surface 13f and upper second sloped surface 13g are positioned between two portions of rail side 13c. The angular structure of upper first sloped surface 13f and upper second sloped surface 13g and arrangement with respect their corresponding rail side, rail side 13c, described above resists upward movement of the panel clamps once snapped or slid into place.

Figure 12:
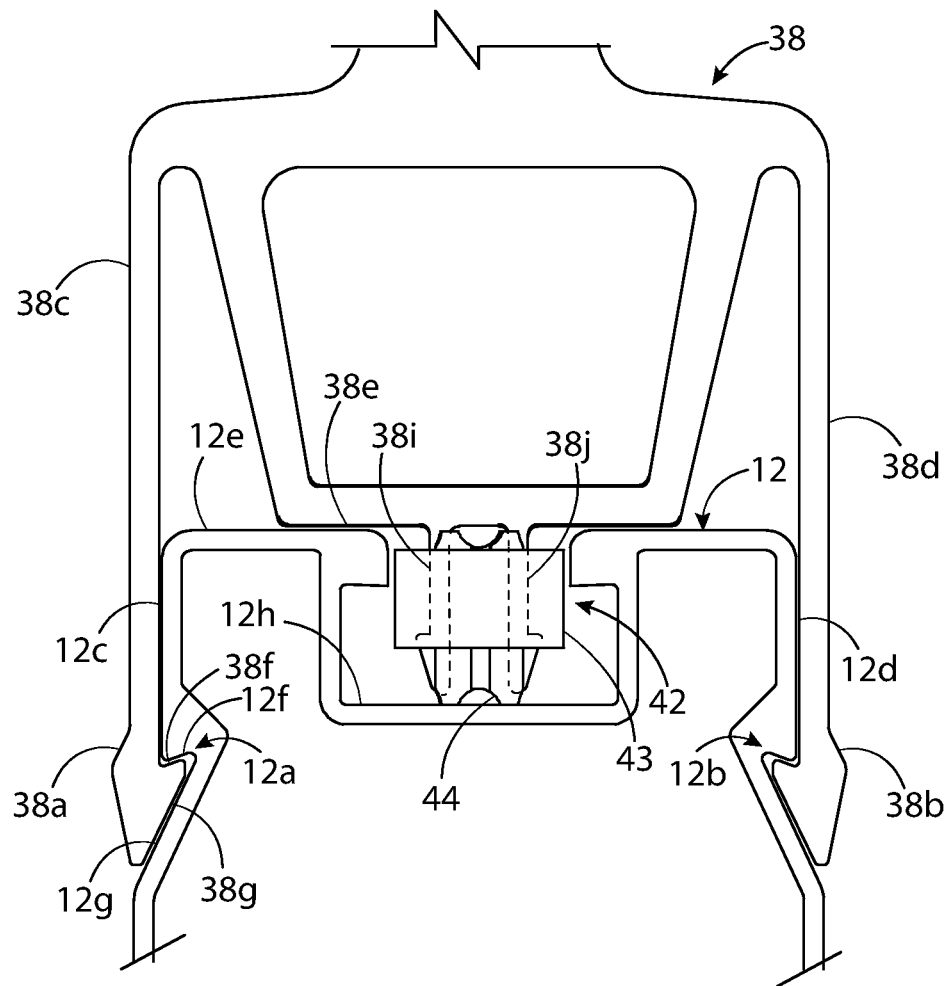
FIG. 12 illustrates, in side view, the clamp body portion and rail portion of FIG. 10 with the clamp body and rail are engaged and secured together.
Figure 13:
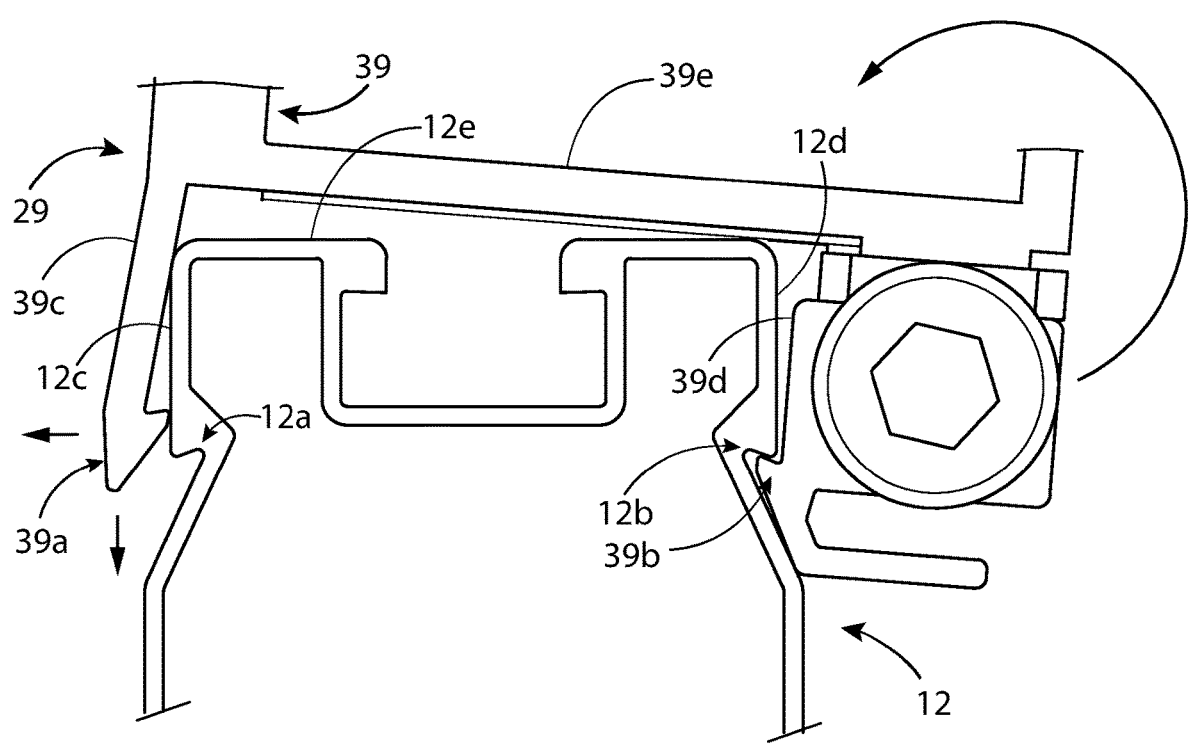
FIG. 13 illustrates, in side view, a portion of a clamp body of a bottom clamp and an upper portion of the rail of FIG. 4 with the clamp body and rail body being engaged and secured together by rotating the clamp body portion in place.
Figure 14:
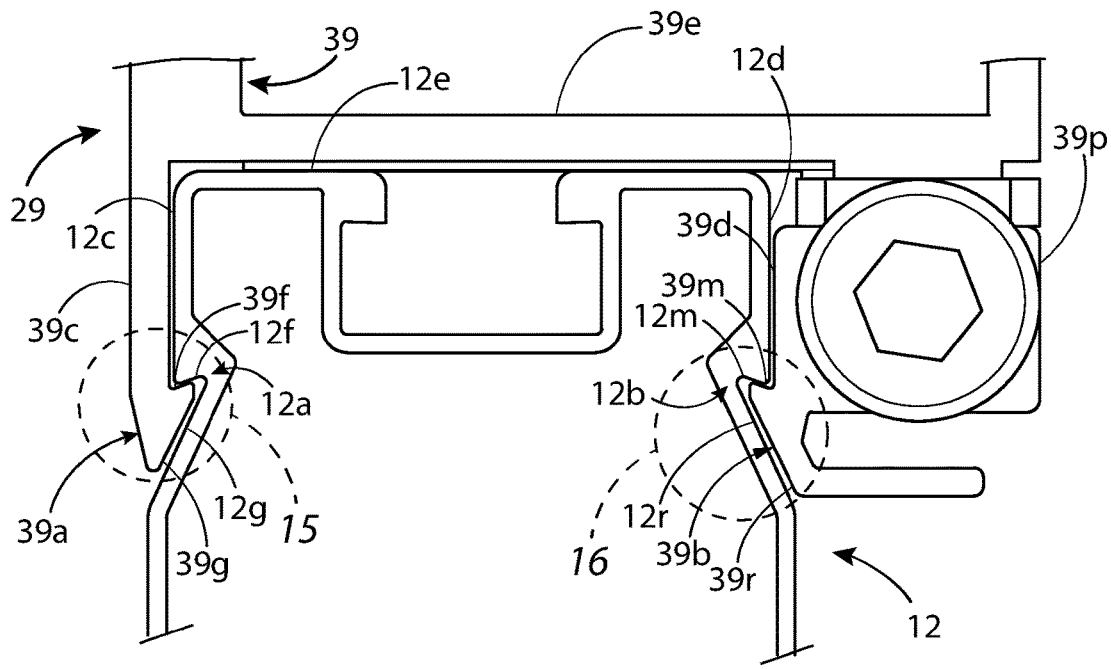
FIG. 14 illustrates, in side view, the portion of the clamp body and an upper portion of the rail both of FIG. 13 where the clamp body and rail body are engaged and secured together.
Figure 15:
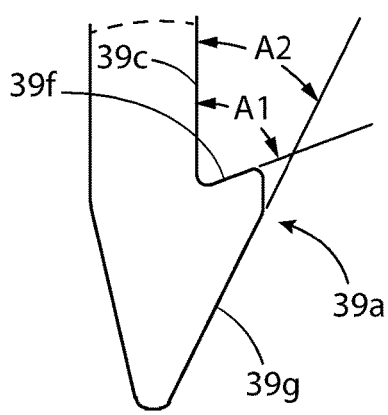
FIG. 15 illustrates, in side view, an enlarged view of a first clamping portion of the clamp body of FIG. 14.
Figure 16:
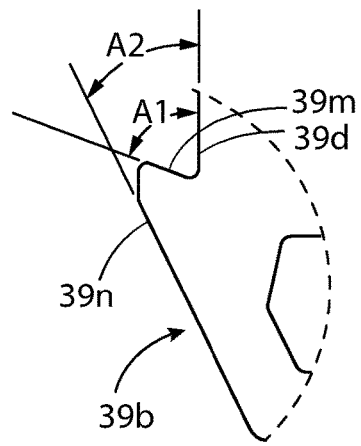
FIG. 16 illustrates, in side view, an enlarged view of a second clamping portion of the clamp body of FIG. 14.
Figure 17:
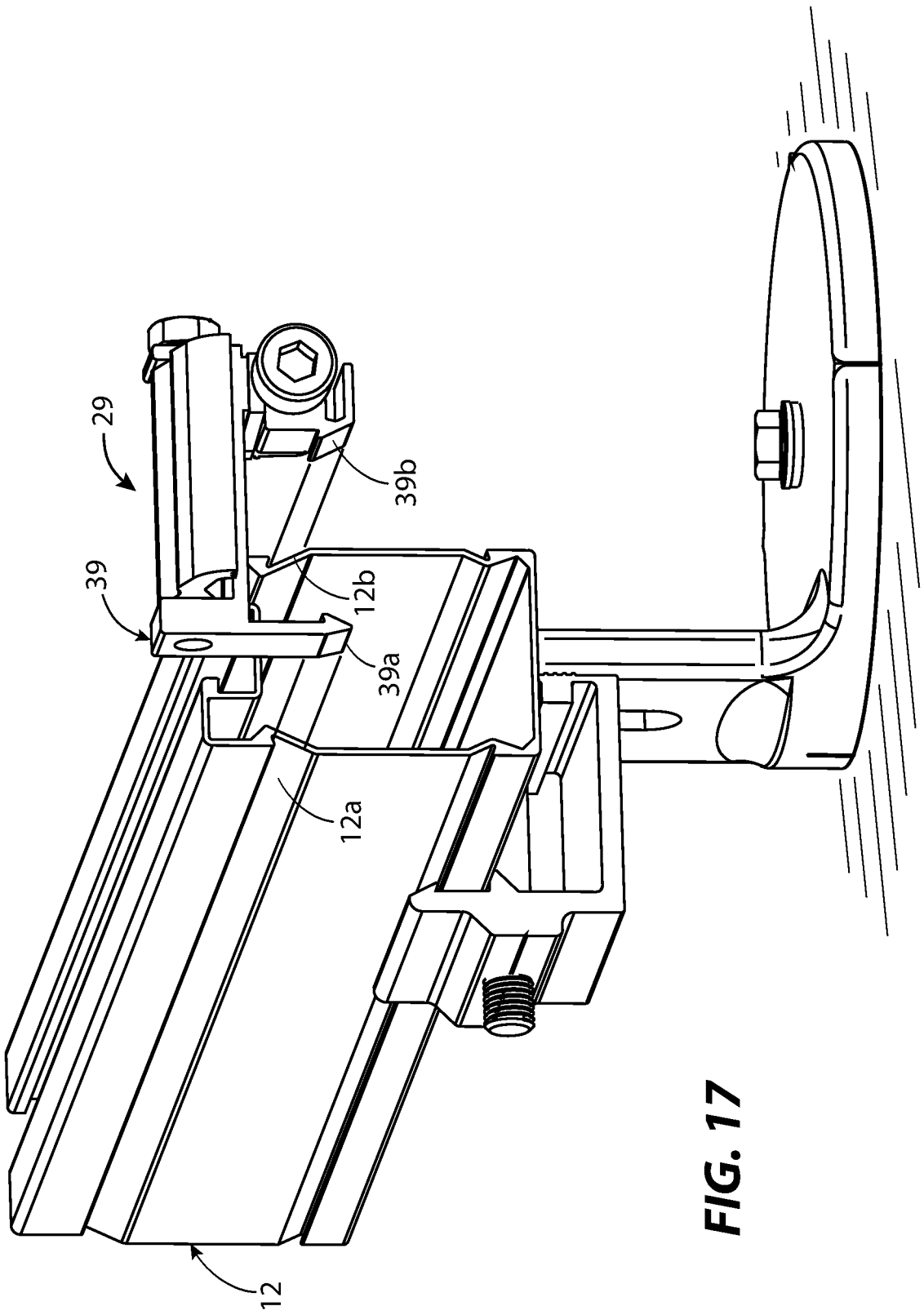
FIG. 17 illustrates, in side isometric view, the bottom clamp of FIG. 14 sliding over the outside of the rail.

FIGS. 10, 12-14, 17, 18 and 20 show examples of how various panel clamps interact with rail 12 and secure to upper detented portion 12a and upper detented portion 12b positioned on opposing sides and on opposing outside-facing surfaces of rail 12. The panels clamps illustrated in FIGS. 10, 12-14, 17, 18 and 20 can similarly be secured to upper detented portion 13a and upper detented portion 13b positioned on opposing sides and on opposing outside-facing surfaces of rail 13 of FIG. 7. As an example, FIGS. 21 and 22 illustrate how clamp body 38 would interact and be secured to rail 13. FIG. 10 also illustrates clamp body 38 with rail 12. Clamp body 38 is common to end clamp 25, end clamp 26, mid clamp 27, and mid clamp 28 of FIGS. 43, 44, 45, and 46, respectively. FIGS. 13, 14, and 17 illustrates clamp body 39 with rail 12. Clamp body 39 is part of bottom clamp 29 discussed for FIGS. 60-64. Clamp body 41 and rail 12 are illustrated together in FIGS. 18 and 20. Clamp body 41 is common to end clamp 31 of FIG. 65 and mid clamp 32 of FIG. 66. Clamping portion 38a is illustrated in FIG. 11, clamping portion 39a is illustrated in FIG. 15, clamping portion 39b is illustrated in FIG. 16, and clamping portion 41a is illustrated in FIG. 19.

Referring to FIG. 10, clamping portion 38a and clamping portion 38b of clamp body 38 slide downward under tension along the upper portions of rail side 12c and rail side 12d, respectively. The pair of clamp body arms, clamp body arm 38c and clamp body arm 38d of clamp body 38 bends outward under spring tension as clamp body 38 is pushed downward. Clamp body 38 is typically made of a material that exhibits spring tension such as steel or aluminum.

Referring to FIG. 12, clamping portion 38a and clamping portion 38b of clamp body 38 are snapped or rotated into upper detented portion 12a and upper detented portion 12b, respectively of rail 12. The pair of clamp body arms, clamp body arm 38c and clamp body arm 38d, spring back inward into upper detented portion 12a and upper detented portion 12b, respectively, from their position in FIG. 10. Clamping portion 38a, clamping portion 38b, upper detented portion 12a, and upper detented portion 12b, are so shaped, to prevent upward movement of clamp body 38 once respective clamping portions and upper detented portions are engaged. First sloped surface 38f of FIG. 11 and upper first sloped surface 12f of FIG. 5 can be angle upward and inward at the same angle, angle A1.

As illustrated in FIG. 12, first sloped surface 38f and upper first sloped surface 12f form interlocking surfaces to prevent upward movement. Base 38e of clamp body 38 engages rail top 12e of rail 12 to prevent upward movement. Second sloped surface 38g of FIG. 11 and upper second sloped surface 12g of FIG. 5 can be angled downward and outward at the same angle A2. Referring to FIG. 12, this allows upper second sloped surface 12g and second sloped surface 38g to rest against one another. Upper detented portion 12b and clamping portion 38b are similarly configured. This allows clamp body arm 38c and clamp body arm 38d to rest directly against rail side 12c and rail side 12d, respectively.

Referring to FIGS. 4, 10, and 12, rail 12 optionally can include rail slot 12h that runs lengthwise within the top of rail 12. Referring to FIGS. 10 and 12, rail slot 12h can be sized to engage a bonding assembly that can electrically bond clamp body 38 to rail 12. As illustrated, bonding assembly 42 can include bonding block 43, bonding pin 44, and bonding pin 45, of which bonding pin 44 is visible in the FIGS. 10 and 12 and bonding pin 45 is hidden from view. Bonding block 43 is secured to clamp body 38 by spring clip 38i and spring clip 38j projecting downward from clamp body 38. The bonding block assembly will be discussed in more detail later in this disclosure.

Referring to FIGS. 13, 14, and 17, bottom clamp 29 can be secured to rail 12 using a similar principle. Clamping portion 39a and clamping portion 39b stays secured to upper detented portion 12a and upper detented portion 12b, respectively in the same way as described above for FIG. 12. Referring to FIG. 14, first sloped surface 39f and upper first sloped surface 12f form interlocking surfaces to prevent upward movement and slippage. Referring to FIG. 15, first sloped surface 39f has an acute angle of angle A1 with respect to clamp body arm 39c, which matches angle A1 of upper detented portion 12a of FIG. 5. Referring to FIG. 14, second sloped surface 39g and upper second sloped surface 12g can be angled downward and outward at the same angle so that the two surfaces rest against one another and to allow clamp body arm 39c to rest directly against rail side 12c. Referring to FIG. 15, second sloped surface 39g has an acute angle A2 with respect to clamp body arm 39c, which matches angle A2 of upper detented portion 12a of FIG. 5. Referring to FIG. 14, base 39e of clamp body 39 engages rail top 12e of rail 12 to place a limit on downward movement.

Continuing to refer to FIG. 14, clamping portion 39b of adjustment support structure 39p includes first sloped surface 39m that forms interlocking surfaces with first sloped surface 12m to prevent upward movement. Referring to FIG. 16, first sloped surface 39m has an acute angle of angle A1 with respect to rail contact surface 39d which matches angle A1 of upper detented portion 12a of FIG. 5. Referring to FIG. 14, second sloped surface 39r and upper second sloped surface 12r can be angled downward and outward at the same angle so that the two surfaces rest against one another and to allow rail contact surface 39d of the adjustment support structure 39p to rest directly against rail side 12d. Referring to FIG. 16, second sloped surface 39n has an acute angle A2 with respect to rail contact surface 39d, which matches the angle of upper second sloped surface 12r of FIG. 14.

Referring to FIGS. 13 and 14, one way to install and secure clamp body 39 to rail 12, is to rotate and snap it into place. For example, referring to FIG. 13, with clamping portion 39b positioned against upper detented portion 12b, clamp body 39 can be rotated. As the clamp body 39 is rotated, clamping portion 39a will then slide downward along rail side 12c of rail 12. The clamp body arm 39c and clamping portion 39a will be pushed outward by the rail side 12c. Rail contact surface 39d is rotated against rail side 12d. Base 39e pivots against rail top 12e. Referring to FIG. 14, clamping portion 39a is snapped into upper detented portion 12a.

Referring to FIG. 17, another way to install and secure bottom clamp 29 to rail 12 is to slide it into side of rail 12. Clamping portion 39a and clamping portion 39b are slid into upper detented portion 12a and upper detented portion 12b, respectively from the edge of rail 12. Once clamping portion 39a and clamping portion 39b are slid into upper detented portion 12a and upper detented portion 12b, respectively, clamp body 39 will resist upward movement as described above.

Figure 18:
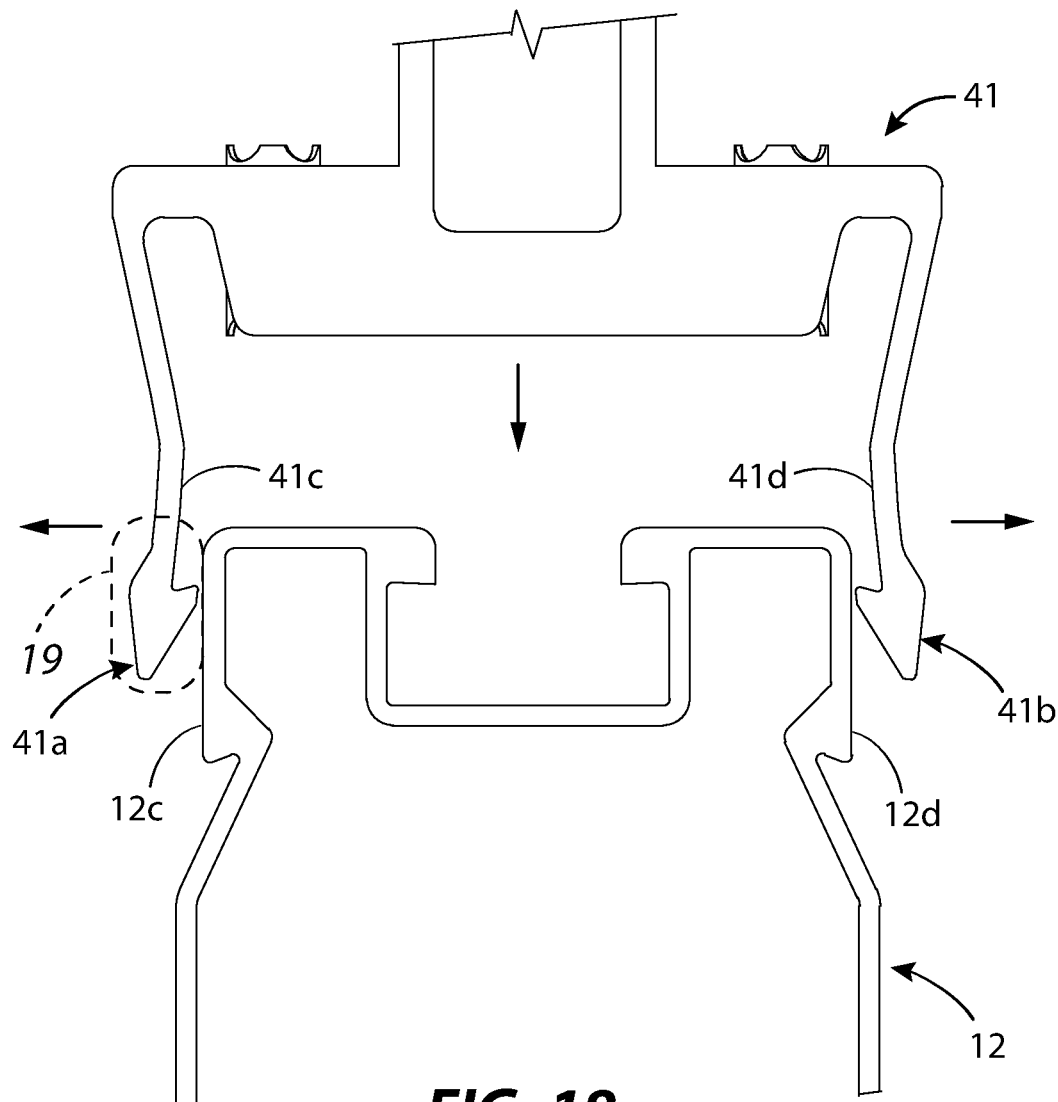
FIG. 18 illustrates, in side view, a portion of a clamp body engaging the upper portion of the rail of FIG. 4; the clamp body is used a landscape-mode end clamp and landscape-mode mid clamp.
Figure 19:
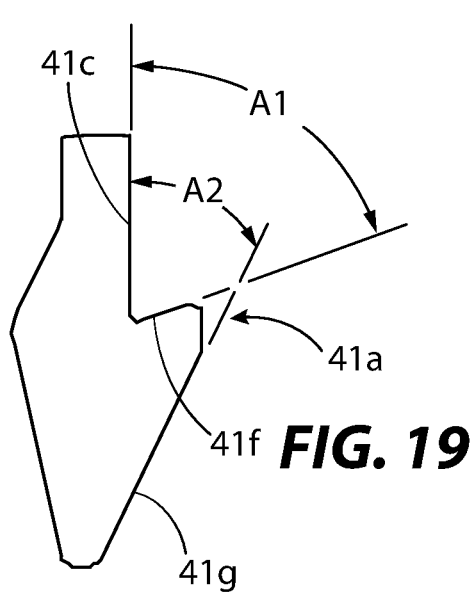
FIG. 19 illustrates, in side view, an enlarged view of a clamping portion of the clamp body of FIG. 18.
Figure 20:
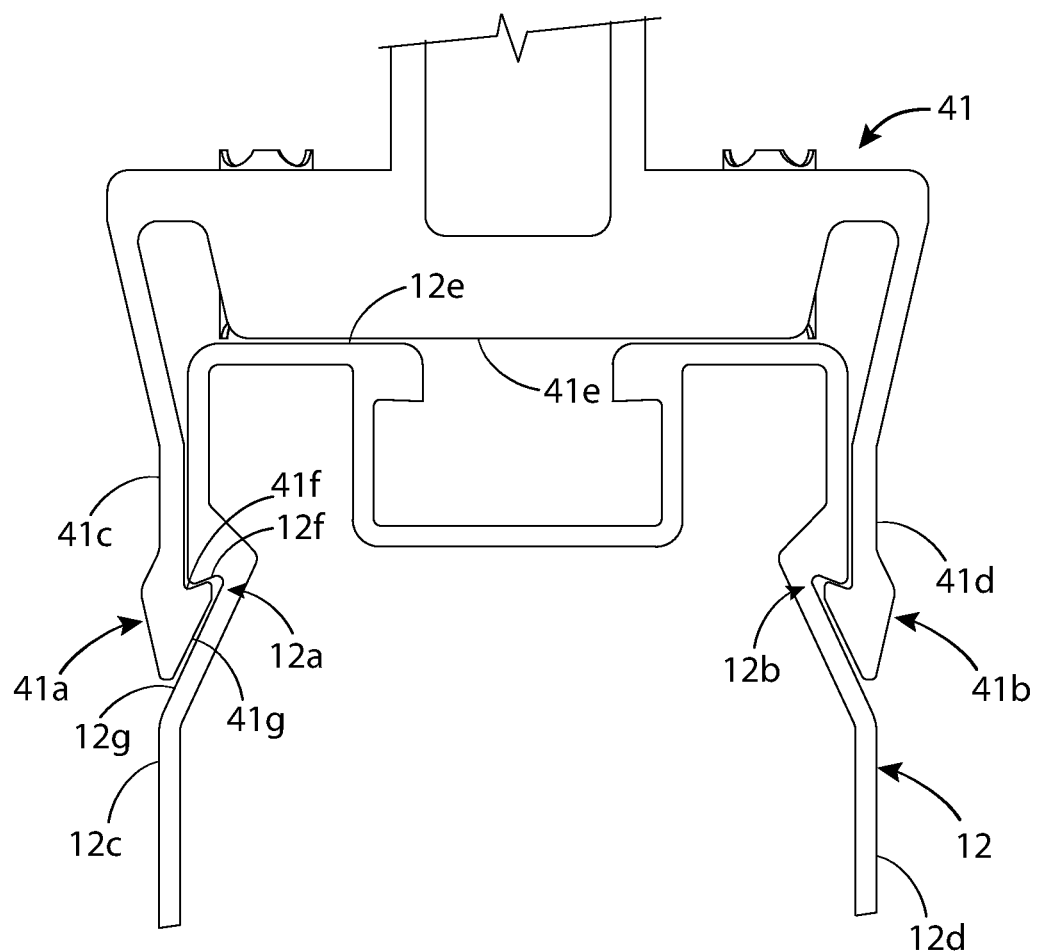
FIG. 20 illustrates, in side view, the portion of the clamp body and rail of FIG. 18 with the clamp body and rail body engaged and secured together.
Figure 65:
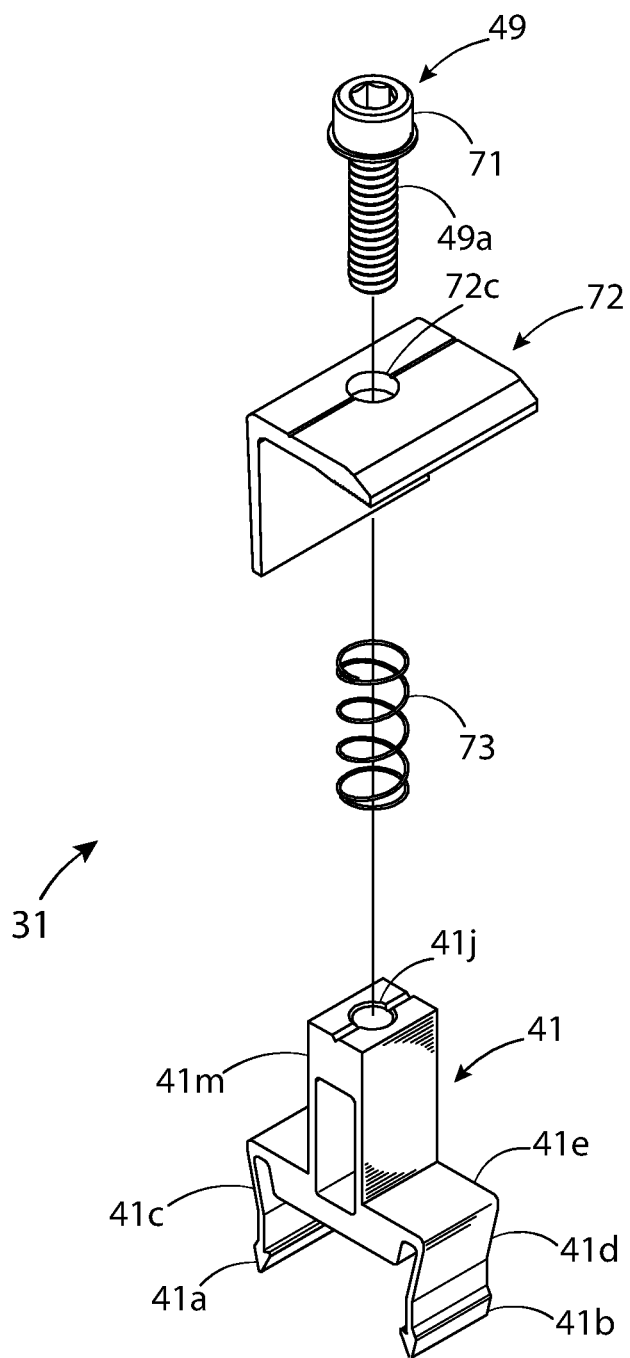
FIG. 65 illustrates, in exploded and isometric view, a shared-rail end clamp of the present disclosure for mounting solar panels in landscape mode.
Figure 66:
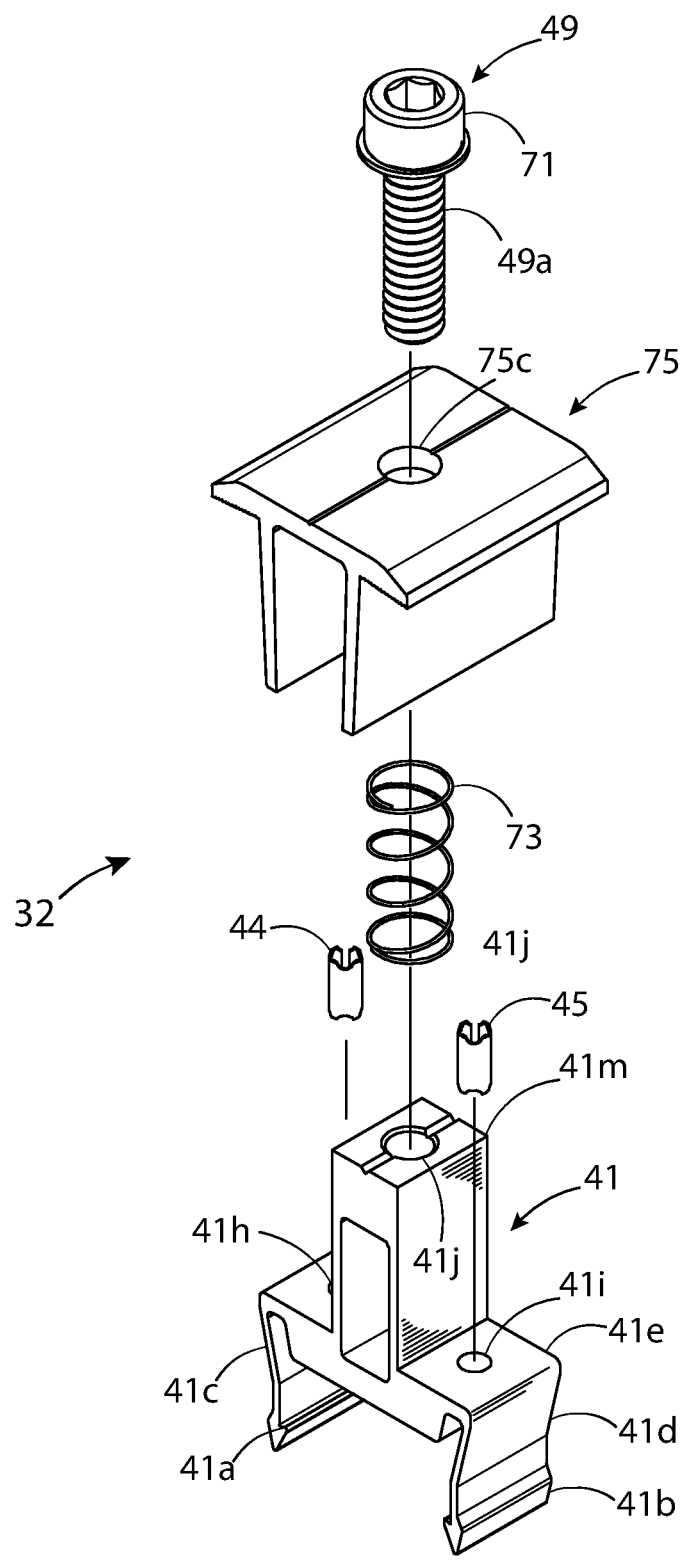
FIG. 66 illustrates, in exploded and isometric view, a shared-rail mid clamp of the present disclosure for mounting solar panels in landscape mode.

The landscape mode panel clamps of FIGS. 65 and 66 are secured to rail 12 of FIG. 4 by use of clamp body 41 illustrated in FIGS. 18 and 20 using the same principle as discussed for FIGS. 10-12. Referring to FIG. 18, clamping portion 41a and clamping portion 41b slide downward under tension along the upper portions of rail side 12c and rail side 12d, respectively. The pair of clamp body arms, clamp body arm 41c and clamp body arm 41d, of clamp body 41, bend outward under spring tension as clamp body 41 is pushed downward.

Referring to FIG. 20, once the pair of clamping portions, clamping portion 41a and clamping portion 41b, are slid into upper detented portion 12a and upper detented portion 12b, respectively, of rail 12, the pair of clamp body arms, clamp body arm 41c and clamp body arm 41d, spring back inward into the detented portions. Clamping portion 41a, clamping portion 41b, upper detented portion 12a, and upper detented portion 12b, are shaped and angled that once engaged, upward movement of clamp body 41 is prevented. First sloped surface 41f and upper first sloped surface 12f form interlocking surfaces to prevent upward movement and slippage. Referring to FIG. 19, first sloped surface 41f has an acute angle, angle A1, with respect to clamp body arm 41c, which matches angle A1 of upper detented portion 12a of FIG. 5. Referring to FIG. 20, base 41e of clamp body 41 engages rail top 12e of rail 12 to prevent upward movement. First sloped surface of clamping portion 41b is similarly angled to prevent upward movement against upper detented portion 12b. Second sloped surface 41g and upper second sloped surface 12g can be angled downward and outward at the same angle so that the two surfaces rest against one another and to allow clamp body arm 41c to rest directly against rail side 12c. The second sloped surface of clamping portion 41b is similarly angled to allow clamp body arm 41d to rest directly against rail side 12d. Referring to FIG. 19, second sloped surface 41g has an acute angle A2 with respect to clamp body arm 41c, which matches angle A2 of upper second sloped surface 12g of FIG. 5.

Clamp body 38, clamp body 39, and clamp body 41 of FIGS. 10, 14, and 18, respectively can also engage rail 13 of FIG. 7 because of the common upper structure that rail 13 shares with rail 12 of FIG. 4, as previously discussed. As an example, in FIGS. 21 and 22, clamp body 38 engages rail 13. Referring to FIG. 21, clamping portion 38a and clamping portion 38b of clamp body 38 slide downward under tension along the upper portions of rail side 13c and rail side 13d, respectively. The pair of clamp body arms, clamp body arm 38c and clamp body arm 38d of clamp body 38, bend outward under spring tension as clamp body 38 is pushed downward.

Referring to FIG. 22, clamping portion 38a and clamping portion 38b of clamp body 38 are snapped or rotated into upper detented portion 13a and upper detented portion 13b, respectively of rail 13. The pair of clamp body arms, clamp body arm 38c and clamp body arm 38d, will then spring back inward into the upper detented portions. Clamping portion 38a and clamping portion 38b and upper detented portion 13a and upper detented portion 13b, respectively, are shaped as previously described in FIG. 12. Continuing to refer to FIG. 22, once engaged, upward movement of clamp body 38 is prevented. First sloped surface 38f and upper first sloped surface 13f form interlocking surfaces to prevent upward movement and slippage. Base 38e of clamp body 38 engages rail top 13e of rail 13 to prevent upward movement. Rail 13 can include rail slot 13h that runs lengthwise along rail top 13e. Rail slot 13h can be sized to engage a bonding assembly 42 that can electrically bond clamp body 38 to rail 13 in a similar manner as previously discussed for FIG. 12.

Figure 23:
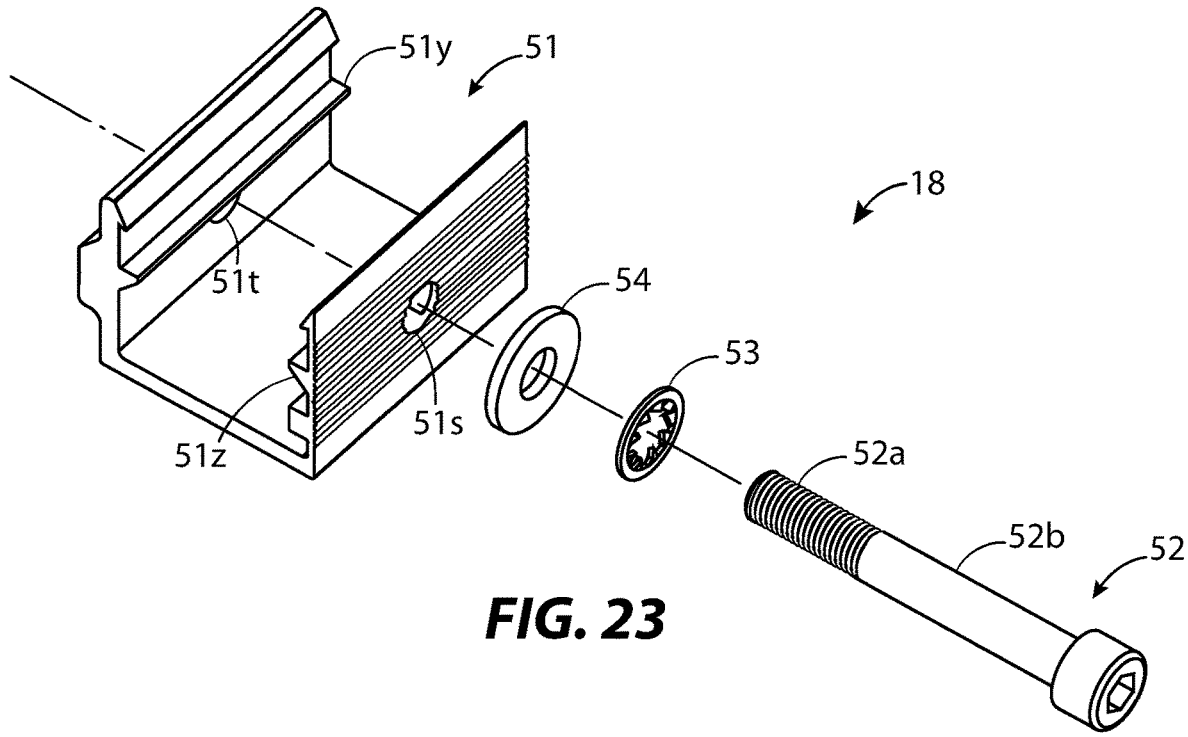
FIG. 23 illustrates, in exploded isometric view, an L-foot adapter assembly of the present disclosure.
Figure 24:
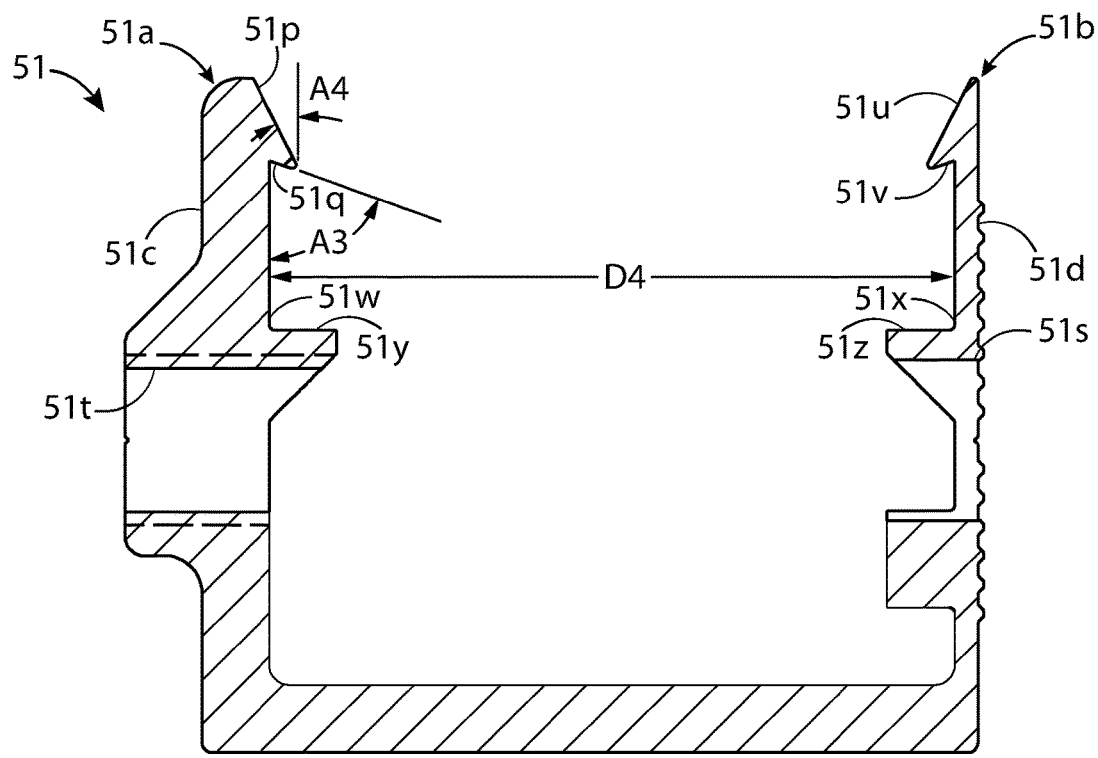
FIG. 24 illustrates a section view of an L-foot adapter body of the L-foot adapter assembly of FIG. 23.

Referring to FIG. 4, rail 12 includes lower detented portion 12n and lower detented portion 12o for engaging L-foot adapter assembly 18 of FIG. 23. Continuing to refer to FIG. 4, lower detented portion 12n and lower detented portion 12o are formed and positioned in a lower region of rail side 12c and rail side 12d, respectively (i.e., the lower half of the rail as measured heightwise). In FIG. 7, rail 13 includes lower detented portion 13n and lower detented portion 13o for engaging a version of L-foot adapter assembly 18 of FIG. 23. Continuing to refer to FIG. 7, lower detented portion 13n and lower detented portion 13o are formed and positioned in a lower region of rail side 13c and rail side 13d, respectively (i.e., the lower half of rail as measured heightwise). Referring to FIG. 24, L-foot adapter body 51 includes an interior width D4. Referring to FIGS. 4 and 24, for L-foot adapter body 51 (FIG. 24) that are designed to engage rail 12 (FIG. 4), then the interior width D4 of FIG. 24 would equal width D2 of FIG. 4. Referring to FIGS. 7 and 24, for L-foot adapter body 51 (FIG. 24) that are designed to engage rail 13 (FIG. 7), then the interior width D4 of FIG. 24 would equal width D3 of FIG. 7.

Referring to FIG. 6, lower detented portion 12n includes lower first sloped surface 12p that extends inward and downward from rail side 12c and a lower second sloped surface 12q that extends upward and outward from the bottom of lower first sloped surface 12p. Lower first sloped surface 12p extends at an acute angle with respect to rail side 12c of angle A4. Lower second sloped surface 12q has an acute angle, angle A3, with respect to rail side 12c. Referring to FIG. 4, lower detented portion 12o similarly includes lower first sloped surfaces and lower second sloped surfaces as described for lower detented portion 12n of FIG. 6.

Lower detented portion 13n and lower detented portion 13o of FIG. 7 are similarly structured to lower detented portion 12n and lower detented portion 12o of FIG. 4. Referring to FIG. 9, lower detented portion 13n includes lower first sloped surface 13p that extends inward and downward from rail side 13c and lower second sloped surface 13q that extends upward and outward from the bottom of lower first sloped surface 13p. Lower first sloped surface 13p extends at an acute angle with respect to rail side 13c of angle A4. Lower second sloped surface 13q has an acute angle of angle A3 with respect to rail side 12c. Lower detented portion 13o similarly includes first sloped surfaces and second sloped surfaces as described for lower detented portion 13n.

FIGS. 27-30 illustrate how rail 12 engages L-foot adapter body 51 of L-foot adapter assembly 18 and L-foot adapter assembly 18 engaging L-foot assembly 35. FIGS. 23 and 24 describe L-foot adapter assembly 18 and L-foot adapter body 51, respectively. The reader will note that this description that follows for rail 12 of FIG. 4 and L-foot adapter assembly 18 of FIGS. 27-30 can equally apply to rail 13 of FIG. 7; the difference being that width D4 of L-foot adapter body 51 of FIG. 24 would equal width D3 of FIG. 7 instead of width D2 of FIG. 4.

Referring to FIG. 23, L-foot adapter assembly 18, can include L-foot adapter body 51, threaded fastener 52, and optionally one or more washers. Illustrated are washer 53 and washer 54. Washer 53 is illustrated as an internal toothed washer. Other types of lock washers can be substituted such as a split lock washer or external toothed washer. Washer 54 is illustrated as a flat washer. Other types of plain washers can be substituted such as fender washer, shoulder washer, or c-washer. The functionality of one or either of the illustrated washers can optionally be built into threaded fastener 52.

Referring to FIGS. 23 and 24, threaded fastener 52 (FIG. 23) engages aperture 51s and aperture 51t of L-foot adapter body 51. Aperture 51t is typically threaded to threadedly engage and secure threaded portion 52a (FIG. 23) of threaded fastener 52 (FIG. 23). Referring to FIG. 23, aperture 51s is typically unthreaded to allow fastener body 52b to turn freely.

Figure 27:
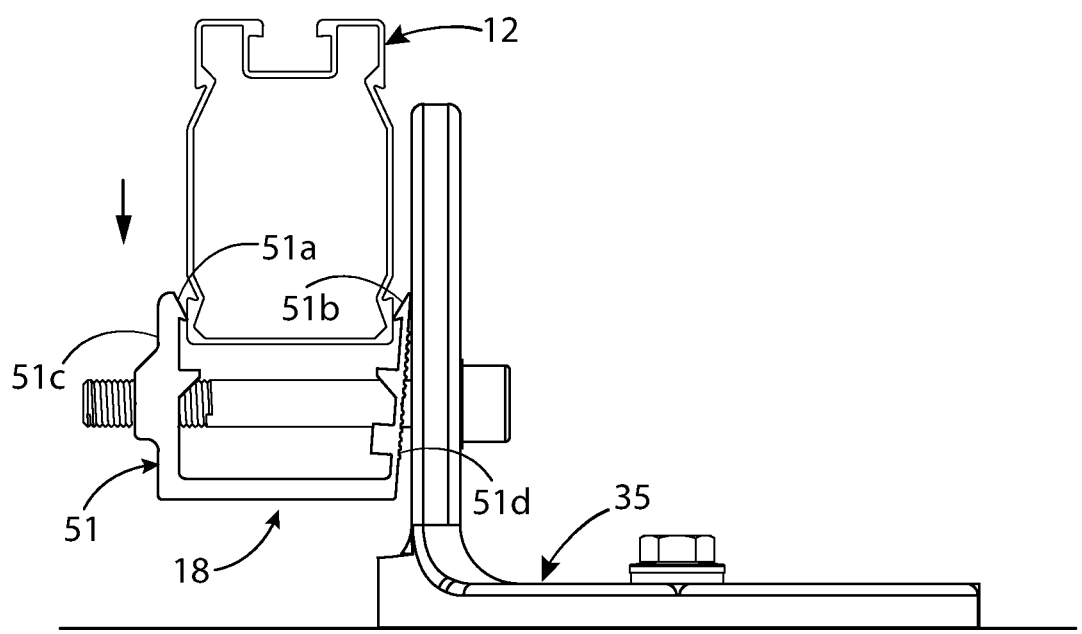
FIG. 27 illustrates, in side view, the rail of FIG. 4, L-foot assembly of FIG. 2, and L-foot adapter assembly of FIG. 23 with the rail being snapped into the L-foot adapter body.
Figure 28:
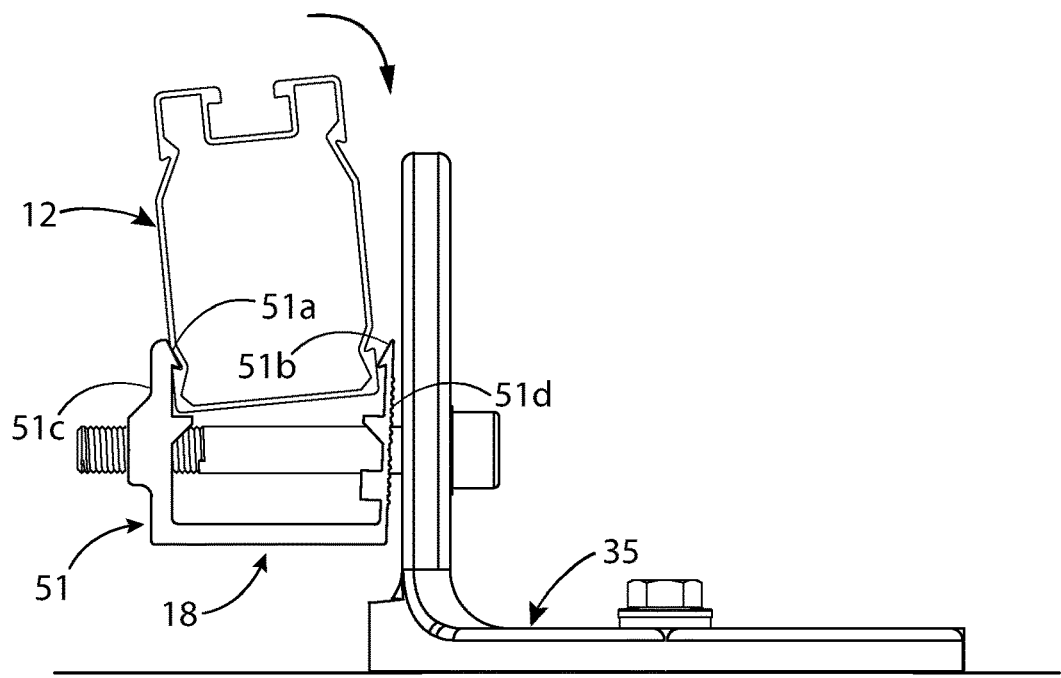
FIG. 28 illustrates, in side view, the rail, L-foot assembly and L-foot adapter assembly of FIG. 27, with the rail being rotated in the L-foot adapter body.
Figure 29:
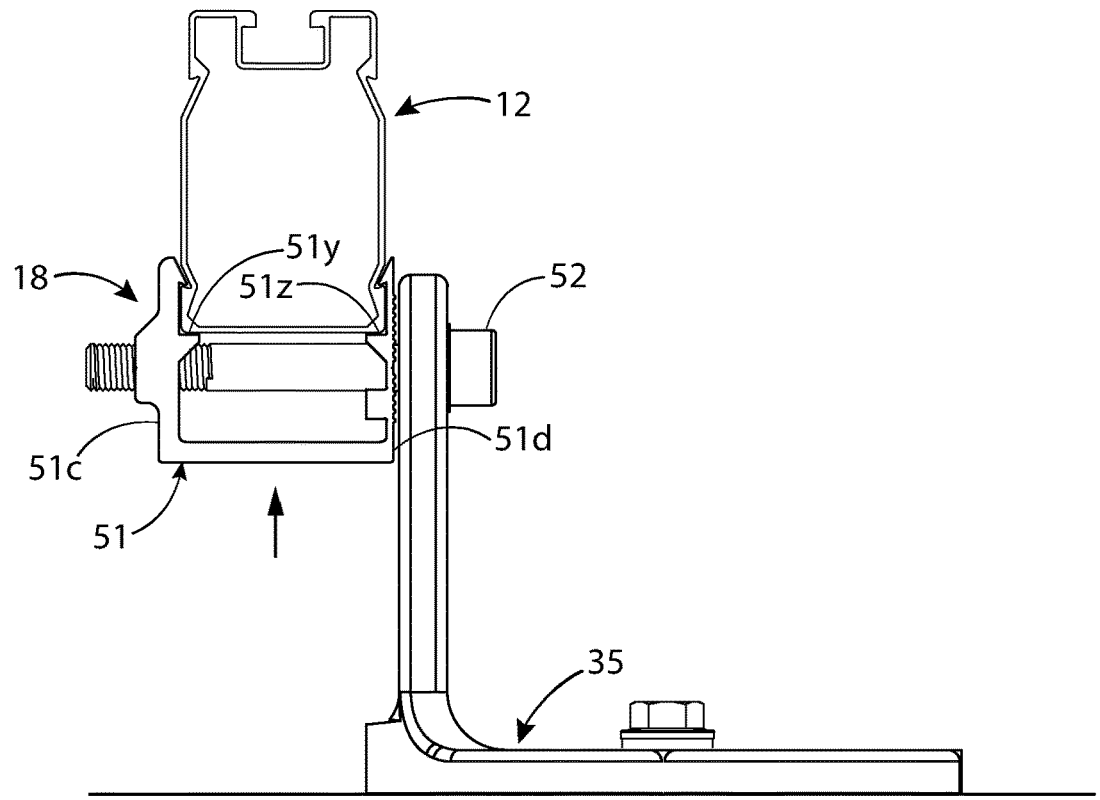
FIG. 29 illustrates, in side view, the rail, L-foot assembly and L-foot adapter assembly of FIG. 27 with the rail and L-foot adapter assembly extended upward with respect to the L-foot assembly.

Referring to FIGS. 27-29, rail 12 can snap or be rotated into L-foot adapter body 51 of L-foot adapter assembly 18. Rail 12 can be snapped or rotated into L-foot adapter assembly 18 while it is mounted and secured to L-foot assembly 35. In FIG. 27, rail 12 is being snapped into L-foot adapter body 51. In FIG. 28, rail 12 is being rotated into L-foot adapter body 51. The L-foot adapter body 51 is shown as a one-piece body with L-foot adapter side 51d thinner and more flexible with the L-foot adapter side 51c. Because of this, the rails and L-foot adapter assemblies of the present disclosure can be snapped or rotated into L-foot adapter bodies independent of whether or not L-foot adapter assemblies are mounted to an L-foot assemblies or other mounting structures. For example, in FIGS. 27 and 28, L-foot adapter assembly 18 is mounted loosely to L-foot assembly 35. In FIG. 29, after rail 12 is mounted, L-foot adapter assembly 18 can be moved to any position along L-foot assembly 35 then tightened into place. Because of this, the installer could choose to preassemble L-foot adapter assembly 18 to L-foot assembly 35. Alternatively, the installer could preassemble rail 12 to L-foot adapter assembly 18 and then attach the rail and L-foot adapter assembly combination to L-foot assembly 35. Having these options allows for more flexibility during installation. For example, rail 12 can be preassembled to L-foot adapter assembly 18 on the roof, on the ground, or even at the installer's shop. The resulting assembly can then be secured to L-foot assembly 35.

Figure 30:
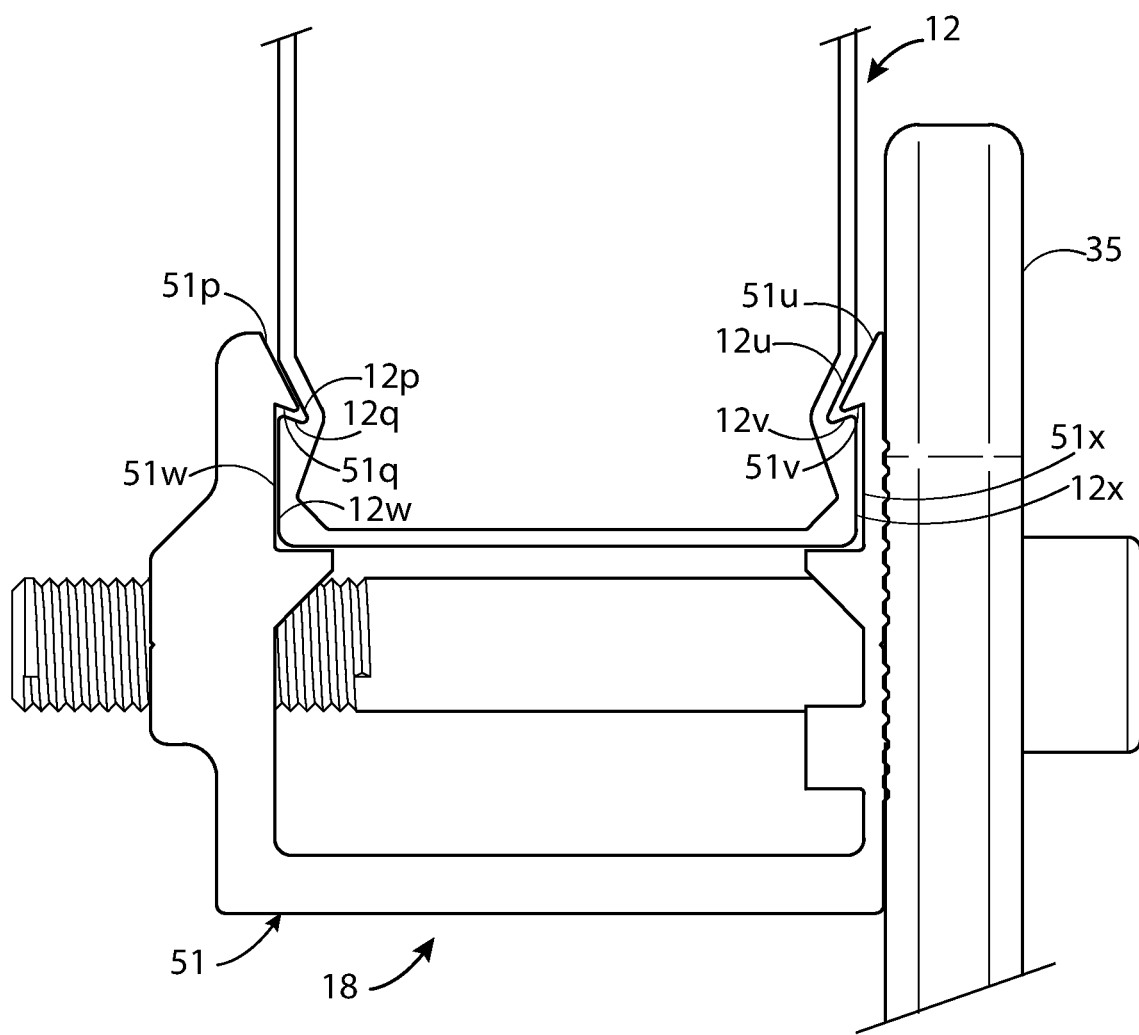
FIG. 30 illustrates, in side view, an enlarged portion of FIG. 29, to illustrate how the rail is secured to the L-foot adapter body.

Referring to FIG. 24, L-foot adapter body 51 includes clamping portion 51a extending upward from the top of L-foot adapter side 51c and clamping portion 51b extending upward from the top of L-foot adapter side 51d. Clamping portion 51a and clamping portion 51b include first sloped surface 51p and first sloped surface 51u, respectively. First sloped surface 51p and first sloped surface 51u extend downward and inward from the top of L-foot adapter side 51c and the top of L-foot adapter side 51d, respectively. Clamping portion 51a and clamping portion 51b include second sloped surface 51q and second sloped surface 51v, respectively. Second sloped surface 51q and second sloped surface 51v extend upward and outward from first sloped surface 51p and first sloped surface 51u, respectively. First sloped surface 51p and first sloped surface 51u make an angle A4 with respect to L-foot adapter side 51c and L-foot adapter side 51d, respectively. Second sloped surface 51q and second sloped surface 51v make an angle A3 with respect to L-foot adapter side 51c and L-foot adapter side 51d, respectively. Referring to FIG. 30, this allows first sloped surface 51p and first sloped surface 51u to planarly engage lower first sloped surface 12p and lower first sloped surface 12u, respectively of rail 12. This also allows second sloped surface 51q and second sloped surface 51v to engage lower second sloped surface 12q and lower second sloped surface 12v, respectively, of rail 12. The downward and inward slope of second sloped surface 51q and second sloped surface 51v combined with the complementary upward and outward slope of lower second sloped surface 12q and lower second sloped surface 12v, respectively, create "catches" for rail 12 and cause rail 12 to resist upward movement. The downward and inward slope of lower first sloped surface 12p and lower first sloped surface 12u helps to allow lower rail side 12w and lower rail side 12x to slide or rotate into L-foot adapter side 51w and L-foot adapter side 51x, respectively.

Referring to FIG. 24, the preceding paragraph discussed the benefits, and advantages of L-foot adapter side 51d being cross-sectionally thinner than L-foot adapter side 51c in combination with the L-foot adapter body 51 having a one-piece body. We will now discuss in FIGS. 27 and 28 how rail 12 engages L-foot adapter body 51. Referring to FIGS. 27 and 28, as rail 12 engages the clamping portion 51a and clamping portion 51b, L-foot adapter side 51d bends outward as rail 12 is either snapped into place (FIG. 27) or rotated into place (FIG. 28). L-foot adapter side 51c, which is thicker and more rigid than L-foot adapter side 51d, remains stationary. Because the L-foot adapter body 51 is a one-piece body and L-foot adapter side 51d is thinner than L-foot adapter side 51c, it will bend from the force of the rail 12 being rotated or snapped into place. Referring to FIG. 29, L-foot adapter side 51d will spring back into its resting position and no longer bend outward after rail 12 is snapped into place. After threaded fastener 52 is tightened, L-foot adapter side 51d becomes supported by L-foot 35 and increases resistance to the rail 12 from pulling upward away from the L-foot adapter assembly.

Continuing to refer to FIG. 29, once rail 12 is snapped or rotated into place, flanged portion 51y and flanged portion 51z extending inward from L-foot adapter side 51c and L-foot adapter side 51d, respectively, support the rail bottom and prevent rail 12 from moving downward. Flanged portion 51y and flanged portion 51z are also illustrated in FIGS. 23 and 24. Referring to FIG. 29, tightening of threaded fastener 52 further prevents upward movement of rail 12 because L-foot 35 now supports L-foot adapter side 51d. L-foot adapter side 51d can no longer bend outward.

Figure 25:
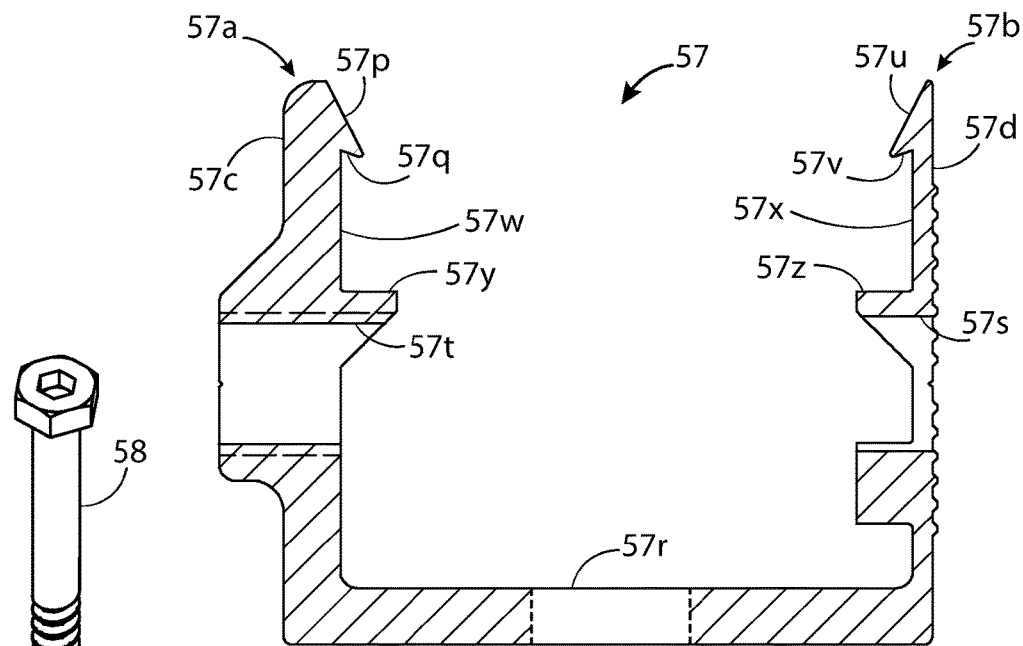
FIG. 25 illustrates a section view of an L-foot adapter body of the L-foot adapter assembly of FIG. 26.
Figure 26:
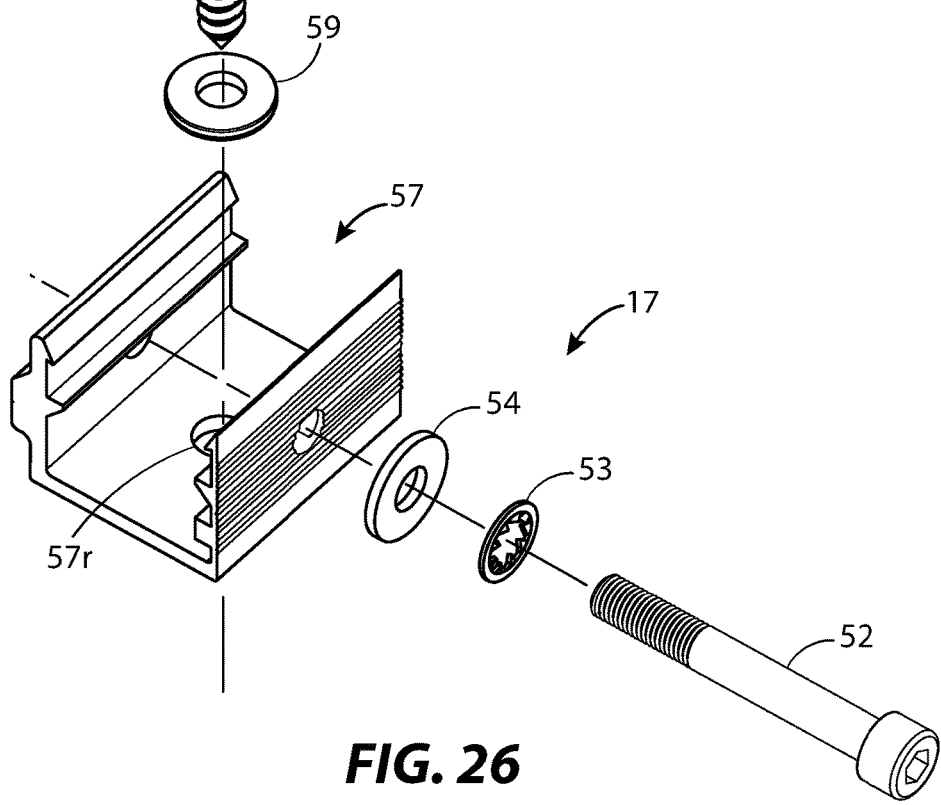
FIG. 26 illustrates, in exploded isometric view, an alternative version of an L-foot adapter assembly of the present disclosure.

FIG. 26 illustrates an alternative L-foot adapter assembly, L-foot adapter assembly 17. L-foot adapter assembly 17 utilizes L-foot adapter body 57. Referring to FIGS. 25 and 26, L-foot adapter body 57 can be constructed with the same or similar structure as L-foot adapter body 51 of FIG. 23 but with the addition of aperture 57r. Referring to FIG. 26, L-foot adapter assembly 17 can utilize threaded fastener 52 and the optional washers, washer 53 and washer 54. Washer 53 and washer 54 can be the same or similar as those described for FIG. 23. Referring to FIG. 25, the structure of L-foot adapter body 57, except aperture 57r, can be identical with the structure of L-foot adapter body 51 of FIG. 24. Continuing to refer to FIG. 25, clamping portion 57a and clamping portion 57b, L-foot adapter side 57c and L-foot adapter side 57d, first sloped surface 57p, second sloped surface 57q, first sloped surface 57u, second sloped surface 57v, aperture 57s, aperture 57t, inside L-foot adapter side 57w, L-foot adapter side 57x, flanged portion 57y, and flanged portion 57z in FIG. 25 can have the same or similar structure to their respective counterparts in FIG. 24, clamping portion 51a, clamping portion 51b, L-foot adapter side 51c, L-foot adapter side 51d, first sloped surface 51p, second sloped surface 51q, first sloped surface 51u, second sloped surface 51v, aperture 51s, aperture 51t, inside L-foot adapter side 51w, L-foot adapter side 51x, flanged portion 51y, and flanged portion 51z. Because of this, L-foot adapter assembly 17 of FIG. 26 can be used in place of L-foot adapter assembly 18 of FIG. 23 in any place where L-foot adapters are utilized; for example, FIGS. 2, 3, 27-30, 51-55, 57-59, 61-64, 69-74, and 76-80.

Figure 31:
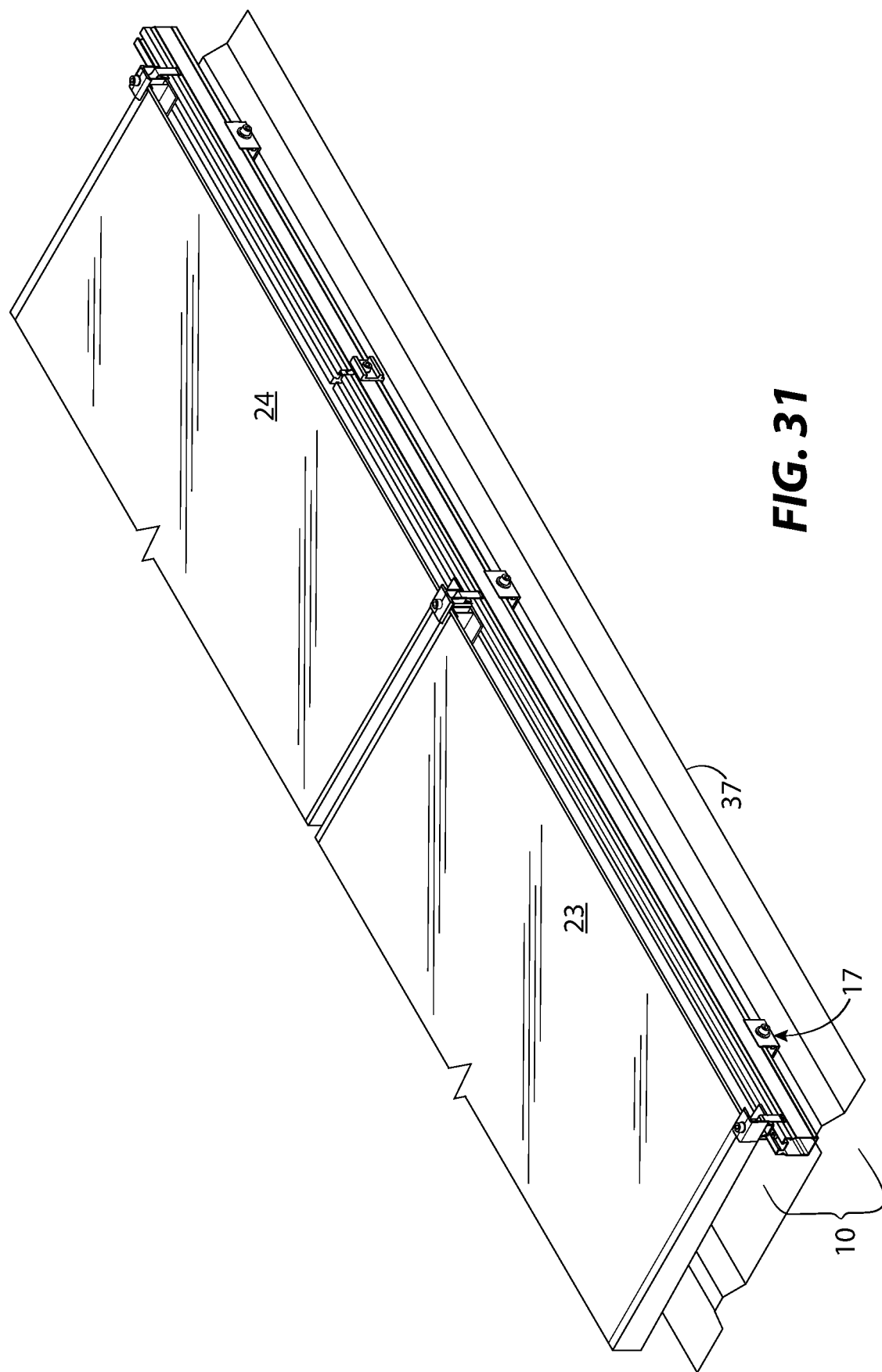
FIG. 31 illustrates, in isometric view, an enlarged portion of the solar PV system similar to FIG. 2, cut along section lines 2-2 in FIG. 1, showing how the L-foot adapter assembly of FIG. 26 can be mounted directly to a trapezoidal roof.
Figure 32:
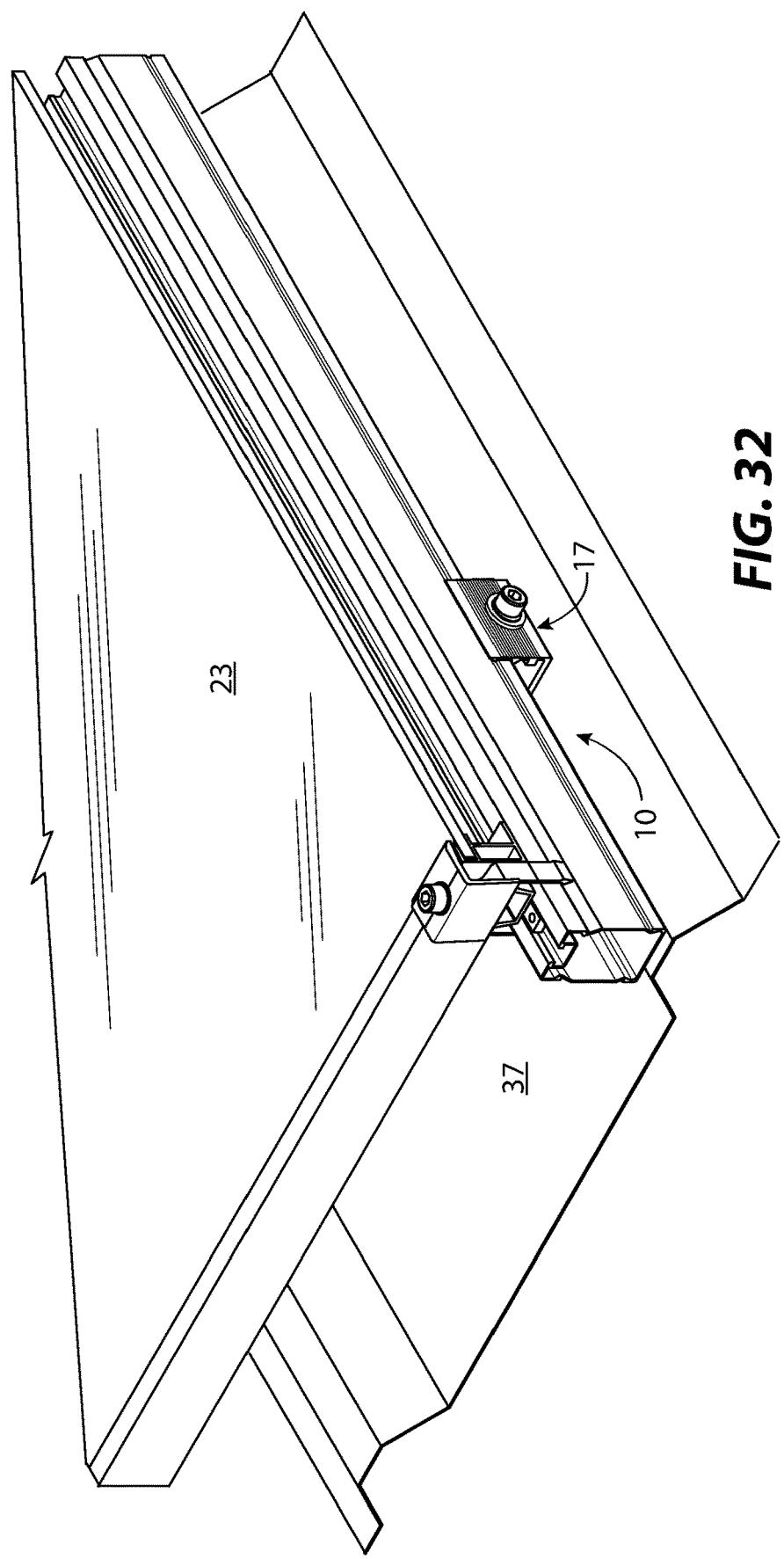
FIG. 32 illustrates, in isometric view, the enlarged portion of FIG. 31.
Figure 33:
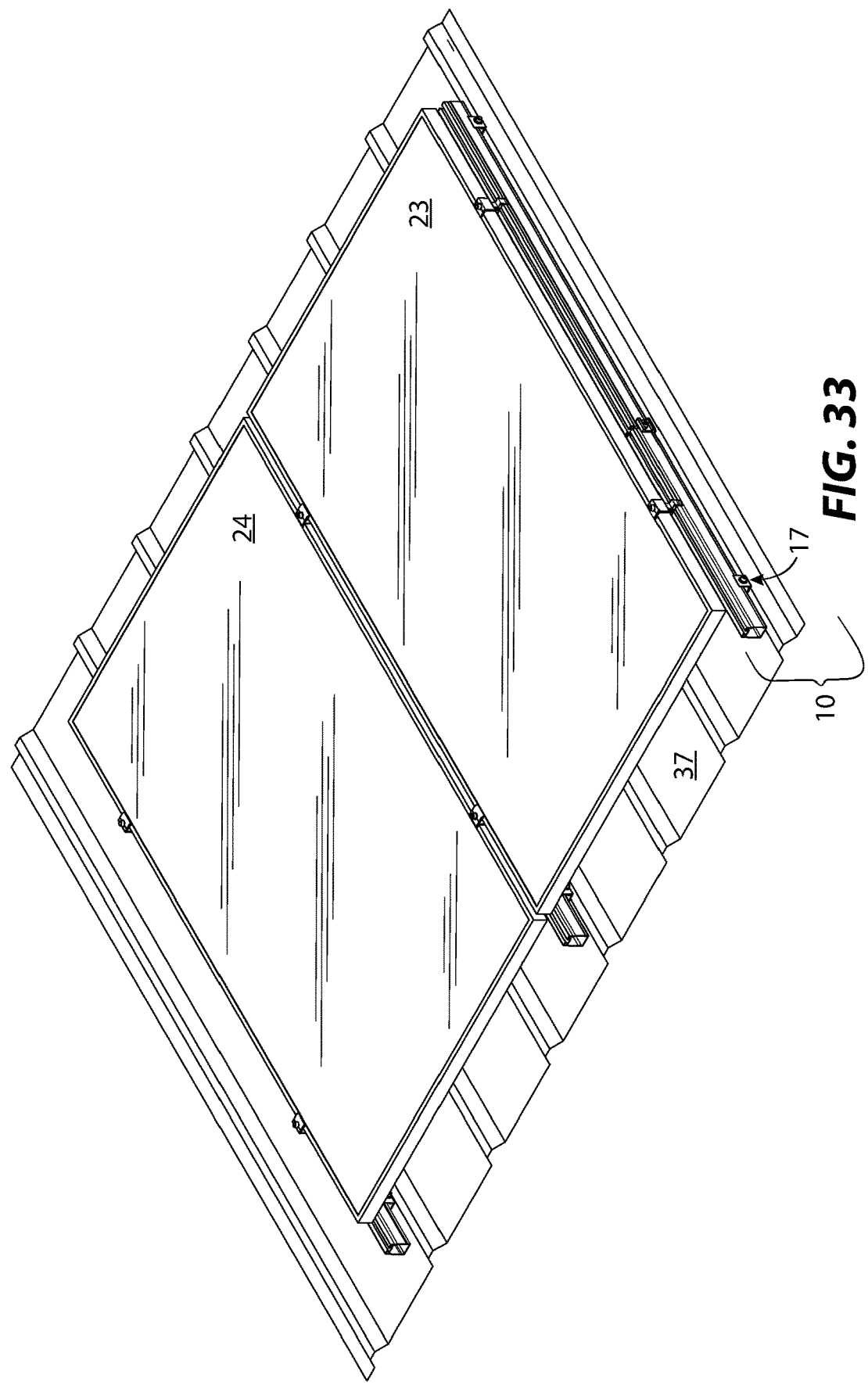
FIG. 33 illustrates, in isometric view, a solar PV system mounted directly to a trapezoidal roof using the L-foot adapter assembly of FIG. 26 and with the solar panels oriented in landscape mode.

Aperture 57r and threaded fastener 58 of FIG. 26 allows L-foot adapter assembly 17 to be attached to metal roof 37 without an L-foot as illustrated in FIGS. 31-34. Referring to FIGS. 31-34, metal roof 37 is illustrated as a trapezoidal roof. L-foot adapter assembly 17 can be mounted to other metal roofs as long as they include flat mounting suitable for mounting the assembly. FIGS. 31 and 32 show solar panel racking system 10 with solar panel 23 and solar panel 24 arranged in portrait mode with L-foot adapter assembly 17 attached directly to metal roof 37 (solar panel 24 is not shown in FIG. 32). FIG. 33 shows solar panel racking system 10 with solar panel 23 and solar panel 24 arranged in landscape mode with L-foot adapter assembly 17 attached directly to metal roof 37.

Figure 34:
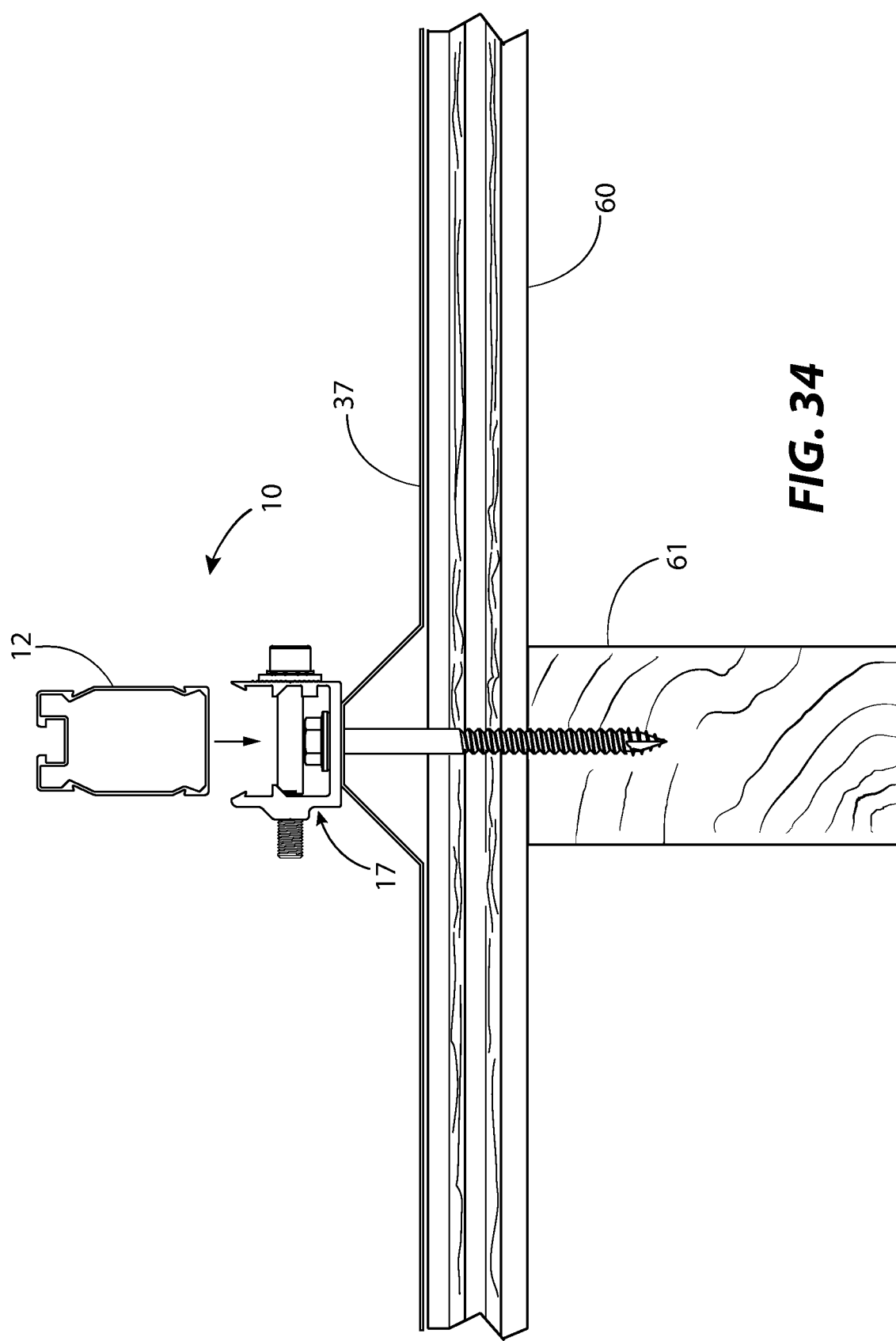
FIG. 34 illustrates, in side view, a trapezoidal metal roof with wood roof decking in cutaway view, to show the L-foot adapter assembly secured to a roof rafter and with the rail exploded away from the L-foot adapter.

Referring to FIG. 34, L-foot adapter assembly 17 is attached directly to metal roof 37. Threaded fastener 58 engages rafter 61 through roof deck 60. In FIG. 34, roof deck 60 is illustrated as plywood sheathing but other roof sheathings such as oriented strand board (OSB), solid wood joints, or multilayered materials such as ZIP SYSTEM® Roof Sheathing. ZIP SYSTEM® is a registered trademark of J.M. Huber Corporation. Because the clamping structure of L-foot adapter body 57 is the same or similar as the clamping structure of L-foot adapter body 51 (FIG. 24) rail 12 can snap in or rotate into L-foot adapter body 57 as previously described.

Figure 35:
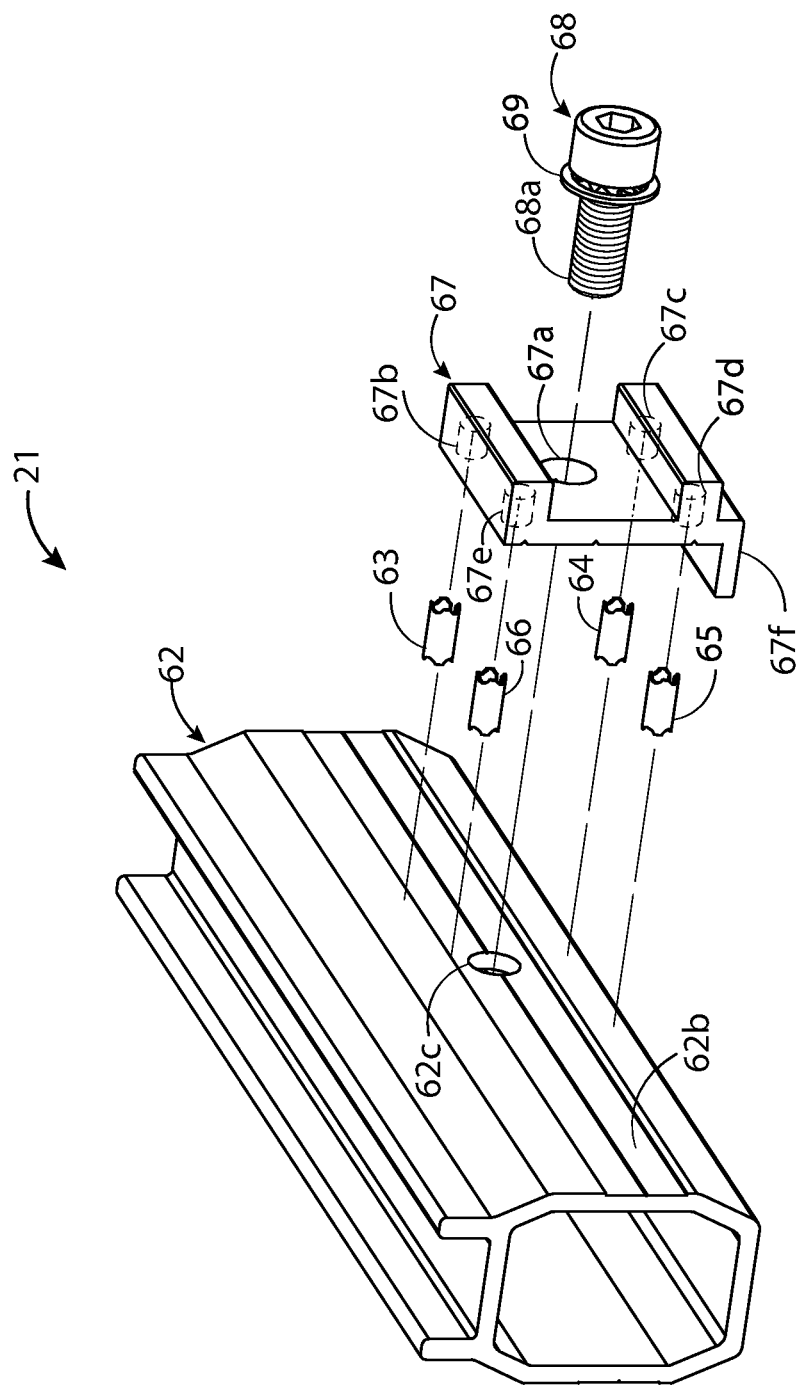
FIG. 35 illustrates, in exploded view isometric view, a rail splice assembly of the present disclosure that can engage the rail of FIG. 4.
Figure 36:
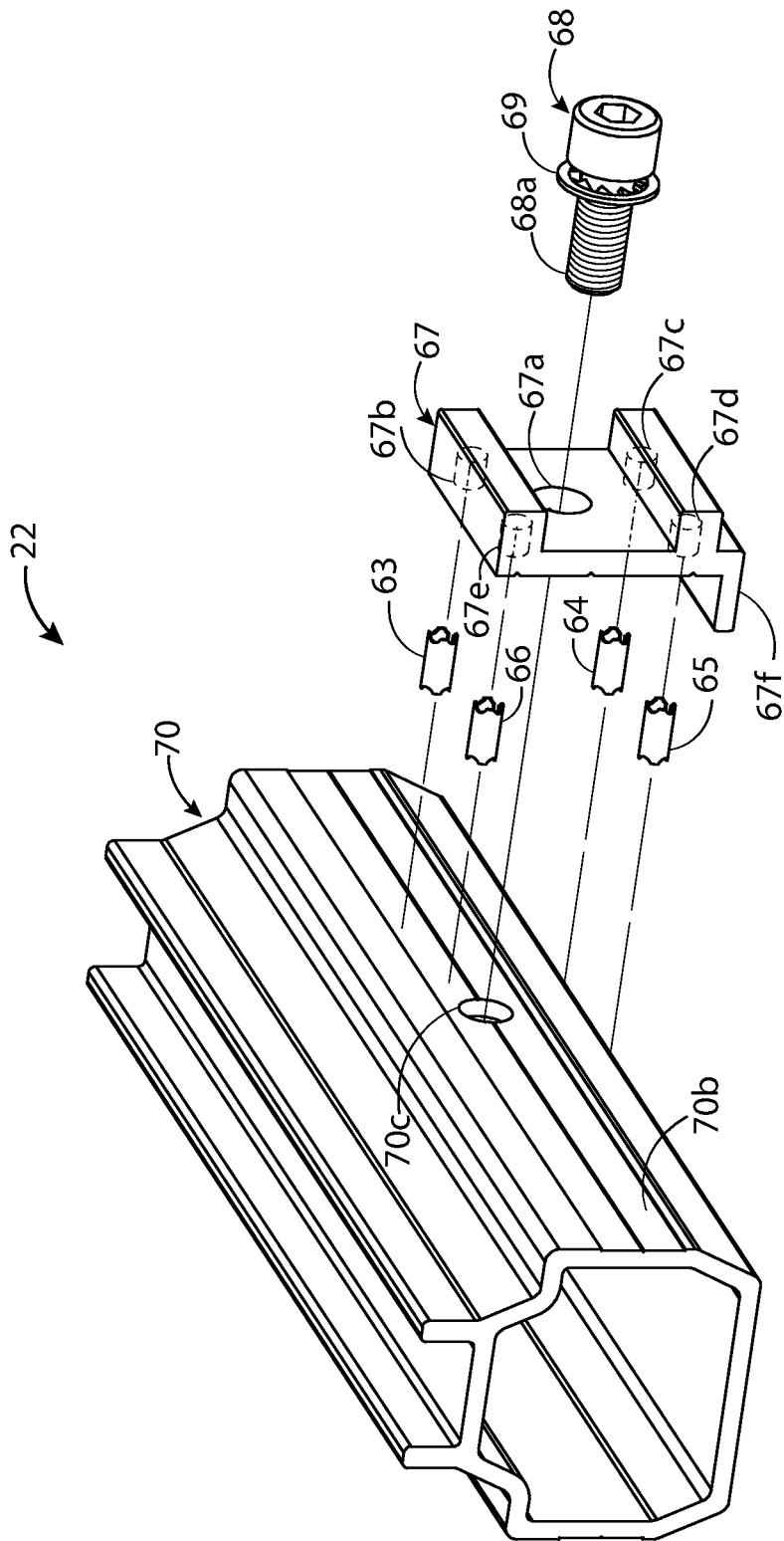
FIG. 36 illustrates, in exploded view isometric view, an alternative version of a rail splice assembly of the present disclosure that can engage the rail of FIG. 7.
Figure 38:
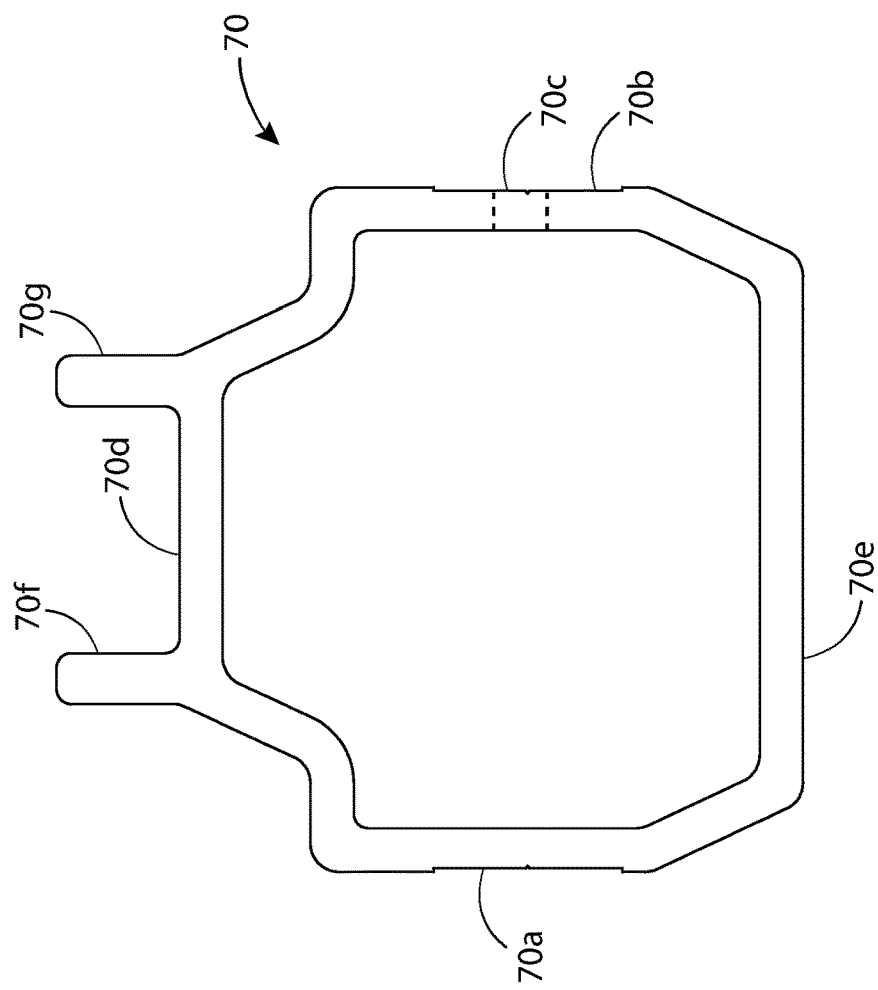
FIG. 38 illustrates, in side view, a rail splice of FIG. 36.
Figure 37:
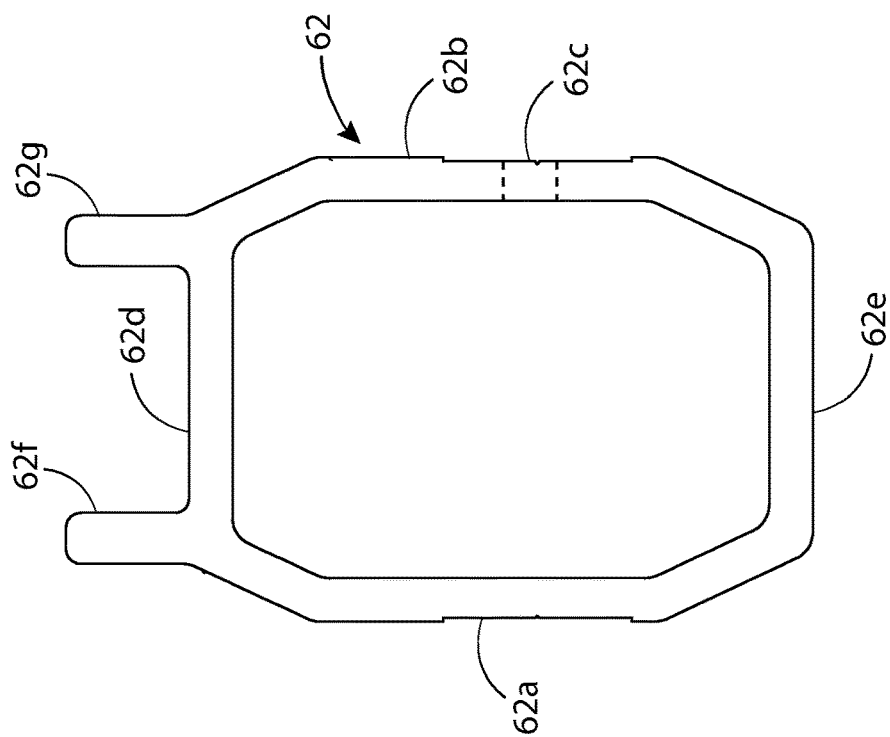
FIG. 37 illustrates, in side view, the rail splice of FIG. 35.

Rail 12 of FIG. 4 includes a hollow interior extending between rail side 12c and rail side 12d of the pair of rail sides. Similarly, rail 13 of FIG. 7 includes a hollow interior extending between rail side 13c and rail side 13d of the pair of rail sides. In FIG. 4, rail top 12e, rail side 12c, rail side 12d, rail slot 12h, and rail bottom 12i, form the perimeter boundary of the hollow interior of rail 12. In FIG. 7, rail top 13e, rail side 13c, rail side 13d, rail slot 13h, and rail bottom 13i, form the perimeter boundary of the hollow interior of rail 13. The hollow interiors of rail 12 and rail 13 have no internal support structure allowing for other structures to slide into rail 12 and rail 13. Two examples of structures that can slide into hollow rails are rail splice assembly 21 of FIG. 35 and rail splice assembly 22 of FIG. 36. Rail splice assembly 21 of FIG. 35 is sized and shaped to slide into rail 12 of FIG. 4. Rail splice assembly 22 of FIG. 36 is sized and shaped to slide into the rail 13 of FIG. 7. FIG. 37 illustrates the shape of rail splice body 62. FIG. 38 illustrates the shape of rail splice body 70. Referring to FIG. 37, rail splice body 62 includes sidewall 62a, sidewall 62b, and aperture 62c. Sidewall 62a and sidewall 62b extend downward from opposite sides of top wall 62d to a bottom wall 62e. Rail splice body 62 optionally includes projected portion 62f and projected portion 62g extending upward from opposite ends of top wall 62d. Referring to FIG. 42, sidewall 62a and sidewall 62b are sized and shaped to allow rail splice body 62 to slide within rail 12. Projected portion 62f and projected portion 62g can optionally provide additional structural support.

Referring to FIG. 38, rail splice body 70 includes sidewall 70a, sidewall 70b, and aperture 70c. Sidewall 70a and sidewall 70b extend downward from opposite sides of top wall 70d to a bottom wall 70e. Rail splice body 70 optionally includes projected portion 70f and projected portion 70g extending upward from opposite ends of top wall 70d. Sidewall 70a and sidewall 70b are sized and shaped to allow rail splice body 70 to slide within rail 13 of FIG. 7. Projected portion 70f and projected portion 70g can optionally provide additional structural support.

Referring to FIG. 35, rail splice assembly 21 includes rail splice body 62, bonding pin 63, bonding pin 64, bonding pin 65, bonding pin 66, splice bracket 67, threaded fastener 68, and optionally, washer 69. Referring to FIG. 36, rail splice assembly 22 includes rail splice body 70, and can also include bonding pin 63, bonding pin 64, bonding pin 65, bonding pin 66, splice bracket 67, threaded fastener 68, and optionally, washer 69. The difference between rail splice assembly 21 of FIG. 35 and rail splice assembly 22 of FIG. 36, is rail splice body 62 (FIG. 35) and rail splice body 70 (FIG. 36). Referring to FIGS. 35 and 36, the other components can be common to rail splice assembly 21 (FIG. 35) and rail splice assembly 22 (FIG. 36). In FIGS. 35 and 36, splice bracket 67 includes aperture 67a sized to receive and pass through a portion of threaded fastener body 68a. In FIG. 35, threaded fastener body 68a threadedly engages aperture 62c located in sidewall 62b of rail splice body 62. In FIG. 36, threaded fastener body 68a threadedly engages aperture 70c located in sidewall 70b of rail splice body 70. Referring to FIGS. 35 and 36, bonding pin 63, bonding pin 64, bonding pin 65, and bonding pin 66 are seated in blind hole 67b, blind hole 67c, blind hole 67d, and blind hole 67e, respectively, in splice bracket 67. Note that number of bonding pins and blind holes can be more or less than those shown. This can be determined by the bonding requirements and electrical conductivity of the material used. Splice bracket 67 can include a foot 67f that projects inward toward rail splice body 62 (FIG. 35) and rail splice body 70 (FIG. 36) from the bottom of splice bracket 67. Referring to FIG. 42, foot 67f is positioned to engage bottom of rail 12 and stabilize splice bracket 67 as it is tightened to rail 12.

Figure 39:
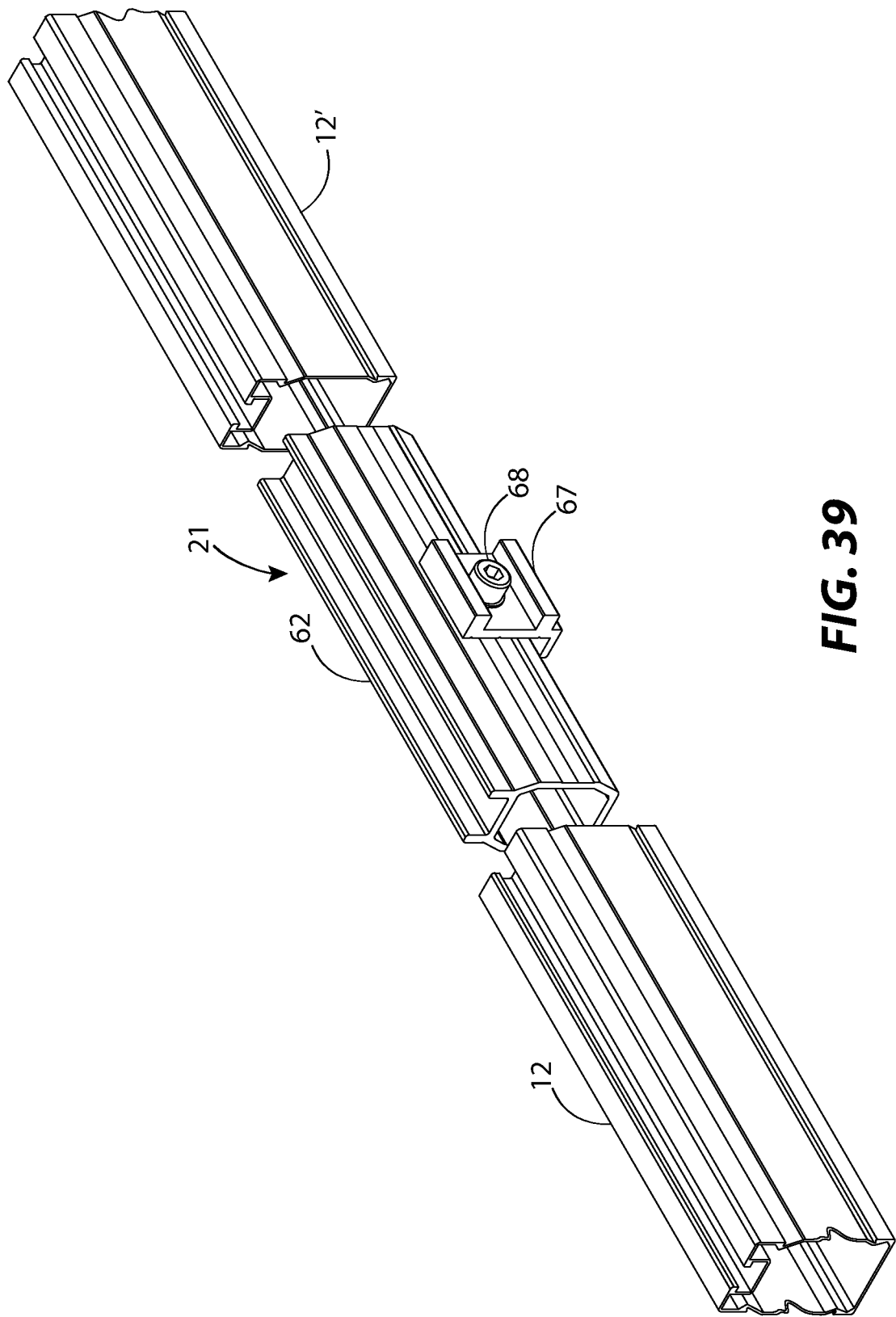
FIG. 39 illustrates, in isometric view, two rails exploded away from the rail splice assembly.
Figure 40:
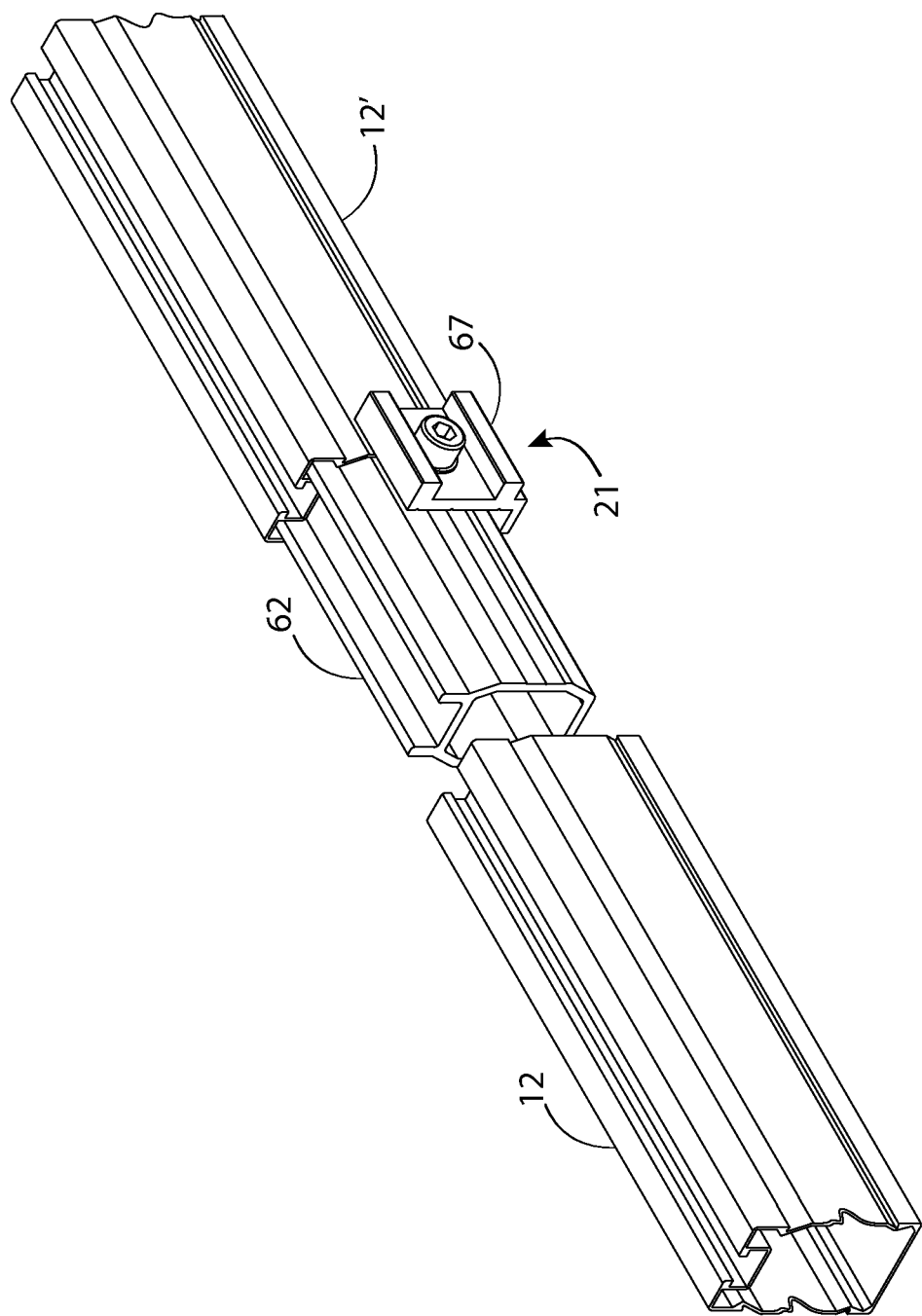
FIG. 40 illustrates, in isometric view, the rails and rail splice assembly of FIG. 39 with one of the rails secured to the rail splice assembly.

FIGS. 39-41 show a typical assembly sequence of multiple rails using rail splice assembly 21. In FIG. 39 rail splice assembly 21 is placed between rail 12 and rail 12'. Threaded fastener 68 is not fully tightened, but left loose enough to allow rail 12 and rail 12' to engage rail splice body 62, slide past splice bracket 67 and slide past bonding pin 63, bonding pin 64, bonding pin 65, and bonding pin 66. Bonding pin 63, bonding pin 64, bonding pin 65, and bonding pin 66 are hidden from view in FIG. 39 but shown in FIG. 35. In FIG. 40, rail splice body 62 is partially slid into the interior of rail 12'. Rail 12' is slid under splice bracket 67, bonding pin 63, and bonding pin 64. Bonding pin 63 and bonding pin 64 are hidden from view in FIG. 40 but shown in FIG. 35. Continuing to refer to FIG. 40, rail 12 remains unengaged with rail splice assembly 21. In FIG. 41, rail 12 and rail 12' are both assembled together. Rail splice body 62 is partially slid into the interior of rail 12. Rail 12 is slid under splice bracket 67 and bonding pin 65 and bonding pin 66. Bonding pin 65 and bonding pin 66 are hidden from view but shown in FIG. 35. Referring to FIGS. 41 and 42, tightening of threaded fastener 68 will clamp splice bracket 67 to rail 12 and rail 12' to rail splice body 62 and create a structurally rigid structure. Bonding pins, not shown, will press against the rail and create an electrical path between rail 12, rail 12', and splice bracket 67. Referring to FIG. 35, the electrical path is created because bonding pin 63, bonding pin 64, bonding pin 65, and bonding pin 66 have sharpened ends on both sides. This allows them to penetrate the oxide layer of blind hole 67b, blind hole 67c, blind hole 67d, and blind hole 67e and to penetrate the paint, finish coat, or oxide layer of rail 12 and rail 12' of FIG. 39 in order to create an electrically conductive path.

The discussion of FIGS. 10, 12-14, 17, 18, and 20 demonstrated how various panel clamps interact with rail 12 and how they are secured to rail 12. These panel clamps will now be discussed in more detail.

End clamp 25, end clamp 26, mid clamp 27, and mid clamp 28 of FIGS. 43, 44, 45, and 46, respectively can share common components. End clamp 25, end clamp 26, mid clamp 27, and mid clamp 28 of FIGS. 43, 44, 45, and 46, respectively can include clamp body 38, bonding block 43, bonding pin 44 and bonding pin 45, threaded fastener 49, and optionally, lock washer 71. Lock washer 71 is illustrated as an internal tooth lock washer, but other types of lock washers can be readily used; for example, external tooth lock washers, split ring lock washers, or high collar lock washers. Threaded fastener 49 threadedly engages threaded aperture 38o in the clamp body 38. FIG. 47 illustrates threaded aperture 38o of clamp body 38 in more detail.

Figure 49:
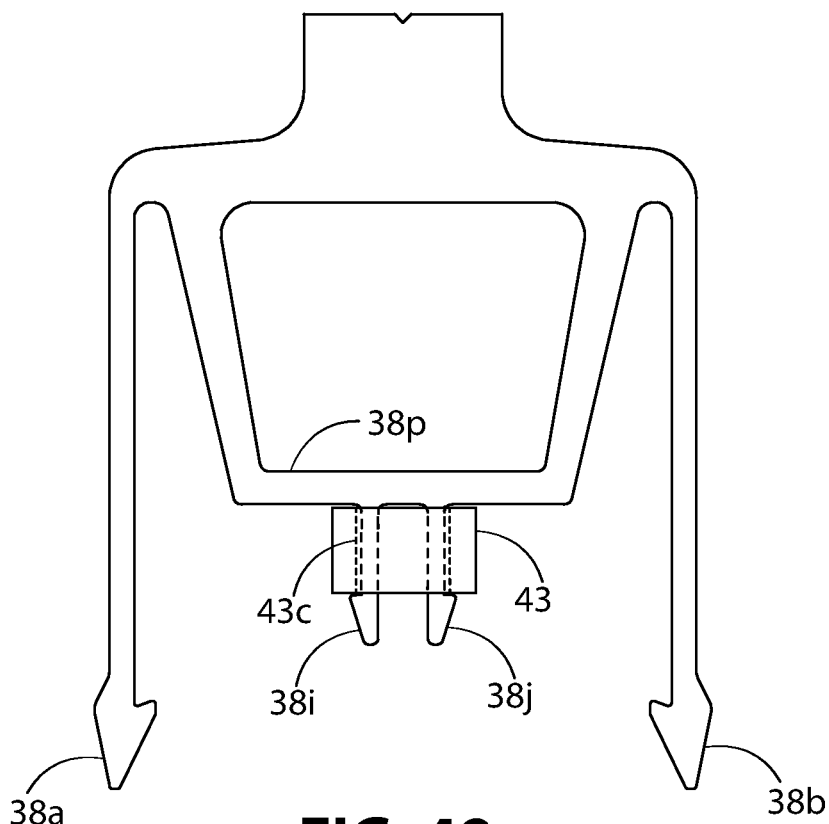
FIG. 49 illustrates, in side view, the body of FIG. 47 mounted together with the bonding block, with portions of the body hidden from view by the bonding block are illustrated as dashed lines.

Referring again to FIGS. 43-46, bonding pin 44 and bonding pin 45, pass into apertures 43a, 43b, respectively, in bonding block 43. In addition, bonding block 43 includes aperture 43c that engages spring clip 38i and spring clip 38j projecting downward from clamp body 38. Referring to FIG. 47, spring clip 38i and spring clip 38j project downward from the bottom of support truss 38p of clamp body 38. Referring to FIG. 49, spring clip 38i and spring clip 38j are approximately centered between clamping portion 38a and clamping portion 38b so that bonding block 43 will align and rest within a rail slot. Bonding block 43 is shown positioned within rail slot 12h in FIGS. 51-55.

Figure 48:
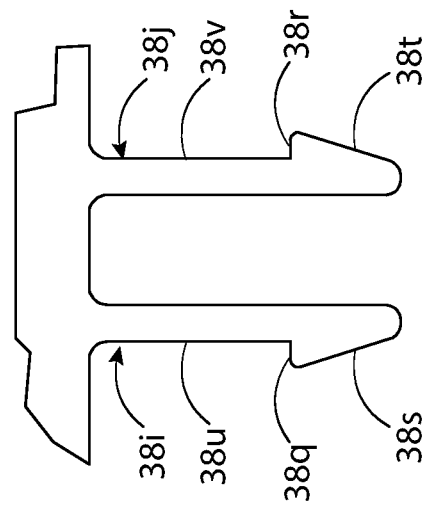
FIG. 48 illustrates, in side view, a portion of the body of FIG. 47 enlarged magnify the bonding block mounting portion.
Figure 50:
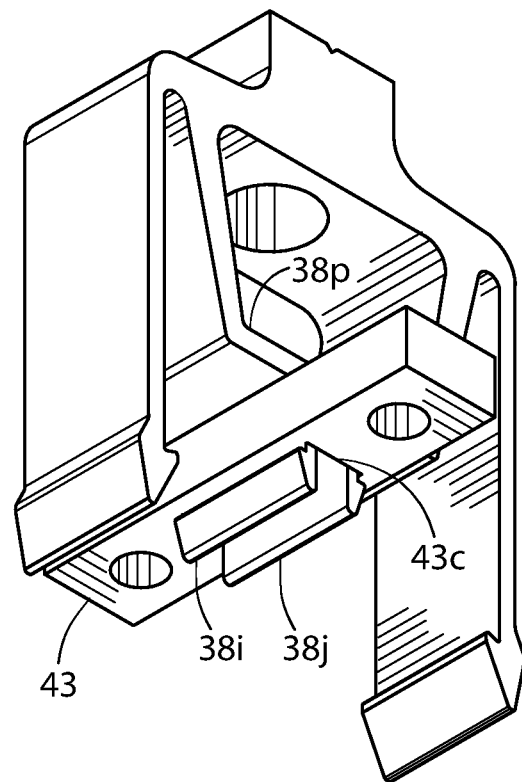
FIG. 50 illustrates, in bottom isometric view, the body and the bonding block of FIG. 49.

Referring to FIG. 48, spring clip 38i and spring clip 38j can be seen in more detail. Spring clip 38i includes first portion 38q and second portion 38s. Spring clip 38j includes first portion 38r and second portion 38t, respectively. First portion 38q and first portion 38r project outward away from spring clip sides 38u and spring clip sides 38v respectively. They are illustrated as projecting outward approximately perpendicularly from spring clip sides 38u and spring clip sides 38v. Referring to FIGS. 49 and 50, an optionally planar bottom of bonding block 43 allows spring clip 38i and spring clip 38j to rest flatly against the bottom of the bonding block 43. First portion 38q and first portion 38r can project out at other angles; for example, to match a non-planar bottom surface of bonding block 43. Referring back to FIG. 48, second portion 38s and second portion 38t slope downward and inward from the end of first portion 38q and first portion 38r, respectively. Referring again to FIGS. 49 and 50, this "barbed shape" of spring clip 38i and spring clip 38j allow them to be pushed into and through aperture 43c and then spring out after being pushed through to prevent removal. Once bonding block 43 is held captive by spring clip 38i and spring clip 38j, the bottom of support truss 38p prevents upward movement of bonding block 43.

Figure 51:
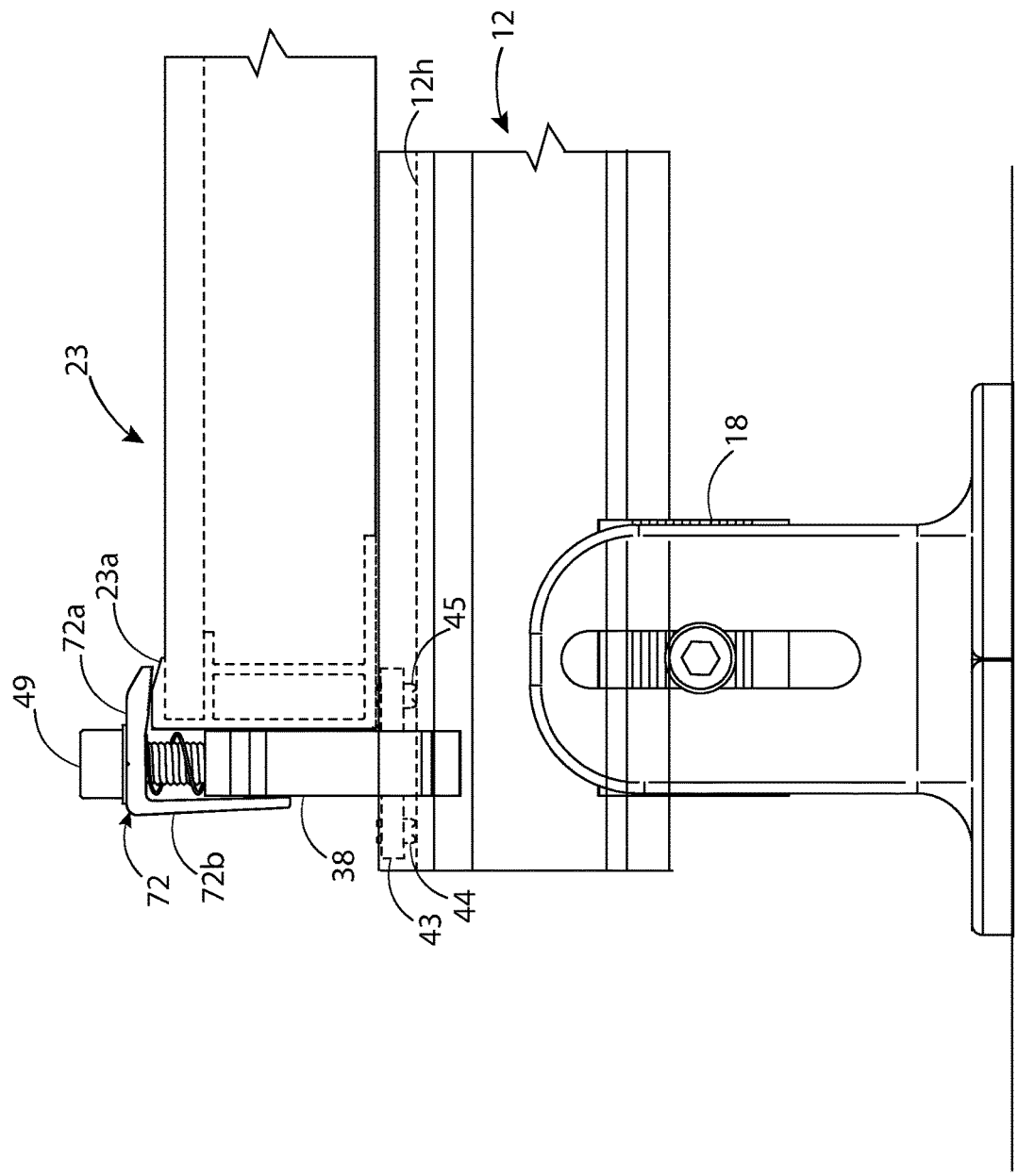
FIG. 51 illustrates, in front view, the end clamp of FIG. 43 securing a solar panel to a rail, with dashed lines representing hidden lines.
Figure 52:
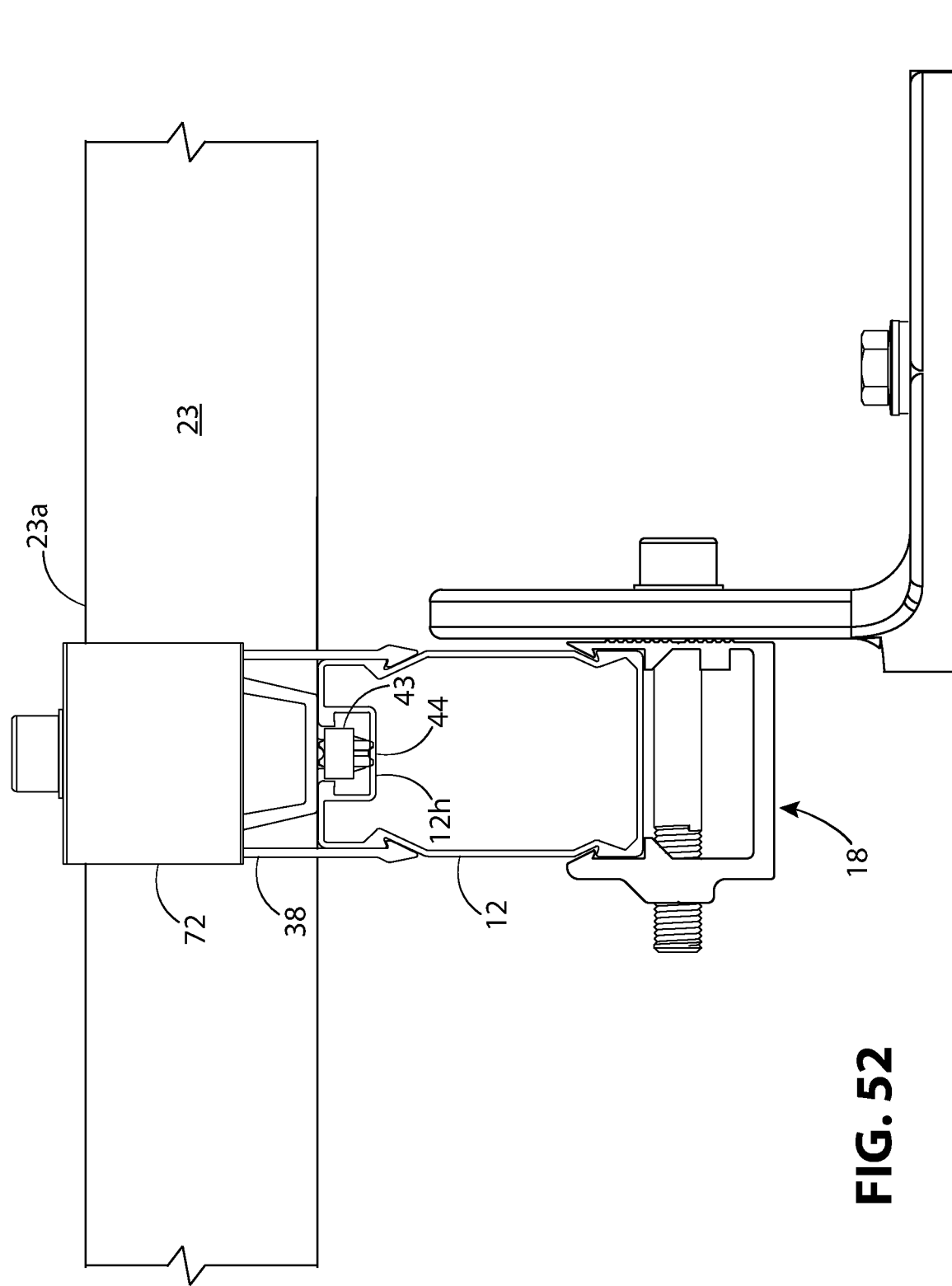
FIG. 52 illustrates, in side view, of FIG. 51.

As demonstrated by the preceding paragraphs, the panel clamps of FIGS. 43-46 share a common set of parts. Now we will discuss how these are applied in a solar PV system and also point out the differences between the panel clamps. End clamp 25 in FIG. 43 and end clamp 26 in FIG. 44 both include clamping member 72. Referring to FIGS. 51 and 52, clamping member 72 is sized and shaped to engage the top of frame 23a of solar panel 23, engage clamp body 38, and clamp solar panel 23 to rail 12. Referring to FIG. 51, tightening of threaded fastener 49 presses upper section 72a of clamping member 72 against the top of frame 23a. Clamping member 72 can tend to rotate backward toward clamp body 38 as it is tightened. Lower section 72b of clamping member 72, which extends downward from upper section 72a, will engage clamp body 38 and stabilize. As threaded fastener 49 is tightened, bonding pin 44 and bonding pin 45 are pressed against rail slot 12h, bonding pin 44 and bonding pin 45 break through the oxide or paint layer, and create an electrical bond between frame 23a of solar panel 23 and rail 12. In FIG. 52, bonding pin 44 is shown pressing against rail slot 12h and frame 23a of solar panel 23.

Figure 43:
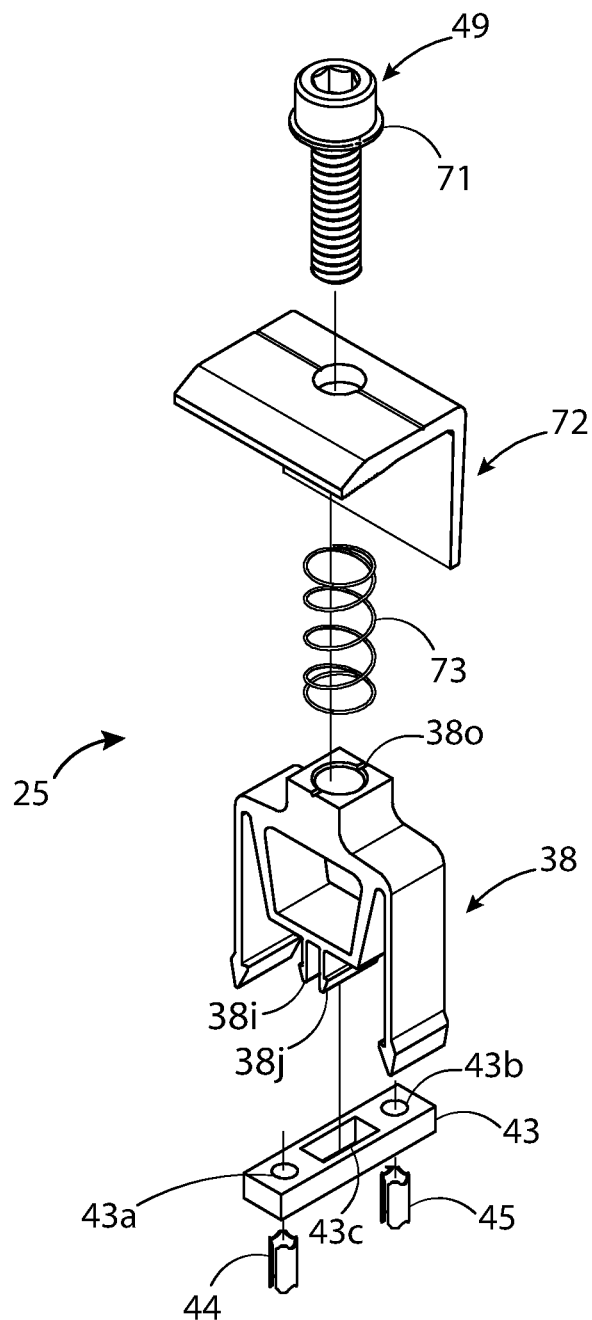
FIG. 43 illustrates, in exploded and isometric view, an end clamp of the present disclosure for mounting solar panels in portrait mode.
Figure 44:
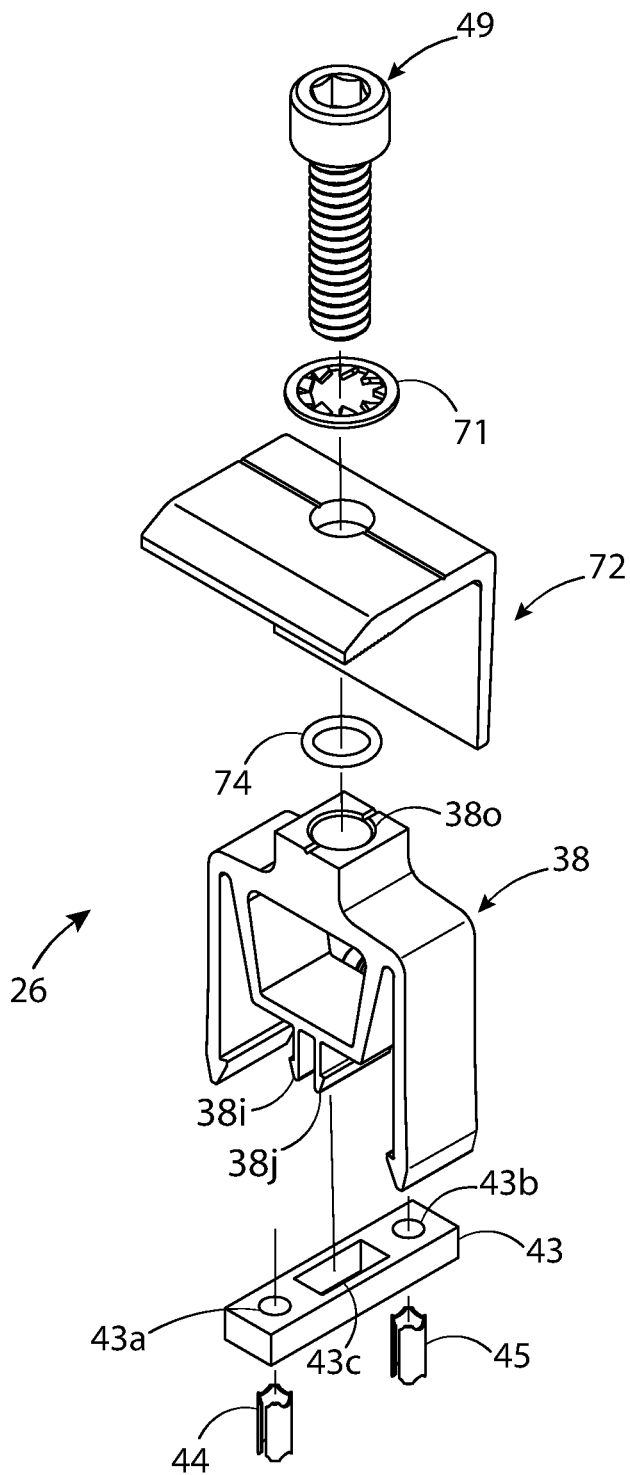
FIG. 44 illustrates, in exploded and isometric view, the end clamp of FIG. 43 where the spring is replaced by a washer.
Figure 45:
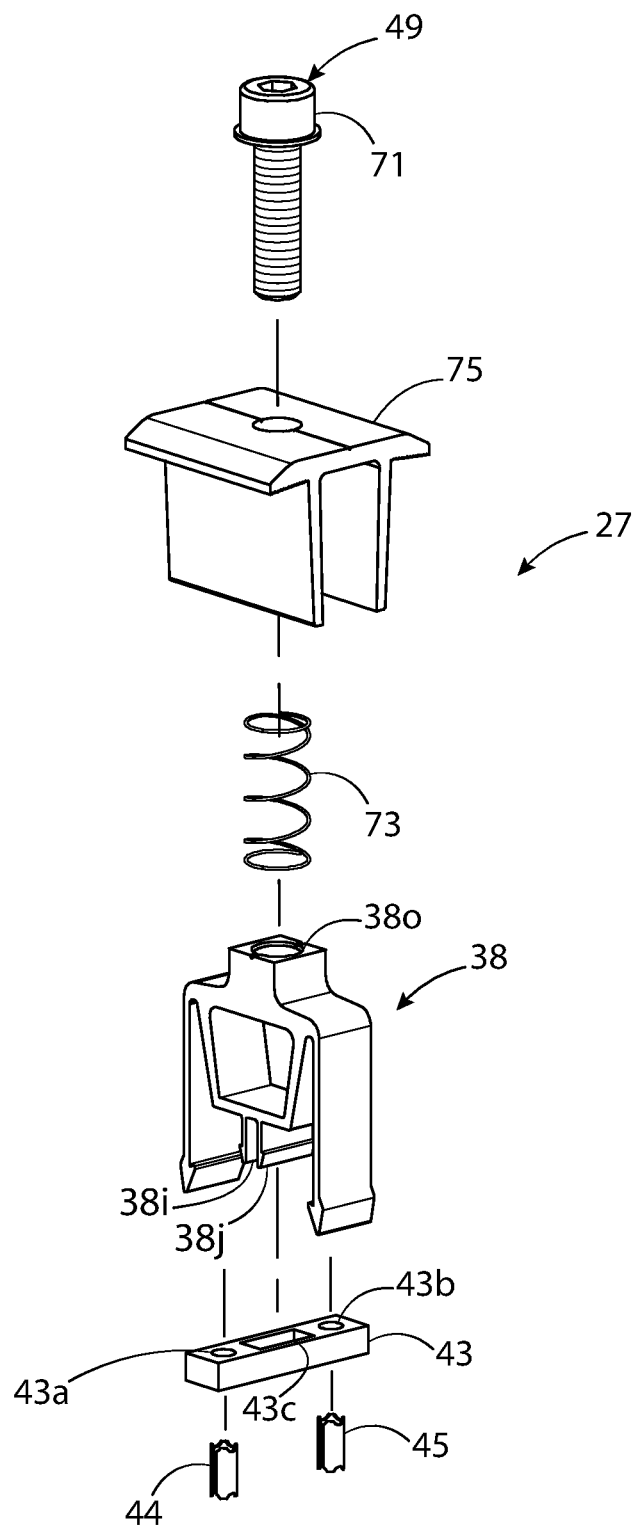
FIG. 45 illustrates, in exploded and isometric view, the mid clamp of the present disclosure for mounting solar panels in portrait mode.
Figure 53:
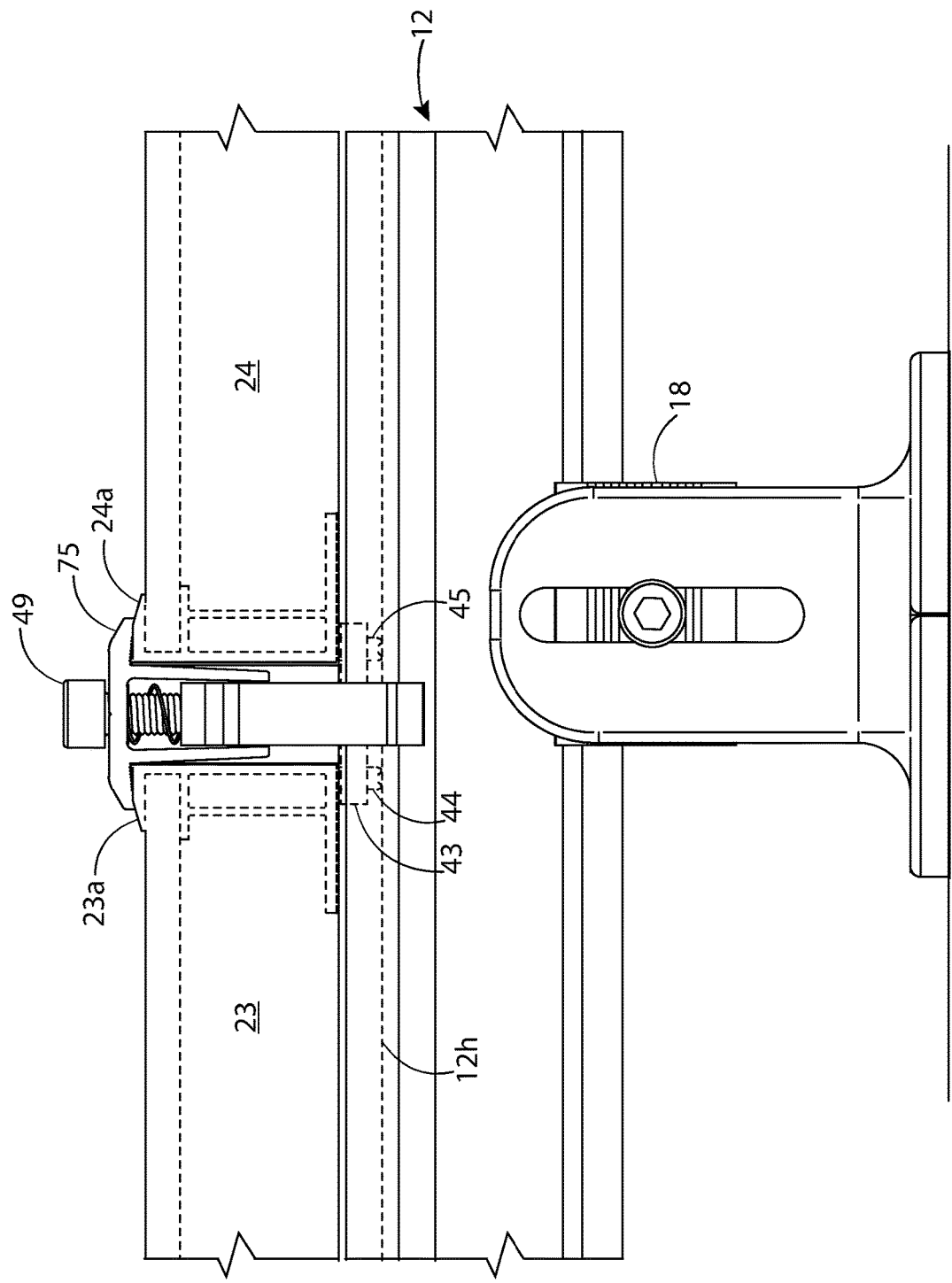
FIG. 53 illustrates, in front view, the mid clamp of FIG. 45 securing two solar panel to a rail with dashed lines representing hidden lines.
Figure 54:
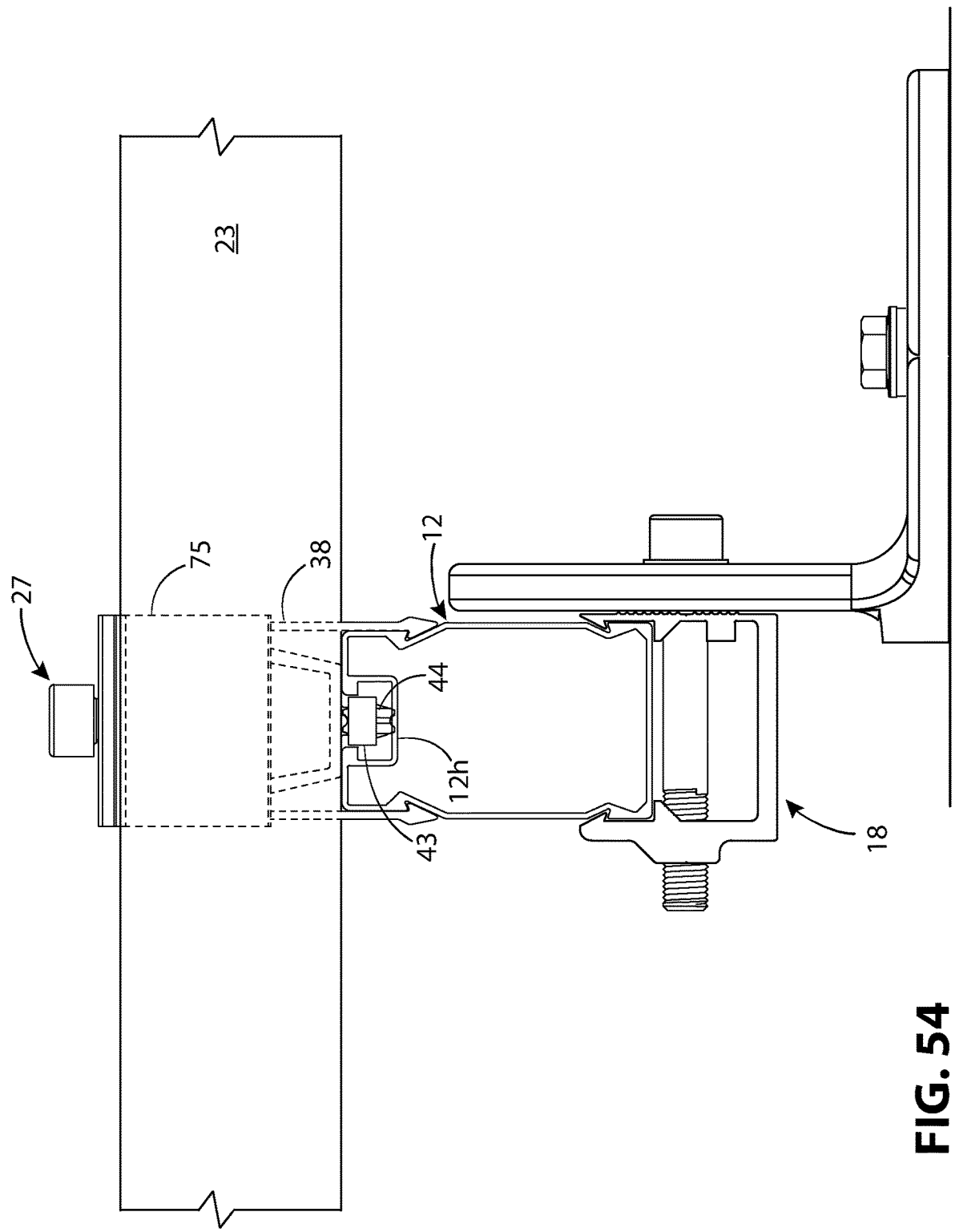
FIG. 54 illustrates, in side view, of FIG. 53 with dashed lines representing hidden lines.
Figure 55:
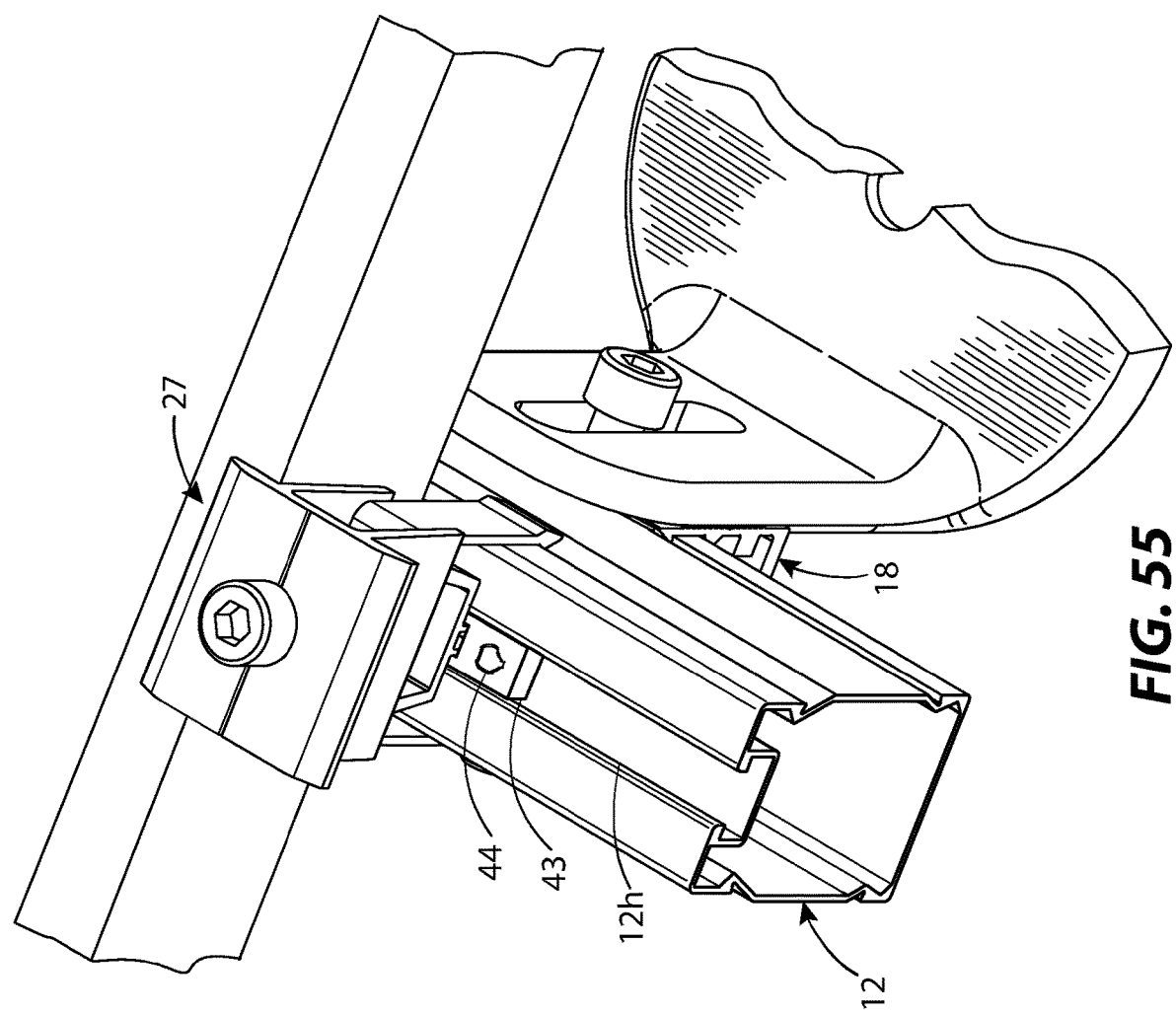
FIG. 55 illustrates, in top isometric view, a portion of the mid clamp of FIG. 53 with one of the solar panels removed to show the relationship between the mid clamp, the bonding block, bonding pins, and rail slot.

End clamp 26 of FIG. 43 and end clamp 26 of FIG. 44 can share the same elements expect a spring and washer. Washer 74 in end clamp 26 of FIG. 44 replaces spring 73 of end clamp 25 in FIG. 43. Mid clamp 27 of FIG. 45 and end clamp 25 of FIG. 43 share the same elements except for their clamping members. These shared elements include spring 73. Referring to FIG. 45, mid clamp 27 includes clamping member 75. Referring to FIG. 53, tightening of threaded fastener 49 causes clamping member 75 to bear down on frame 23a of solar panel 23 and frame 24a of solar panel 24. This in turn, presses down bonding block 43, presses frame 23a against bonding pin 44, presses frame 24a against bonding pin 45, and presses both bonding pins into rail slot 12h. This creating electrically bonding of frame 23a and frame 24a to rail 12. FIGS. 54 and 55, also show bonding pin 44 of mid clamp 27 engaging rail slot 12h of rail 12. In FIG.

54, clamp body 38 and portions of clamping member 75 are hidden behind solar panel 23 and represented by dashed lines.

Figure 46:
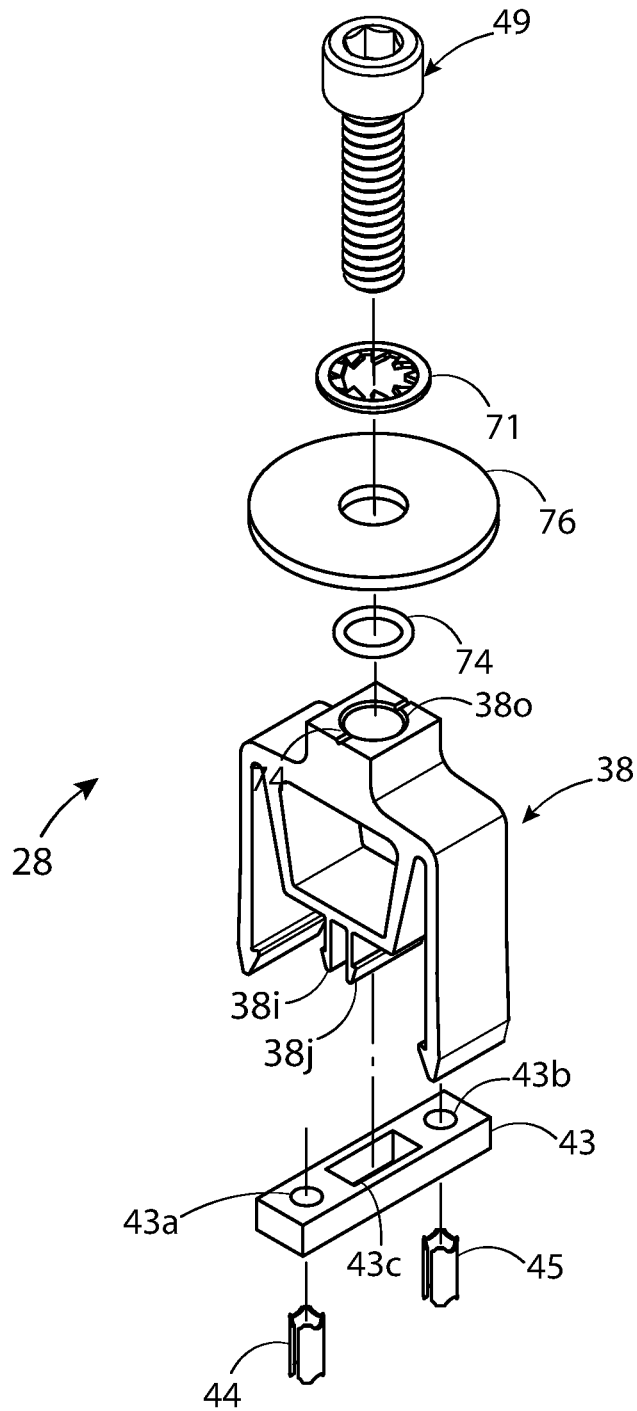
FIG. 46 illustrates, in exploded isometric view, an alternative version of the mid clamp for mounting solar panels in portrait mode.
Figure 47:
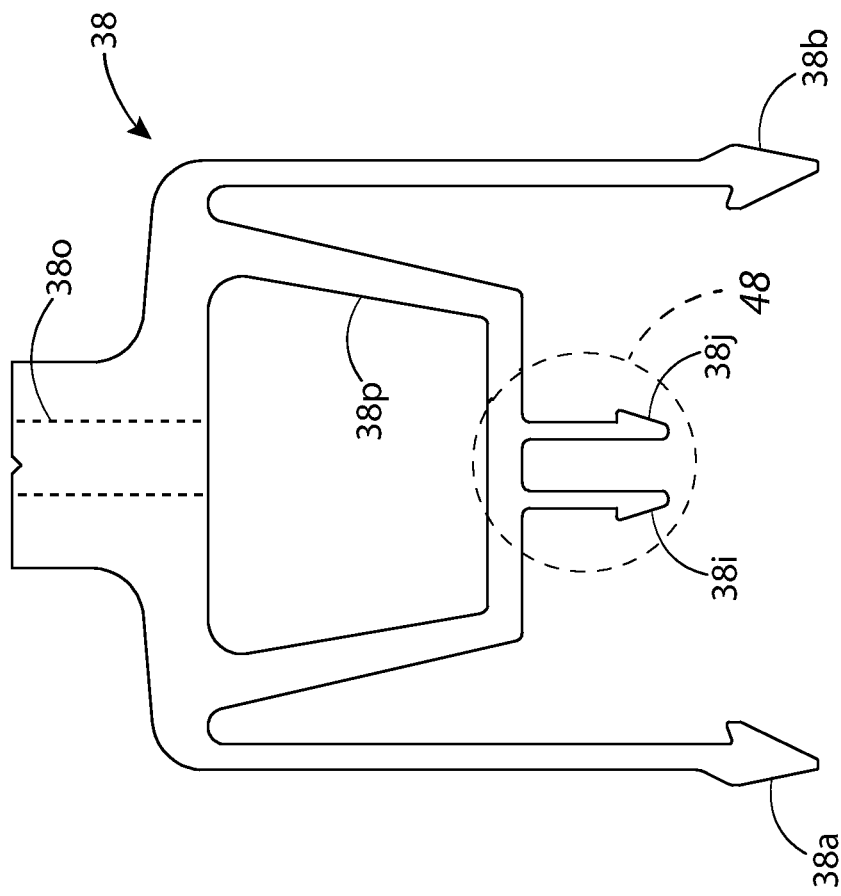
FIG. 47 illustrates, in side view, the body that is common to the end clamps and mid clamps FIGS. 43-46.
Figure 56:
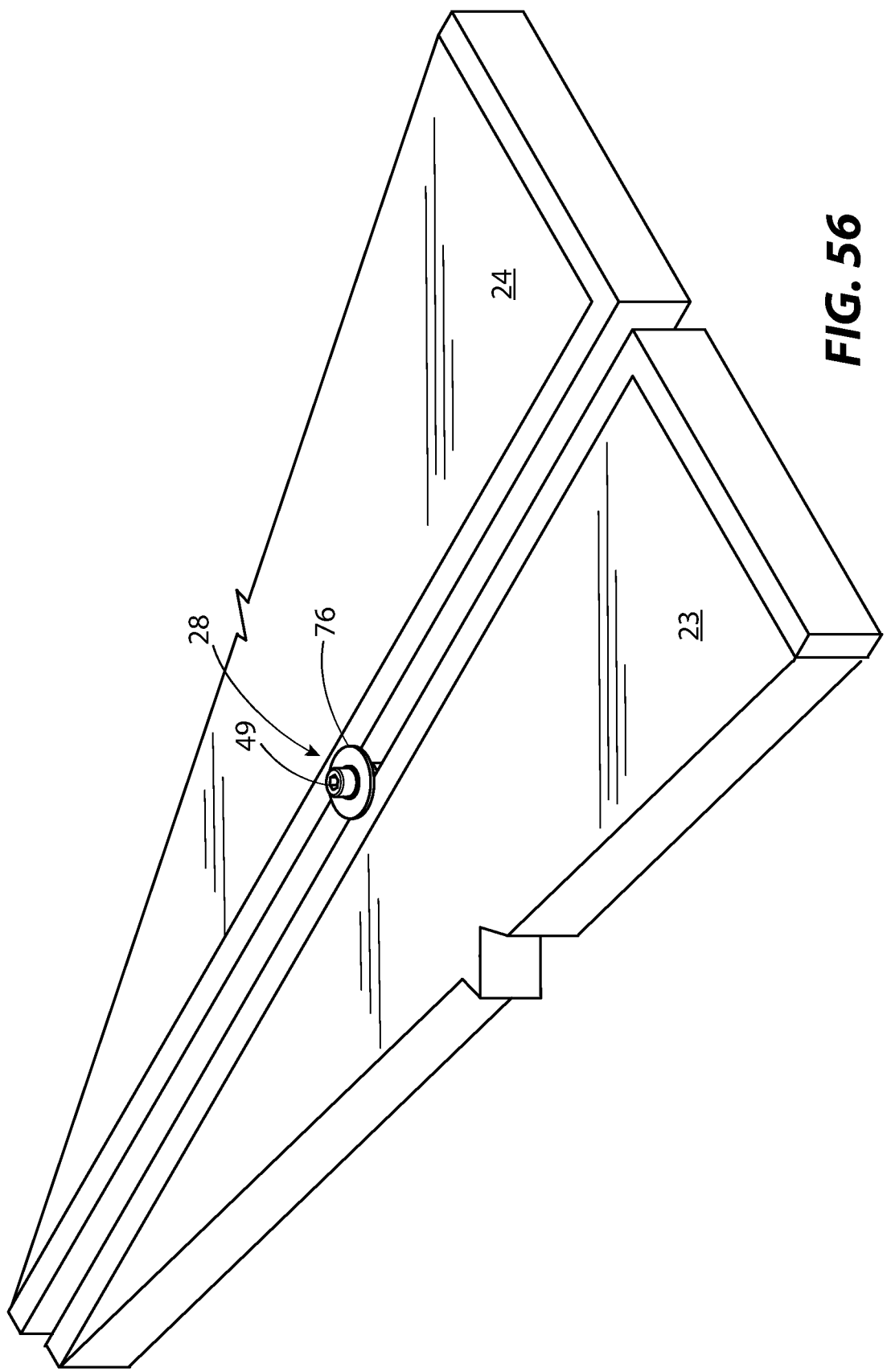
FIG. 56 illustrates, in top isometric view, portions of two adjacent solar panels where the solar panels are being secured to the rail by the mid clamp of FIG. 46.

Except for clamping member 72 of FIG. 44, mid clamp 28 of FIG. 46 shares the same elements as end clamp 26 of FIG. 44 including washer 74. Clamping member 76 is illustrated as a fender washer. Alternatively, the clamping member 76 can include serrated edges to create better grip against the top of the solar panel frame. Because clamping member 76 is circular, any rotation that may results from installation does not affect the final appearance or performance of clamping member 76. This can be helpful when using a torque driver or other power tool to install mid clamp 28. The resulting appearance of mid clamp 28 is illustrated in FIG. 56 where clamping member 76 and threaded fastener 49 can be seen and the remainder of mid clamp 28 is hidden below solar panel 23 and solar panel 24.

Figure 57:
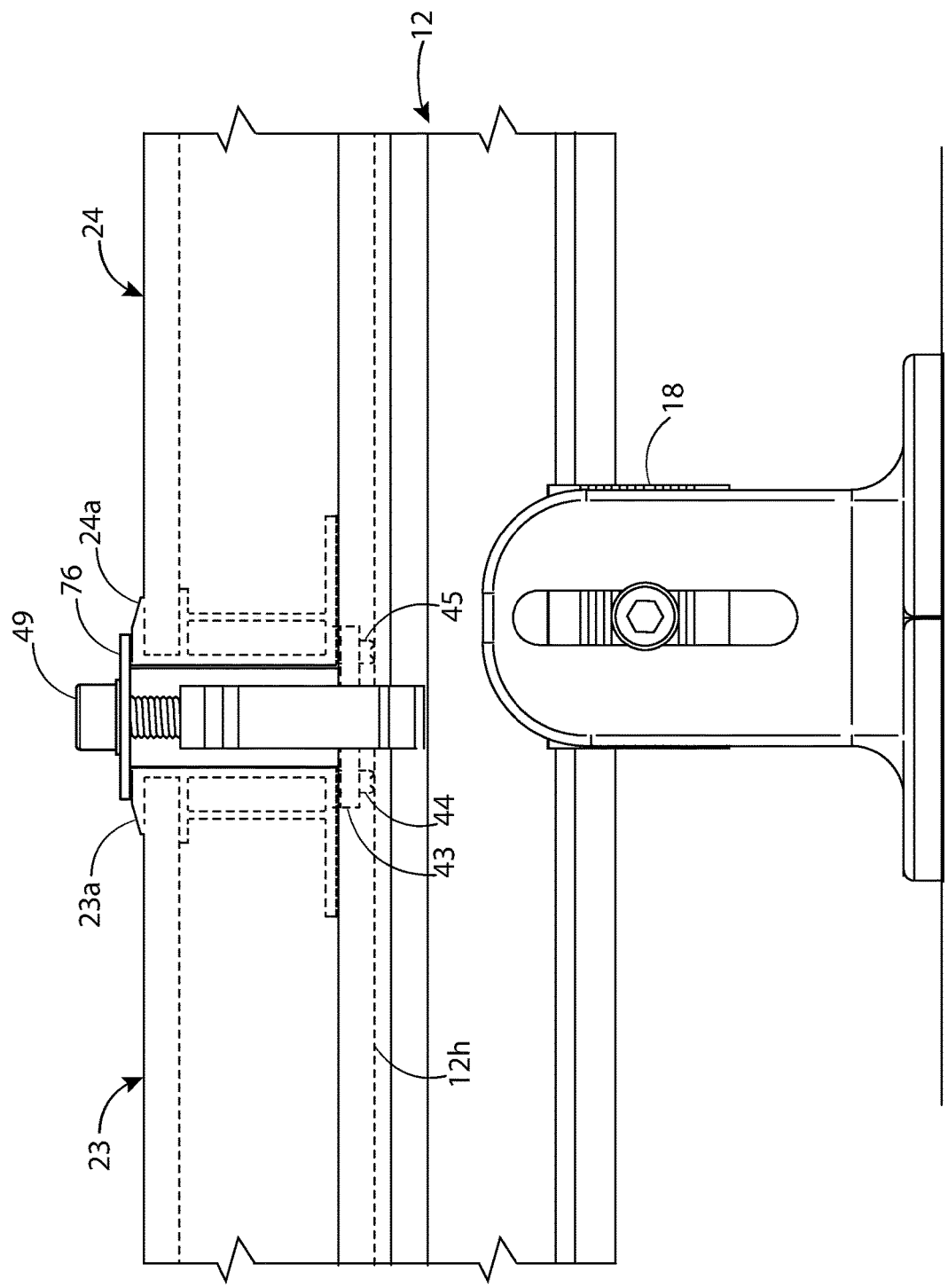
FIG. 57 illustrates, in front view, the mid clamp of FIG. 46 securing two solar panels to a rail, with dashed lines representing hidden lines.
Figure 58:
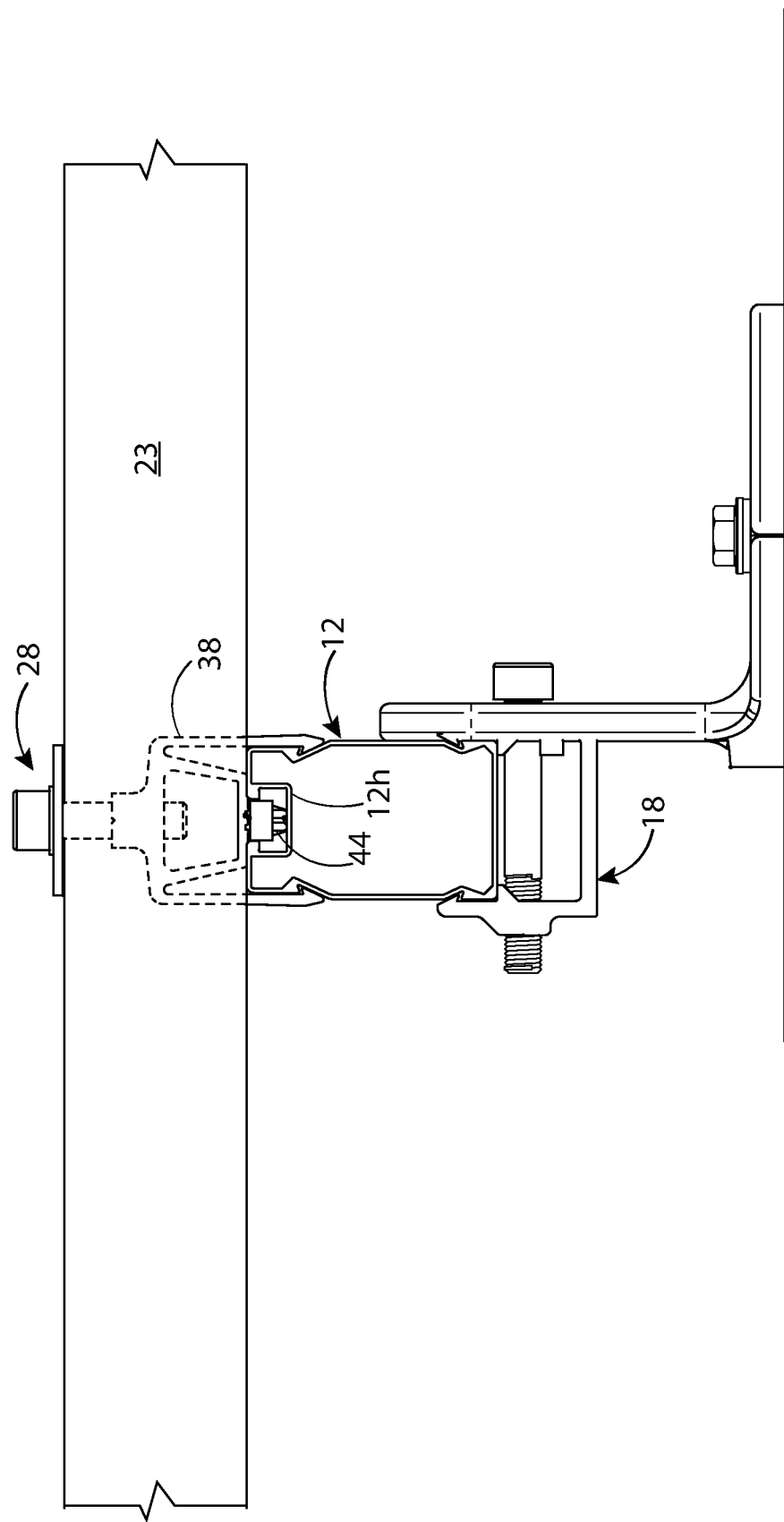
FIG. 58 illustrates, in side view, a portion of FIG. 57 with dashed lines representing hidden lines.

Referring to FIG. 57, clamping member 76 can clamp solar panel 23 and solar panel 24 to rail 12. Tightening of threaded fastener 49 causes clamping member 76 to bear down on frame 23a of solar panel 23 and frame 24a of solar panel 24. This in turn, presses the bottom of frame 23a and frame 24a against bonding block 43 causing bonding pin 44 to press into frame 23a, bonding pin 45 to press into frame 24a, and both bonding pin 44 and bonding pin 45 to press into rail slot 12h. Bonding pin 44 and bonding pin 45 break the paint or oxide layer of frame 23a, frame 24a, and rail slot 12h, to electrically bond solar panel 23 and solar panel 24 to rail 12. FIGS. 58 and 59, also show bonding pin 44 of mid clamp 28 engaging rail slot 12h of rail 12 as clamping member 76 bears down on frame 23a of solar panel 23. In FIG. 58, clamp body 38 is hidden behind solar panel 23 and represented by dashed lines. In FIG. 59, solar panel 23 is removed to show portions of mid clamp 28, clamping member 76, clamp body 38, bonding block 43, and frame 24a of solar panel 24 that would be otherwise hidden from view.

The clamping mechanism of bottom clamp 29 to the rail was discussed for FIGS. 13-17. We will now turn our discussion to bottom clamp 29 in more detail. Referring to FIG. 60, bottom clamp 29 can include clamping member 77, clamp body 39, threaded adjuster 79, pivoting body 80, tensioning band 81, and optionally, lock washer 82. Clamping member 77 can include aperture 77a that runs across and through clamping member 77. Clamp body 39 includes base 39e with side 39h and side 39i projecting upward from base 39e and spaced apart sufficiently to receive clamping member 77. Side 39h and side 39i include aperture 39j and aperture 39k, respectively. Aperture 39j and aperture 39k are sized to receive pivoting body 80. Pivoting body 80 passes through aperture 39j, 39k of base 39e and through aperture 77a of clamping member 77. Aperture 39j and aperture 39k can be aligned to position pivoting body 80 parallel to the plane of base 39e. Pivoting body 80 is illustrated as a partially threaded bolt. Threaded portion 80a threadedly engages aperture 39k. Head portion 80b of pivoting body 80 rests against side 39i. Aperture 77a of clamping member 77 is unthreaded to allow clamping member 77 to freely rotate about pivoting body 80. Pivoting body 80 can typically be a cylindrical member held captive between the side 39h and side 39i. For example, pivoting body 80 could be a cylindrical rod with apertures on opposing ends sized and shaped to receive cotter pins or dowel pins to hold the cylindrical rod to clamp body 39. As another example, pivoting body 80 could be a cylindrical rod threaded on both ends with an unthreaded portion in the middle for engaging clamping member 77. The threaded rod could be secured to side 39h and side 39i by nuts engaging the rod ends.

Figure 61:
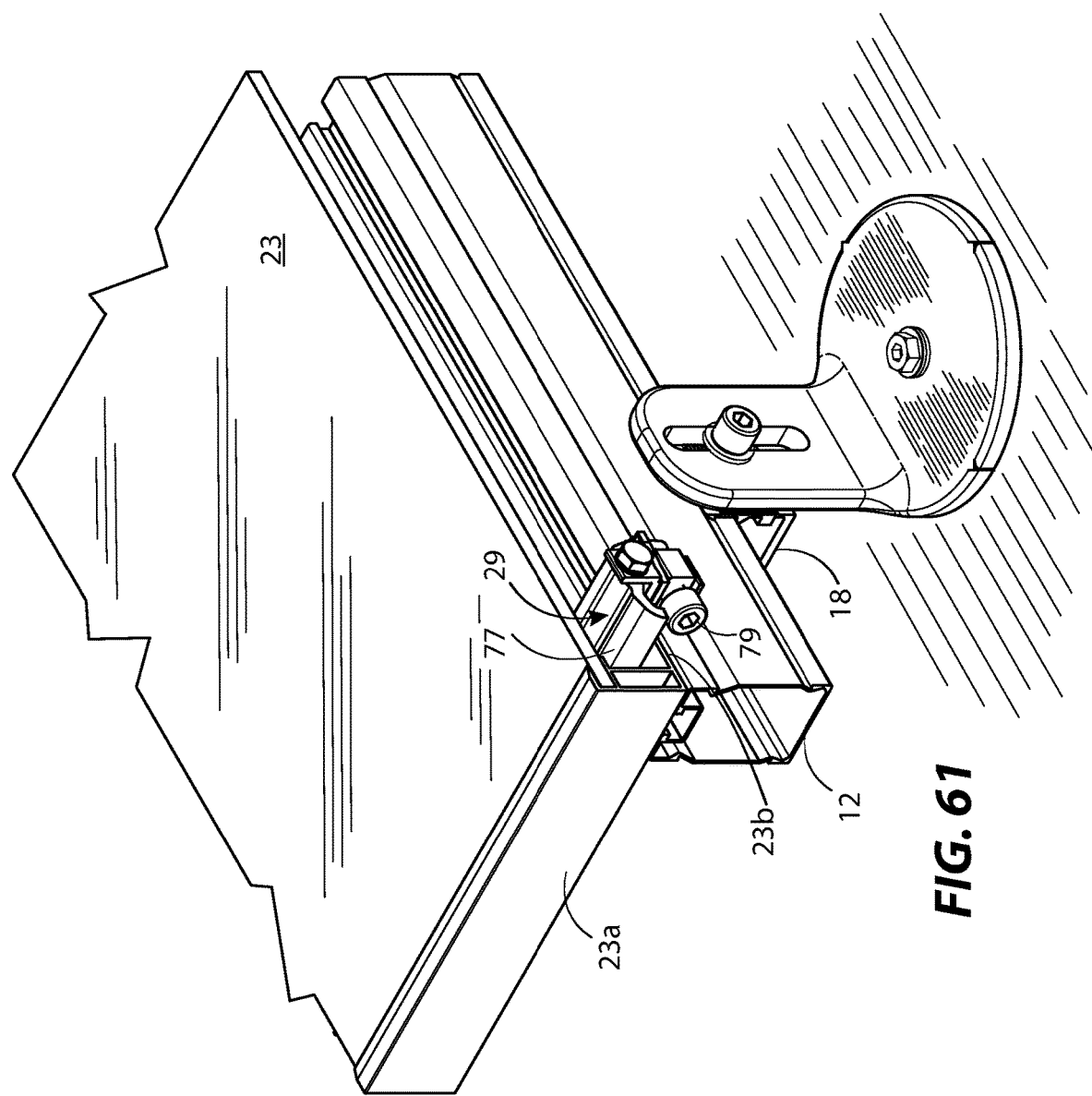
FIG. 61 illustrates, in isometric view a portion of solar PV system with the front of the solar panel cutaway along section lines 2-2 in FIG. 1, to reveal a bottom clamp of FIG. 60.
Figure 62:
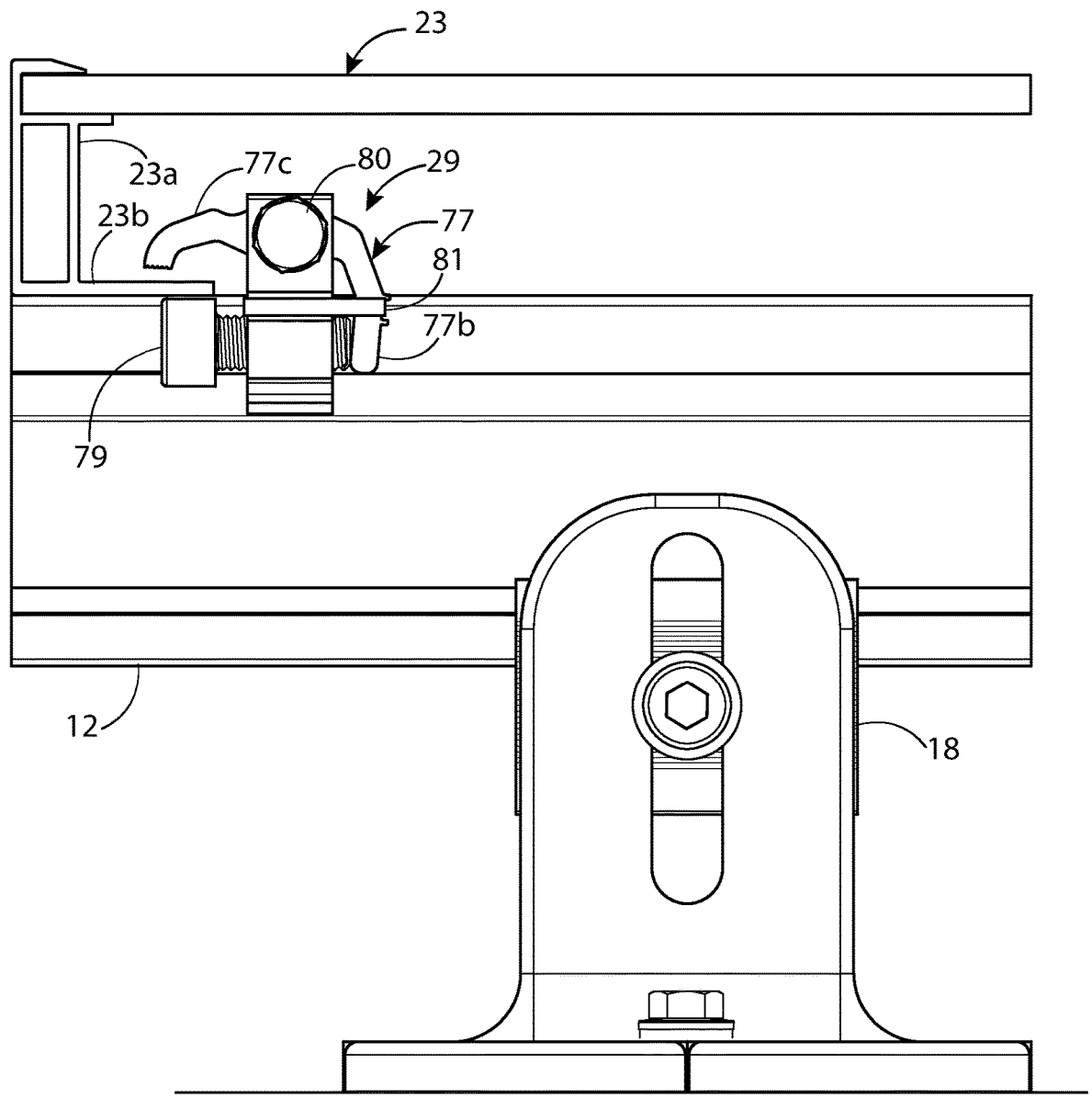
FIG. 62 illustrates, in front view, the portion of the solar PV system of FIG. 61 with the bottom clamp shown unclamped to the return frame to of the solar panel frame.
Figure 63:
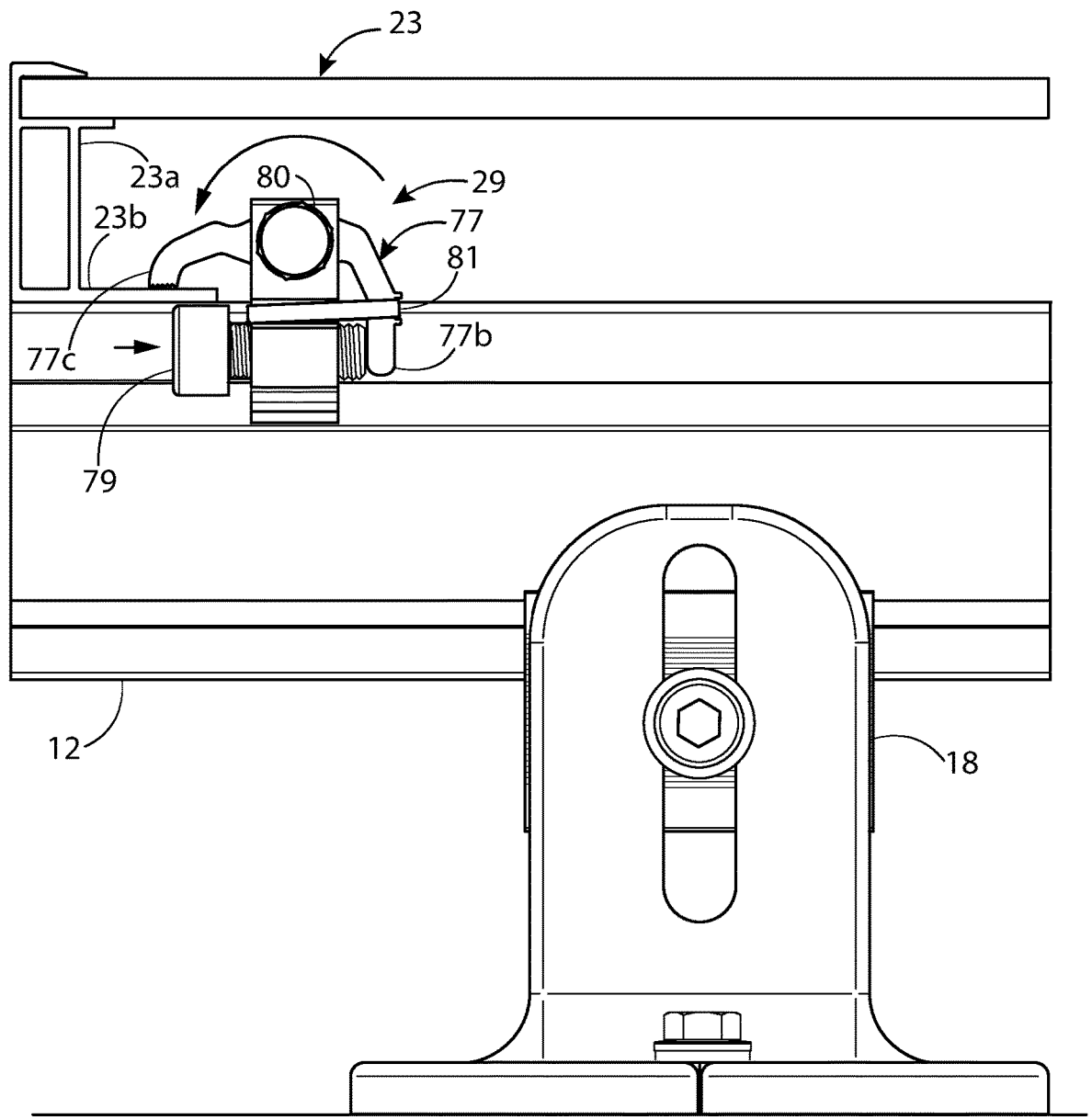
FIG. 63 illustrates, in front view, the portion of the solar PV system of FIG. 61 with the bottom clamp shown clamped to the return frame to of the solar panel frame.
Figure 64:
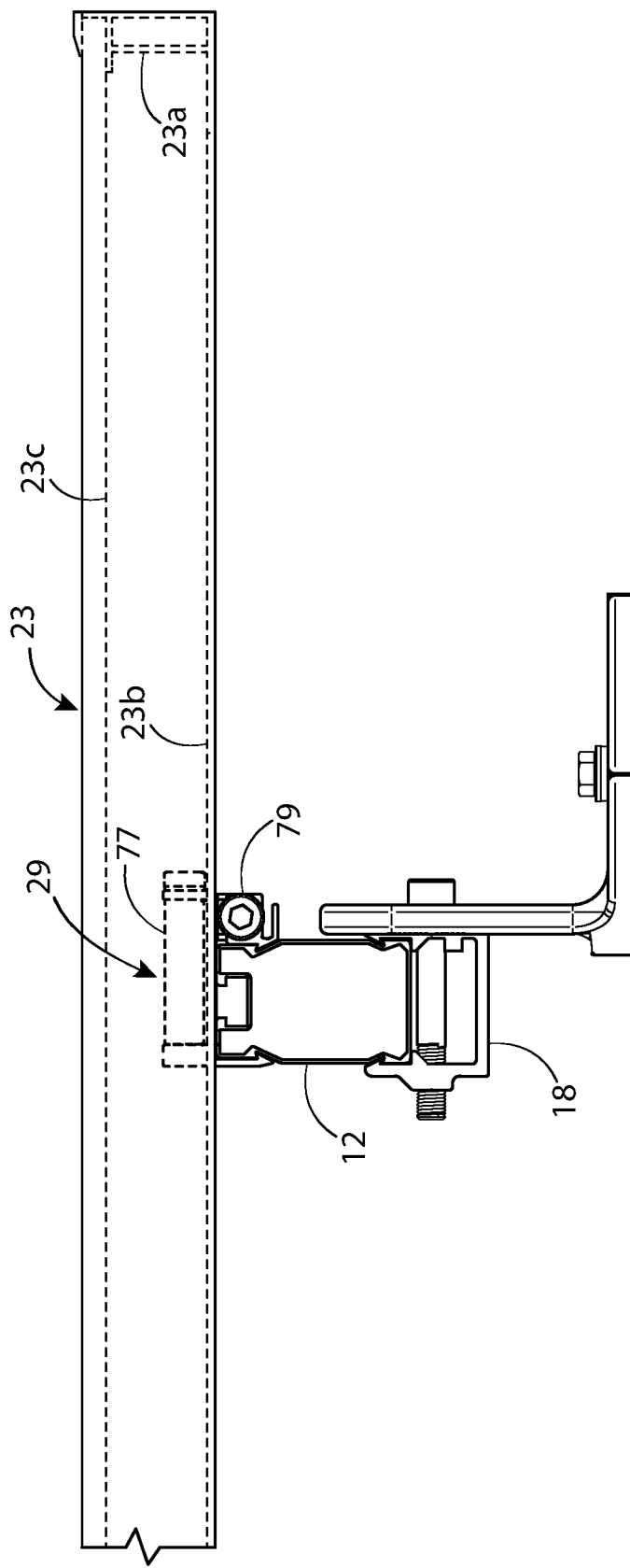
FIG. 64 illustrates, in side view, a portion of the solar PV system of FIGS. 61 63 extending to one end of the solar panel frame and with portions of the solar panel frame and the bottom clamp that are hidden from view illustrated in dashed lines.

Now we will discuss how the clamping member 77 clamps solar panel 23 to rail 12 in FIGS. 62 and 63. Referring to FIG. 60, threaded adjuster 79 threadedly engages aperture 39o and engages lower portion 77b of clamping member 77. Referring to FIGS. 62 and 63, as threaded adjuster 79 is rotated to engage lower portion 77b of clamping member 77, clamping member pivots about the pivoting body 80, upper portion 77c of clamping member 77 engages and clamps the return flange 23b of frame 23a of solar panel 23. Clamping pressure of clamping member 77 against return flange 23b clamps the return flange 23b to rail 12. Tensioning band 81 is optionally used to create spring tension between clamp body 39 and clamping member 77. In FIGS. 61 and 64, clamping member 77 similarly engages return flange 23b of frame 23a of solar panel 23 and clamping return flange 23b to rail 12.

One of the advantages of bottom clamp 29 of FIGS. 60-64 is that threaded adjuster 79 can be accessed from the side of the solar panel. Referring to FIGS. 61 and 64, threaded adjuster 79 is accessible under frame 23a of solar panel 23. The installer or service personnel can have clear access to threaded adjuster 79. In FIG. 64, return flange 23b, portions of frame 23a, and solar panel substrate 23c that are hidden from view are illustrated in dashed lines.

Figure 67:
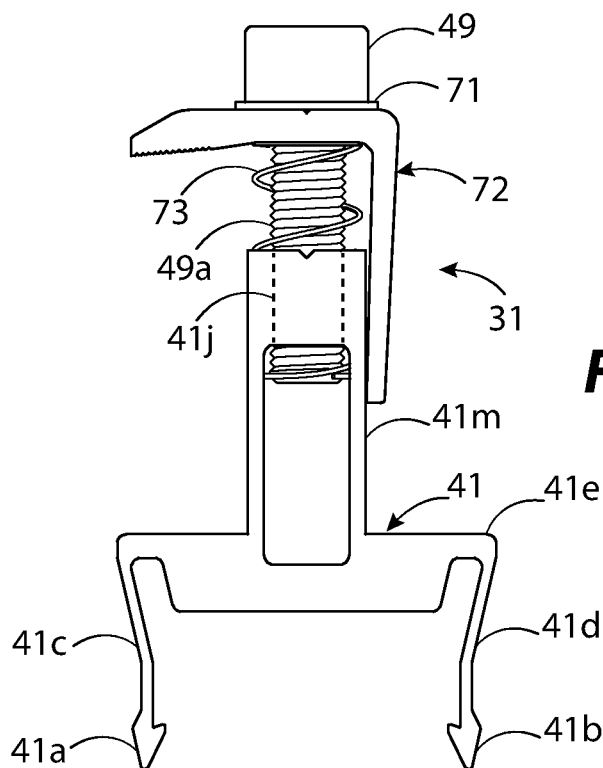
FIG. 67 illustrates, in side view, the shared-rail end clamp of FIG. 65.
Figure 68:
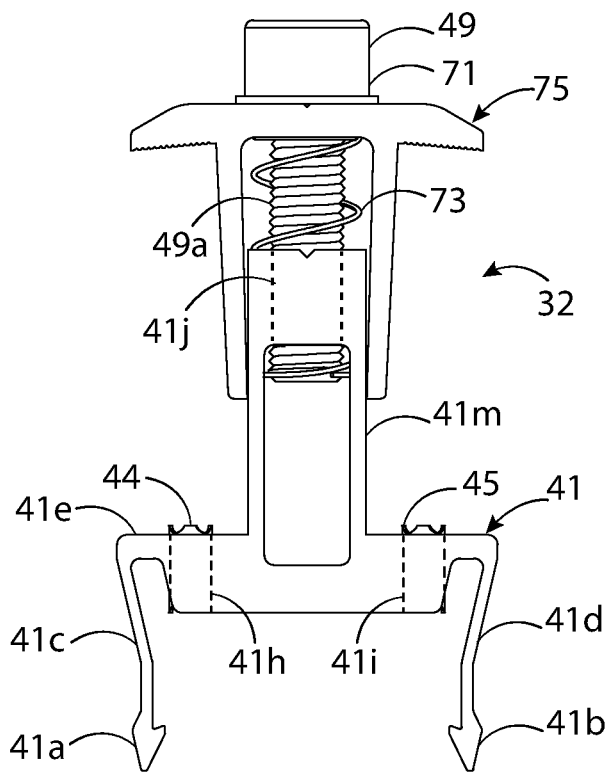
FIG. 68 illustrates, in side view, the shared-rail mid clamp of FIG. 66.
Figure 69:
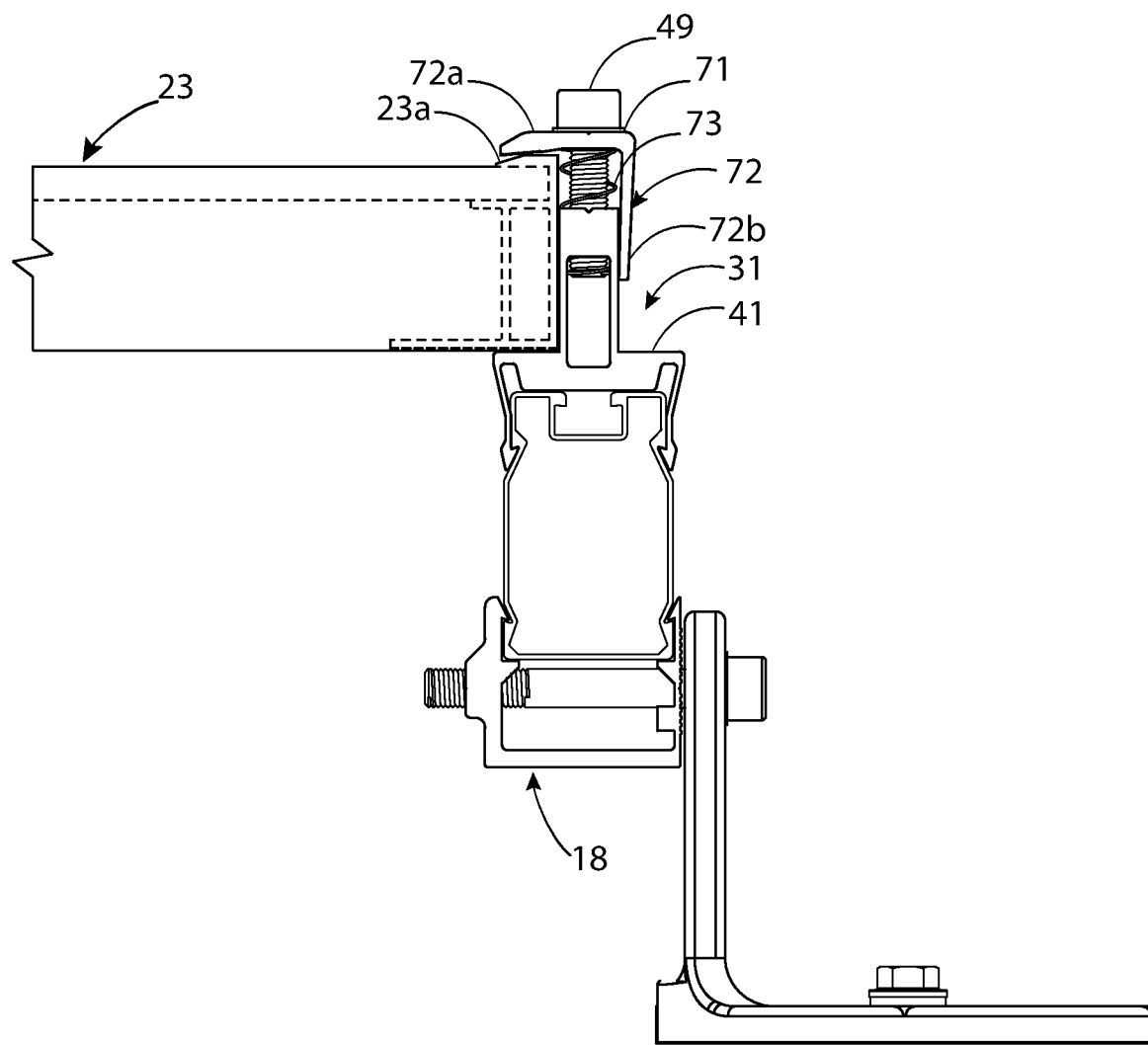
FIG. 69 illustrates, in side view, a portion of a solar PV system illustrating a solar panel secured to a rail, L-foot adapter assembly, and L-foot assembly by the shared-railed end clamp of FIG. 65.
Figure 70:
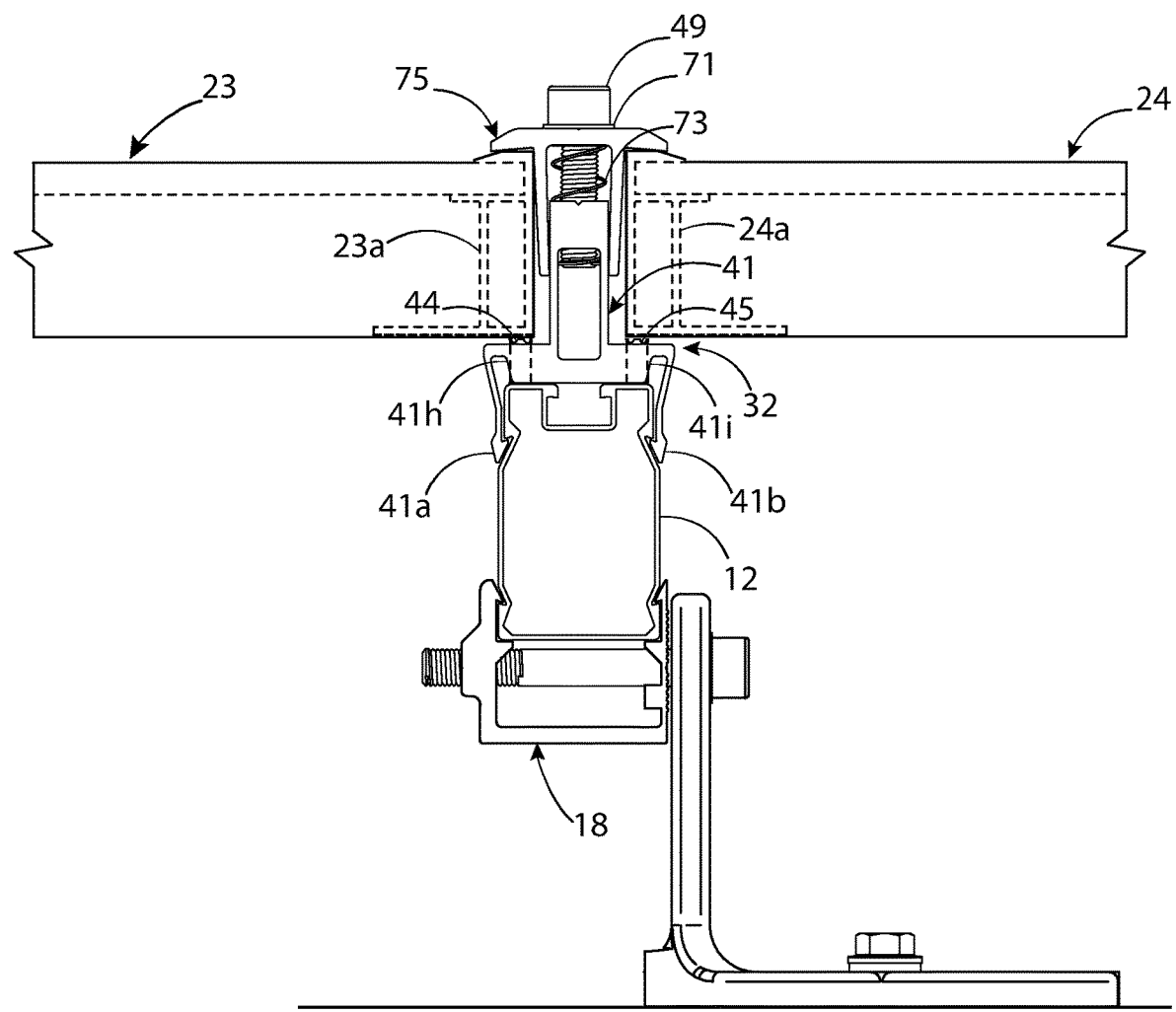
FIG. 70 illustrates, in side view, a portion of a solar PV system illustrating solar panels secured to a rail, L-foot adapter assembly, and L-foot assembly by the shared-railed mid clamp of FIG. 66.

The clamping mechanism of landscape-mode panel clamps was discussed for FIGS. 18-20. We will now turn our discussion to these panel clamps in more detail. End clamp 31 illustrated in FIGS. 65, 67, and 69 and mid clamp 32 of FIGS. 66, 68, and 70 share a common set of components. These include threaded fastener 49, spring 73, clamp body 41, bonding pin 44 and bonding pin 45, and optionally, lock washer 71. Clamp body 41 in FIGS. 65, 67, and 69 is optionally shown without bonding pin 44 and bonding pin 45 and without aperture 41h and aperture 41i that receive and pass through bonding pin 44 and bonding pin 45, respectively, of FIGS. 66, 68, and 70. Referring to FIGS. 65, 67, 69, end clamp 31 includes clamping member 72. Referring to FIGS. 66, 68, 70, mid clamp 32 includes clamping member 75. Referring to FIG. 65, threaded fastener body 49a passes through aperture 72c of clamping member 72. Referring to FIG. 66, threaded fastener body 49a passes through aperture 75c of clamping member 75. Referring to FIGS. 65-68, threaded fastener body 49a threadedly engages aperture 41j of pedestal portion 41m of clamp body 41. Pedestal portion 41m projects upward from base 41e of clamp body 41. The pair of clamp body arms, clamp body arm 41c and clamp body arm 41d, project downward from clamp body 41. Clamping portion 41a and clamping portion 41b extend from the ends of clamp body arm 41c and clamp body arm 41d, respectively, as previously discussed.

Referring to FIG. 70, tightening of threaded fastener 49 causes clamping member 75 to bear down on frame 23a of solar panel 23 and frame 24a of solar panel 24, presses bonding pin 44 into frame 23a, presses bonding pin 45 into frame 24a, presses bonding pin 44 and bonding pin 45 against rail 12, and thereby causes frame 23a and frame 24a to electrically bond to rail 12. Additional electrical bonding can result from clamping portion 41a and clamping portion 41b digging into rail 12 and breaking through the paint or oxide layer.

Referring to FIG. 69, clamping member 72 is sized and shaped to engage the top of frame 23a of solar panel 23 and to engage clamp body 41. As threaded fastener 49 is tightened, upper section 72a of clamping member 72 presses against the top of frame 23a. Clamping member 72 will tend to rotate backward toward clamp body 41. Lower section 72b of clamping member 72, which extends downward from upper section 72a will engage clamp body 41 and stabilize. Clamp body 41 is shown without bonding pins or apertures to receive bonding pins. End clamp 31 can be used to create electrical bonding by including one or both of the apertures and bonding pins from FIG. 70. This would electrically bond end clamp 31 to the rail as described for mid clamp 32 in the preceding paragraph.

The solar panel racking can be attached to a variety of L-foot assemblies. FIGS. 71-83 illustrate four examples of L-foot assemblies. L-foot assembly 33 is illustrated in FIGS. 71-75. L-foot assembly 34 is illustrated in FIGS. 76-81. L-foot assembly 35 is illustrated in FIG. 82. L-foot assembly 36, which is a variation of L-foot assembly 35, is illustrated in FIG. 83.

Figure 71:
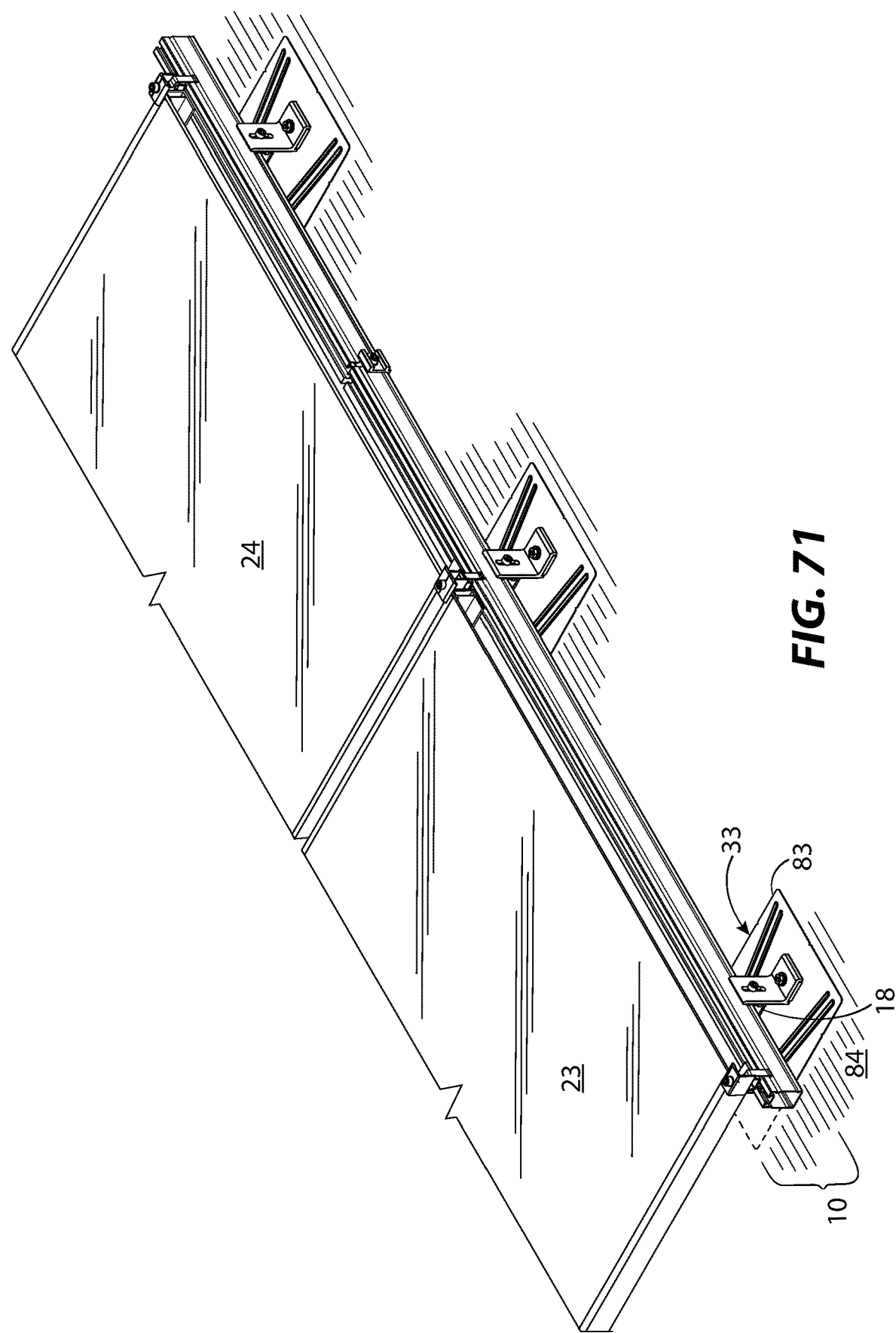
FIG. 71 illustrates an enlarged portion of the solar PV system similar to FIG. 2, cutaway along section lines 2-2 in FIG. 1, except an L-foot and flashing assembly is used in place of the L-foot assemblies of FIG. 2.
Figure 72:
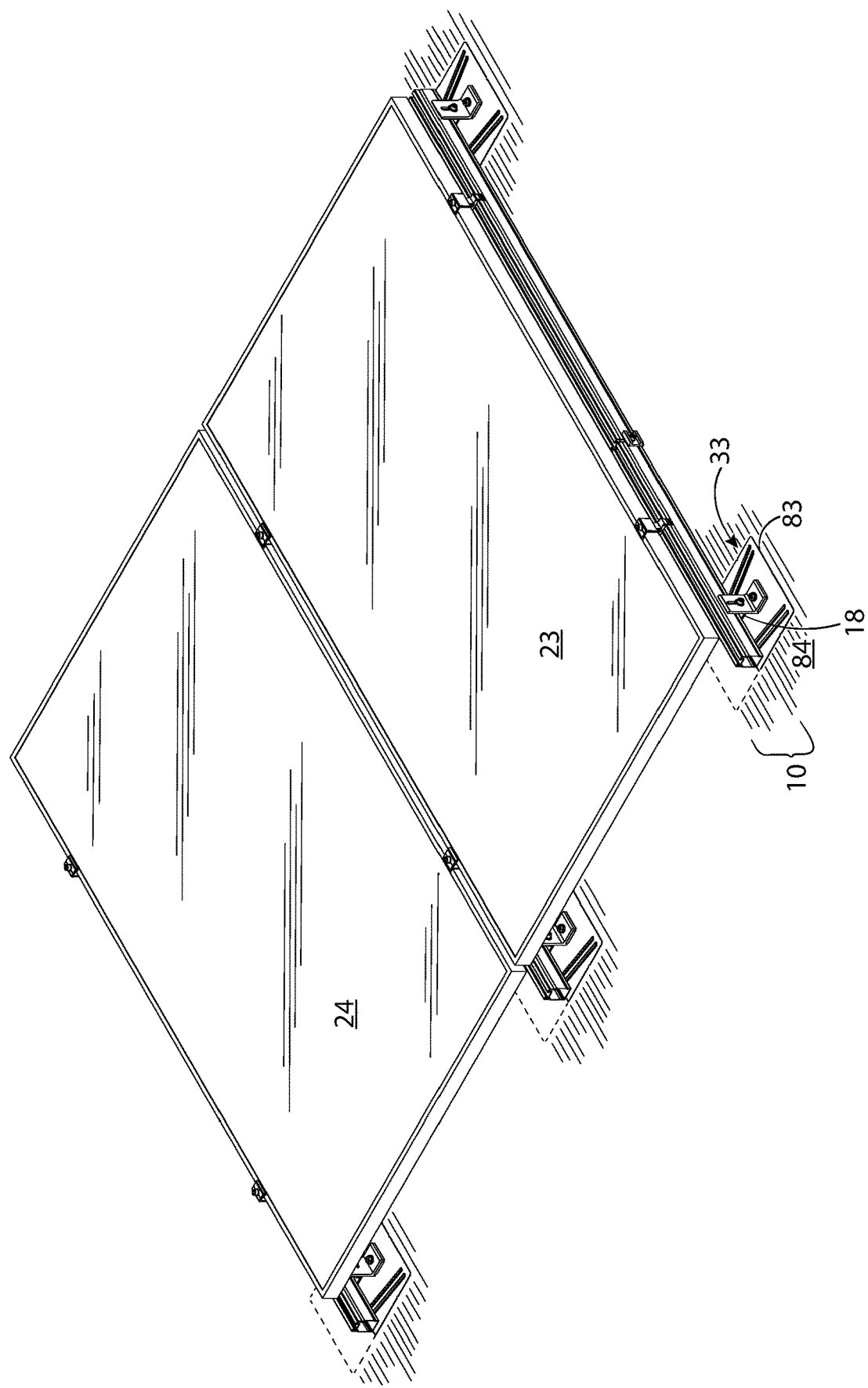
FIG. 72 illustrates a solar PV system similar to FIG. 3 except L-foot and flashing assemblies of FIG. 71 are used in place of the L-foot assemblies of FIG. 3.
Figure 73:
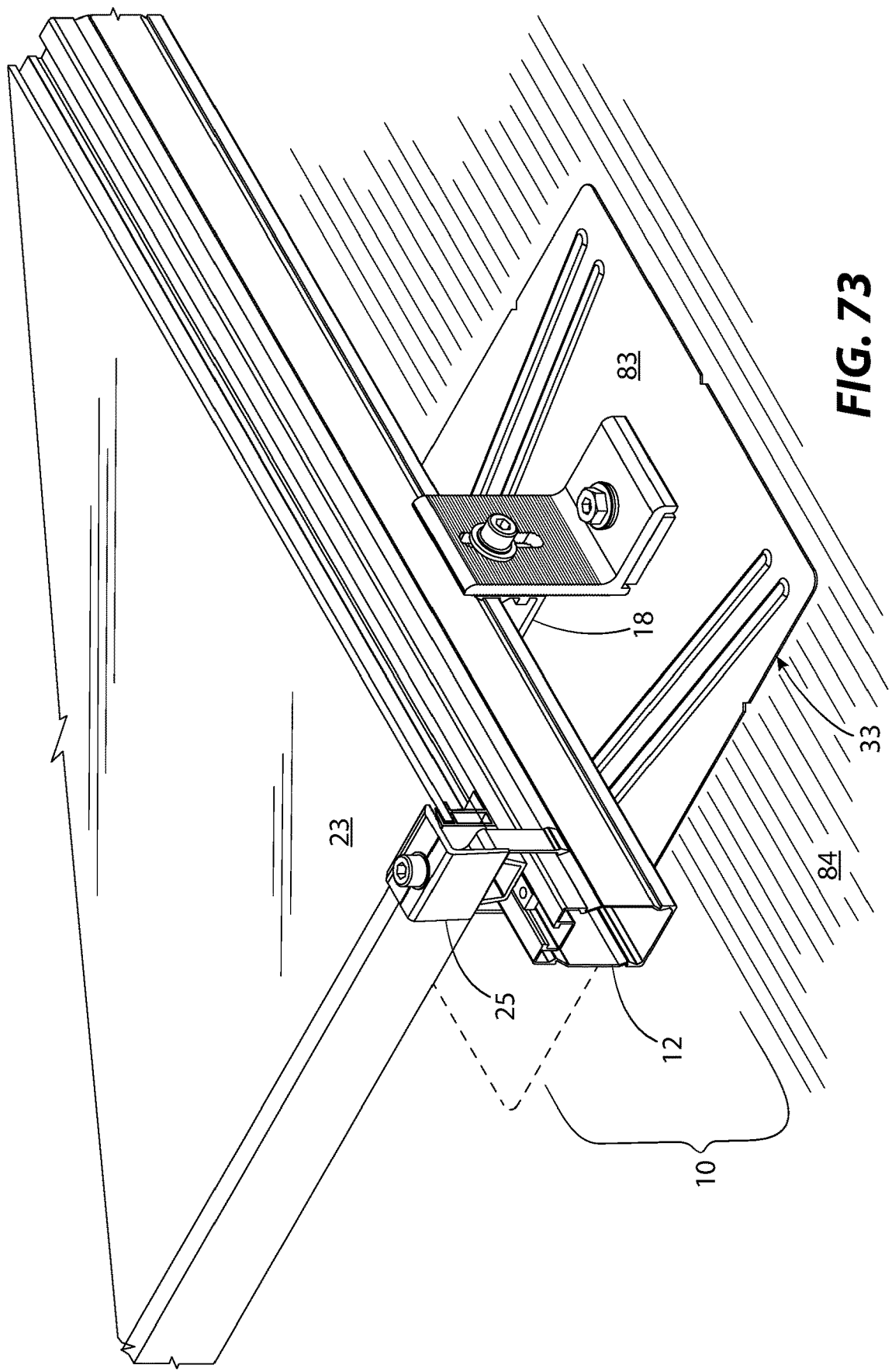
FIG. 73 illustrates an enlarged portion of FIG. 71, also cutaway along section lines 2-2 of FIG. 1, with the rail, L-foot adapter assembly, end clamp, and solar panel, together extended upward along the L-foot and flashing assembly.
Figure 74:
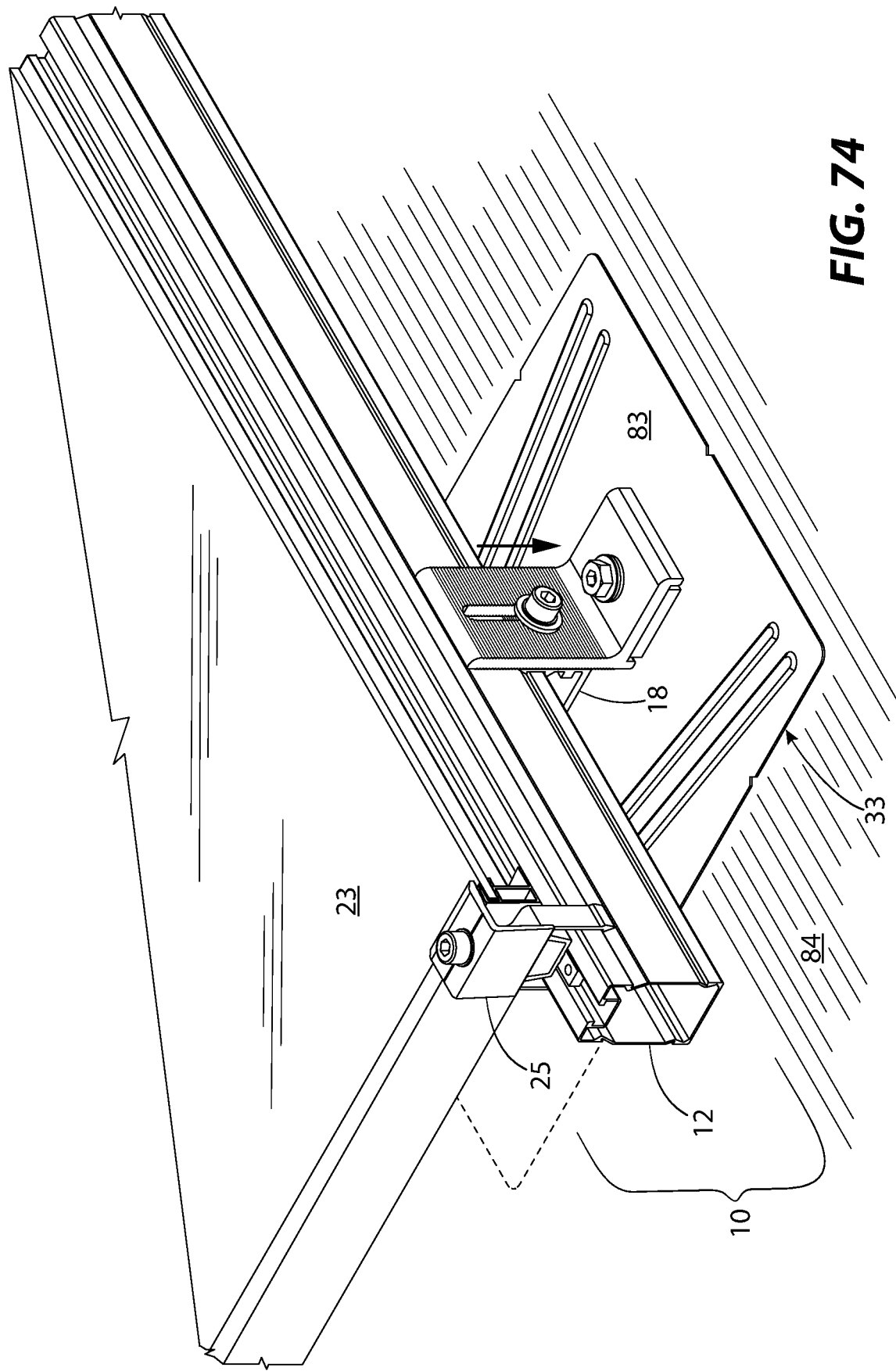
FIG. 74 illustrates the rail, L-foot adapter assembly, end clamp, and solar panel of FIG. 73, together extended downward along the L-foot and flashing assembly.

FIGS. 71-74, illustrate solar panel racking system 10 with L-foot assembly. L-foot assembly 33 includes roof flashing 83 that is typically used with a shingled roof, such as shingled roof 84. Dashed lines in FIGS. 71-74 represent portions of flashing 83 that are hidden from view under the roof shingles of shingled roof 84. In FIG. 71, solar panel 23 and solar panel 24 are mounted in portrait mode. In FIG. 72, solar panel 23 and solar panel 24 are mounted in landscape mode. In FIG. 71, the front of solar panel 23 and solar panel 24 are cutaway cross-sectionally to expose L-foot assembly 33, that would normally be hidden from view if solar panel 23 and solar panel 24 were not cross-sectionally cutaway. Referring to FIGS. 73 and 74, L-foot assembly 33 is structured to allow solar panel racking system 10 to be adjusted upward and downward with respect to L-foot assembly 33. FIG. 73 illustrates solar panel 23, end clamp 25, rail 12, and L-foot adapter assembly 18 moved upward with respect to L-foot assembly 33. FIG. 74 illustrates solar panel 23, end clamp 25, rail 12, and L-foot adapter assembly 18 moved downward with respect to L-foot assembly 33.

Figure 75:
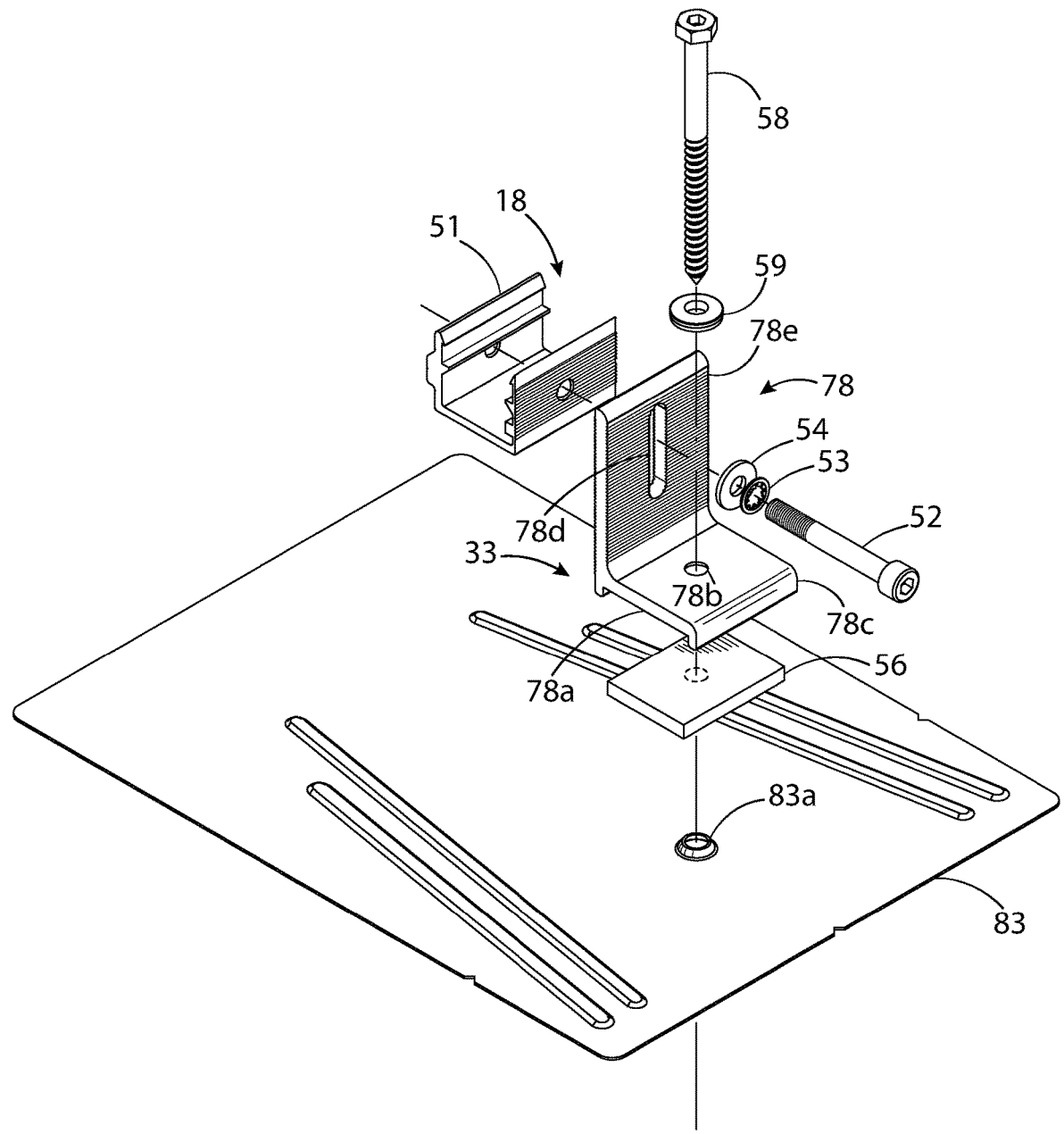
FIG. 75 illustrates, in exploded and isometric view, the L-foot and flashing assembly together with the L-foot adapter assembly of FIGS. 71-74.

Referring to FIG. 75, L-foot assembly can include flashing 83, L-foot 78, gasket 56, threaded fastener 58, and washer 59. Gasket 56 is received in recess 78a within L-foot 78. Flashing 83 includes raised portion 83a that can create a watertight seal with gasket 56. Threaded fastener 58 passes through aperture 78b within base 78c of L-foot 78 and through raised portion 83a of flashing 83. Threaded fastener 52 of L-foot adapter assembly 18 passes through washer 53 and washer 54, through slot 78d of upper portion 78e of L-foot 78 and through L-foot adapter body 51. Slot 78d together with threaded fastener 52 allows L-foot adapter body 51 to move up and down.

Figure 76:
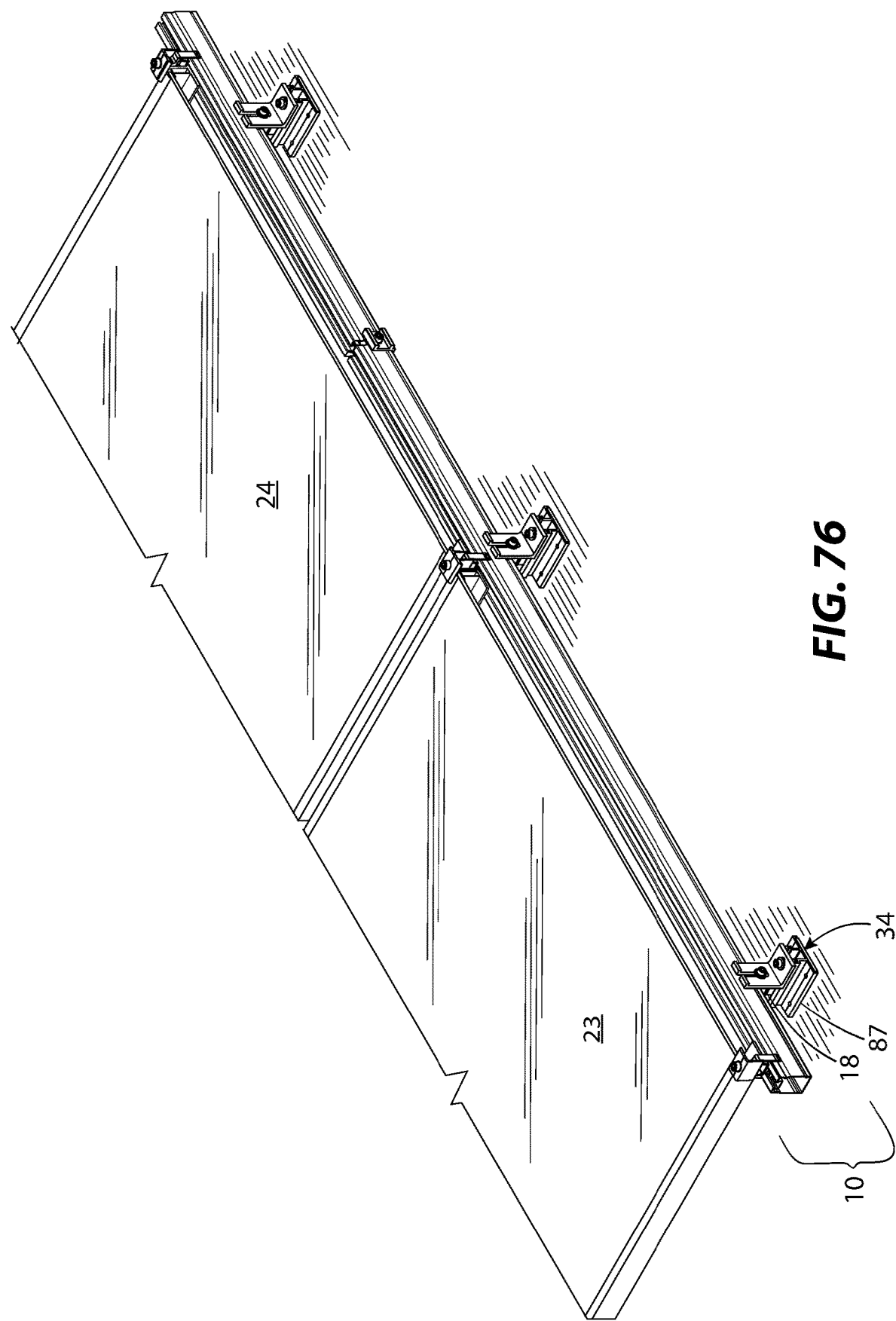
FIG. 76 illustrates an enlarged portion of the solar PV system similar to FIG. 2, and cutaway along section lines 2-2 in FIG. 1, except an L-foot assembly with two degrees of freedom is used in place of the L-foot assembly of FIG. 2.
Figure 77:
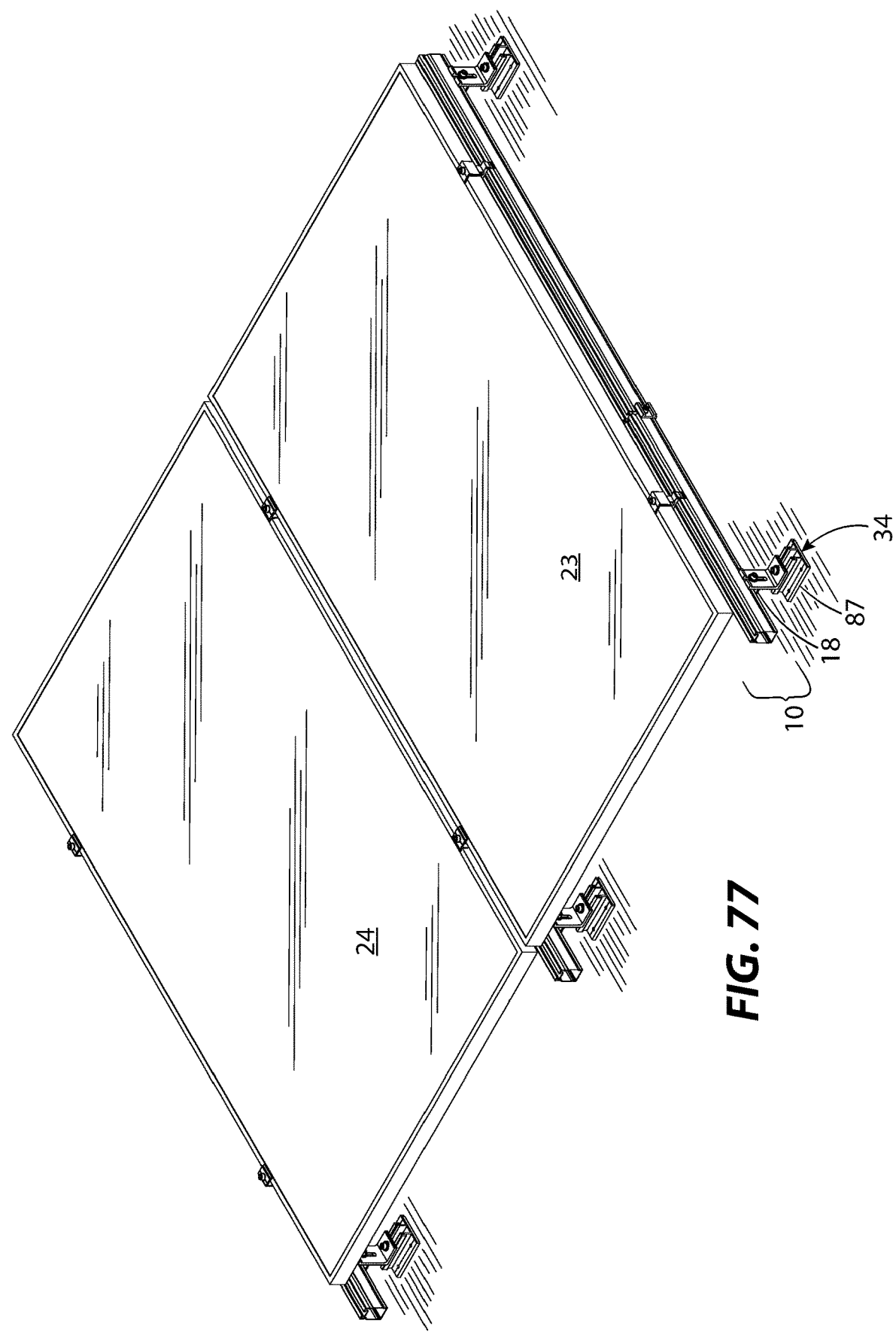
FIG. 77 illustrates a solar PV system similar to FIG. 3 except the L-foot assemblies of FIG. 76 replaces the L-foot assemblies of FIG. 3.
Figure 78:
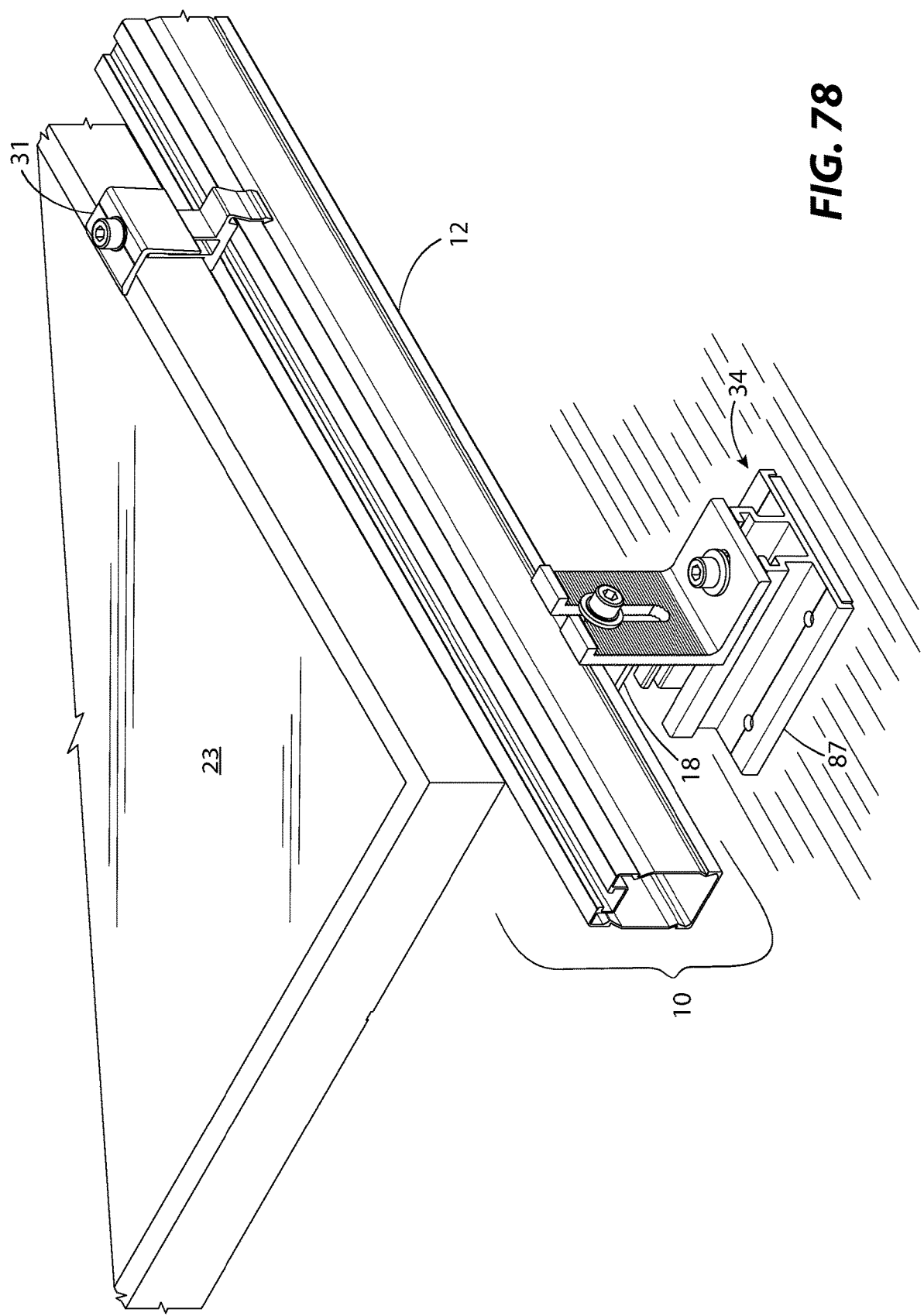
FIG. 78 illustrates an enlarged portion of FIG. 77 with the rail, L-foot adapter assembly, end clamp, and solar panel, together extended forward and upward along the L-foot assembly.
Figure 79:
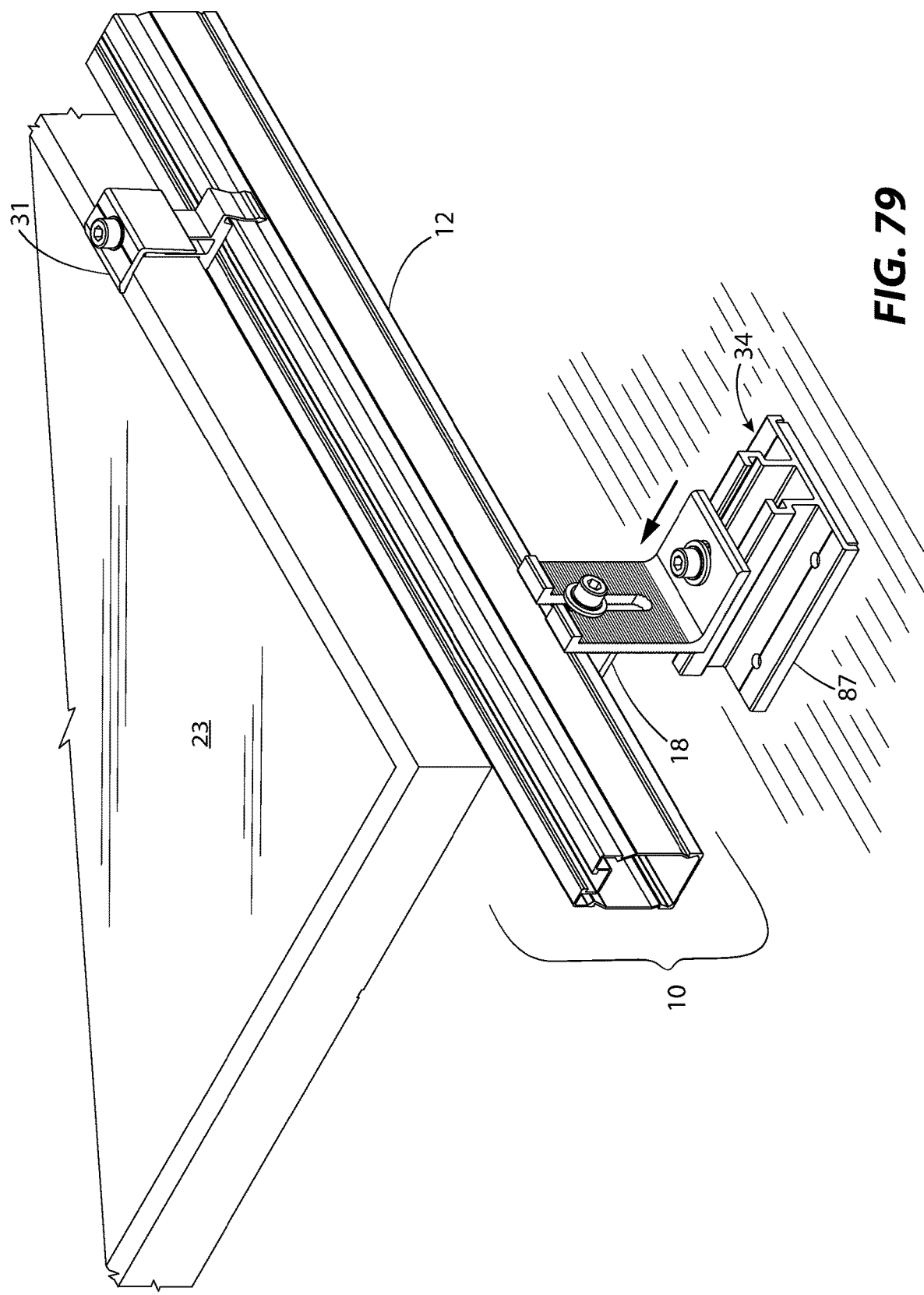
FIG. 79 illustrates the rail, L-foot adapter assembly, end clamp, and solar panel of FIG. 78, together extended rearward and upward along the L-foot assembly.
Figure 80:
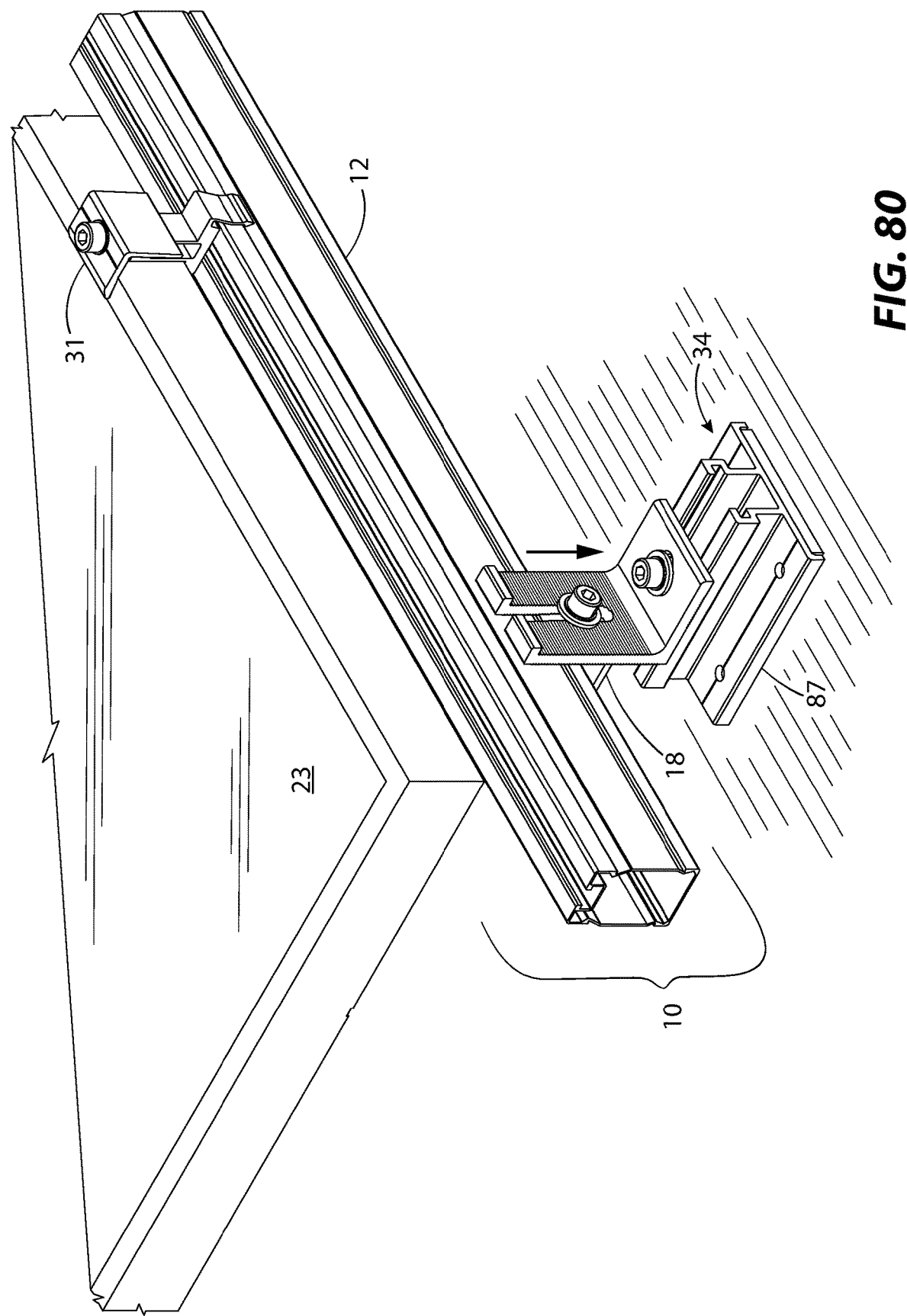
FIG. 80 illustrates the rail, L-foot adapter assembly, end clamp, and solar panel assembly of FIG. 78 extended rearward and downward along the L-foot assembly.

FIGS. 76-80, illustrate solar panel racking system 10 with L-foot assembly 34. L-foot assembly 34 includes base 87 that can be used with a variety of different roof types including a shingled roof or metal roof. In FIG. 76, solar panel 23 and solar panel 24 are mounted in portrait mode. In FIG. 77, solar panel 23 and solar panel 24 are mounted in landscape mode. In FIG. 76, the front of solar panel 23 and solar panel 24 are cutaway cross-sectionally to expose L-foot assembly 34 that would normally be hidden from view if solar panel 23 and solar panel 24 were not cross-sectionally cutaway. Referring to FIGS. 78-80, L-foot assembly 34 is structured to allow the solar panel racking system 10 to be adjusted forward and backward as well as upward and downward with respect to L-foot assembly 34. L-foot assembly 34 can be helpful when mounting solar panels in landscape mode, as illustrated, as the distance between rails often has tighter tolerances for proper engagement of the end clamp 31 or mid clamp (not shown). FIG. 78 illustrates solar panel 23, end clamp 31, rail 12, and L-foot adapter assembly 18 moved upward and forward. FIG. 79 illustrates solar panel 23, end clamp 31, rail 12, and L-foot adapter assembly 18 moved upward with respect to L-foot assembly 34 but slid rearward with respect to their positions in FIG. 78. FIG. 80 illustrates solar panel 23, end clamp 25, rail 12, and L-foot adapter assembly 18 moved downward with respect to L-foot assembly 34.

Figure 81:
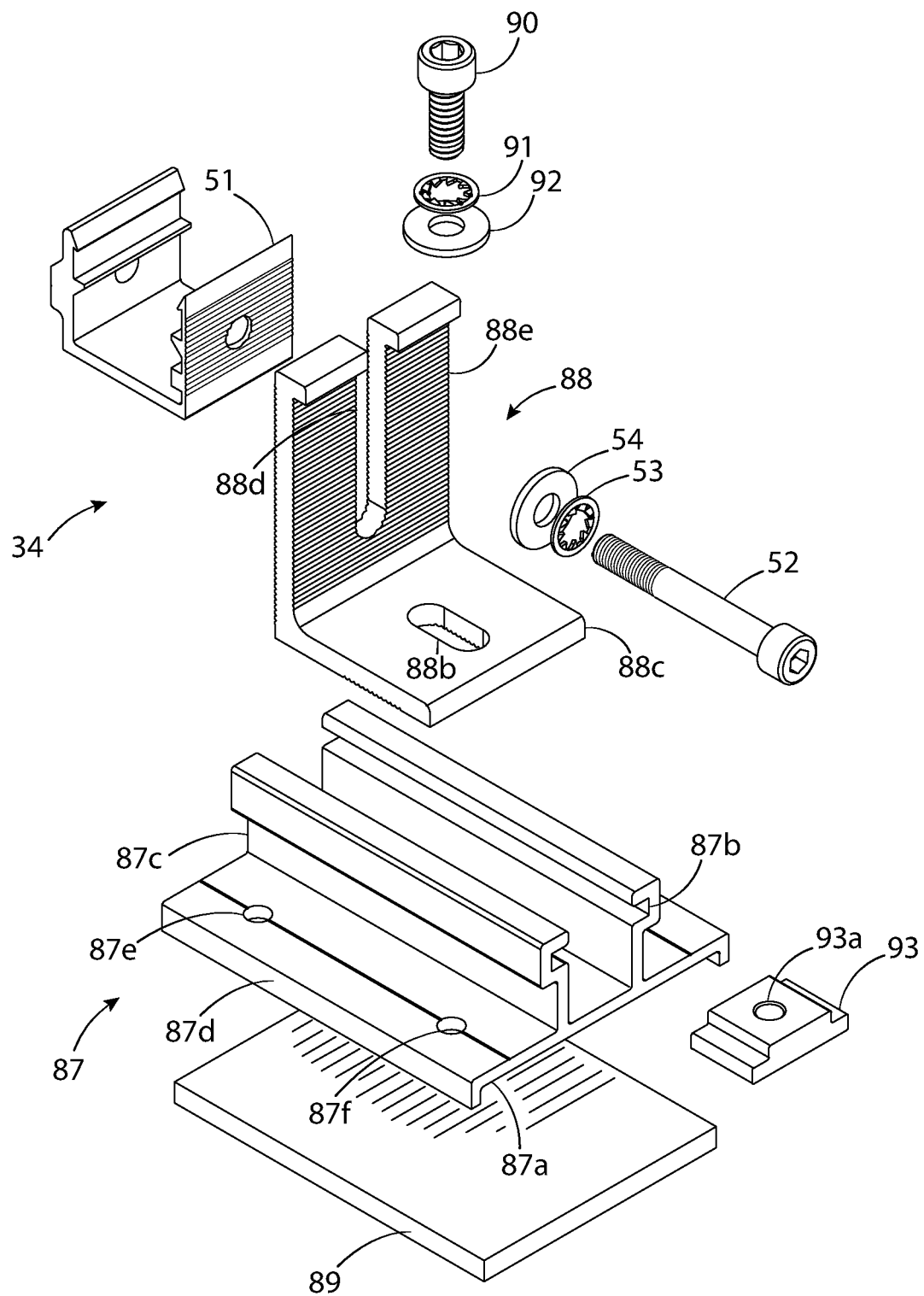
FIG. 81 illustrates an exploded view of the L-foot assembly and the L-foot adapter of 76-80.

Referring to FIG. 81, L-foot assembly 34 can include base 87, L-foot 88, gasket 89, threaded fastener 90, washer 91, washer 92, and keeper 93. Gasket 89 is received in recess 87a within base 87. Gasket 89 can be made from elastomers, or elastomer-like materials capable of being used as a watertight gasket for roofs that is resistant to typical outdoor temperature variations. For example, gasket 89 can be made from ethylene propylene diene monomer rubber (EPDM), rubber, thermoplastic olefin (TPO), polychloroprene (also known as neoprene), or silicone. Threaded fastener 90 passes through aperture 88b within lower leg 88c of L-foot 88 and threadedly engages threaded aperture 93a in keeper 93. Keeper 93 is sized and shaped to slide captively within slot 87b in base 87. Aperture 88b in lower leg 88c of L-foot 88 is illustrated as slotted, but it can optionally be a circular aperture.

Threaded fastener 52 of L-foot adapter assembly 18 passes through washer 53, washer 54, slot 88d of upper portion 88e, and through L-foot adapter body 51. Slot 88d together with threaded fastener 52 allows L-foot adapter body 51 to move up and down. Keeper 93 in combination with threaded fastener 90 and L-foot 88 allows L-foot adapter body 51 to move forward and backward with respect to base 87. Slot 87b is illustrated as extending from the top of pedestal 87c. Pedestal 87c projects upward from foot 87d of base 87. Slot 87b could also be constructed in a similar manner but projecting directly from foot 87d without pedestal 87c. Slot 87b could also be indented in the surface of base 87. Base 87 can be attached to a roof through roof fasteners (not shown) that extend through apertures in foot 87d. Two of the apertures, aperture 87e and aperture 87f, are illustrated in FIG. 81.

FIG. 82 illustrates an exploded view of L-foot assembly 35. FIG. 83 illustrates an exploded view of L-foot assembly 36. The difference between L-foot assembly 35 and L-foot assembly 36 is L-foot 94 and L-foot 95, respectively. Referring to FIG. 82, L-foot 94 includes aperture 94b for receiving a roof fastener, such as threaded fastener 58 and washer 59. Threaded fastener 58 is typically secured to roof rafters or joists. Referring to FIG. 83, L-foot 95 can optionally include aperture 95b for receiving a roof fastener, such as threaded fastener 58, but also includes additional apertures; for example, aperture 95f, aperture 95g, aperture 95h, and aperture 95i for receiving additional threaded fasteners, for example, threaded fastener 102, threaded fastener 103, threaded fastener 104, and threaded fastener 105. Threaded fastener 102, threaded fastener 103, threaded fastener 104, and threaded fastener 105 are typically used to secure L-foot 95 to a wood roof deck, such as plywood, OSB, or solid wood planks.

Referring to FIGS. 82 and 83, L-foot assembly 35 and L-foot assembly 36 can include L-foot 94 and L-foot 95, respectively as well as gasket 96, threaded fastener 58, and washer 59. Referring to FIG. 82, gasket 96 is received in recess 94a within lower portion 94c of L-foot 94. Referring to FIG. 83, gasket 96 is received in recess 95a within lower portion 95c of L-foot 95. Referring to FIGS. 82 and 83, gasket 96 can be made from elastomers, or elastomer-like materials capable of being used as a watertight gasket for roofs that is also resistant to typical outdoor temperature variations, sunlight, and weather conditions. Examples of suitable gasket materials include EPDM, rubber, TPO, neoprene, or silicone.

Referring to FIG. 82, threaded fastener 58 passes through aperture 94*b* and through gasket 96. Referring to FIG. 83, threaded fastener 58 passes through aperture 95*b* and through gasket 96. Referring to FIG. 82, threaded fastener 52 of L-foot adapter assembly 18 passes through washer 53 and washer 54, through slot 94*d* of the upper portion 94*e* of L-foot 94, and through L-foot adapter body 51. Slot 94*d* together with threaded fastener 52 allows L-foot adapter body 51 to move up and down. Referring to FIG. 83, similarly, threaded fastener 52 of L-foot adapter assembly 18 passes through washer 53 and washer 54, through slot 95*d* of upper portion 95*e* of L-foot 95 and through L-foot adapter body 51. Slot 95*d* together with threaded fastener 52 allows L-foot adapter body 51 to move up and down.

A solar panel racking system and devices that can form a portion of the solar panel racking system have been described. It is not the intent of this disclosure to limit the claims to the examples and variations described in the Summary or Description. Those skilled in the art will recognize that variations will occur when embodying the claims in specific implementations and environments. For example, it may be desirable to widen or narrow the width of the lower region of rail 12 of FIG. 4. One example of widening rail 12 is illustrated in FIG. 7 as rail 13. The inventors envision that rail 12 and rail 13 can be widened or narrowed to accommodate different installation environments. As previously discussed, widening or narrowing the lower region of rail 12, while leaving the width of the upper region of the rail unchanged, allows a common set of panel clamps to be used in many implementations.

Figure 87:
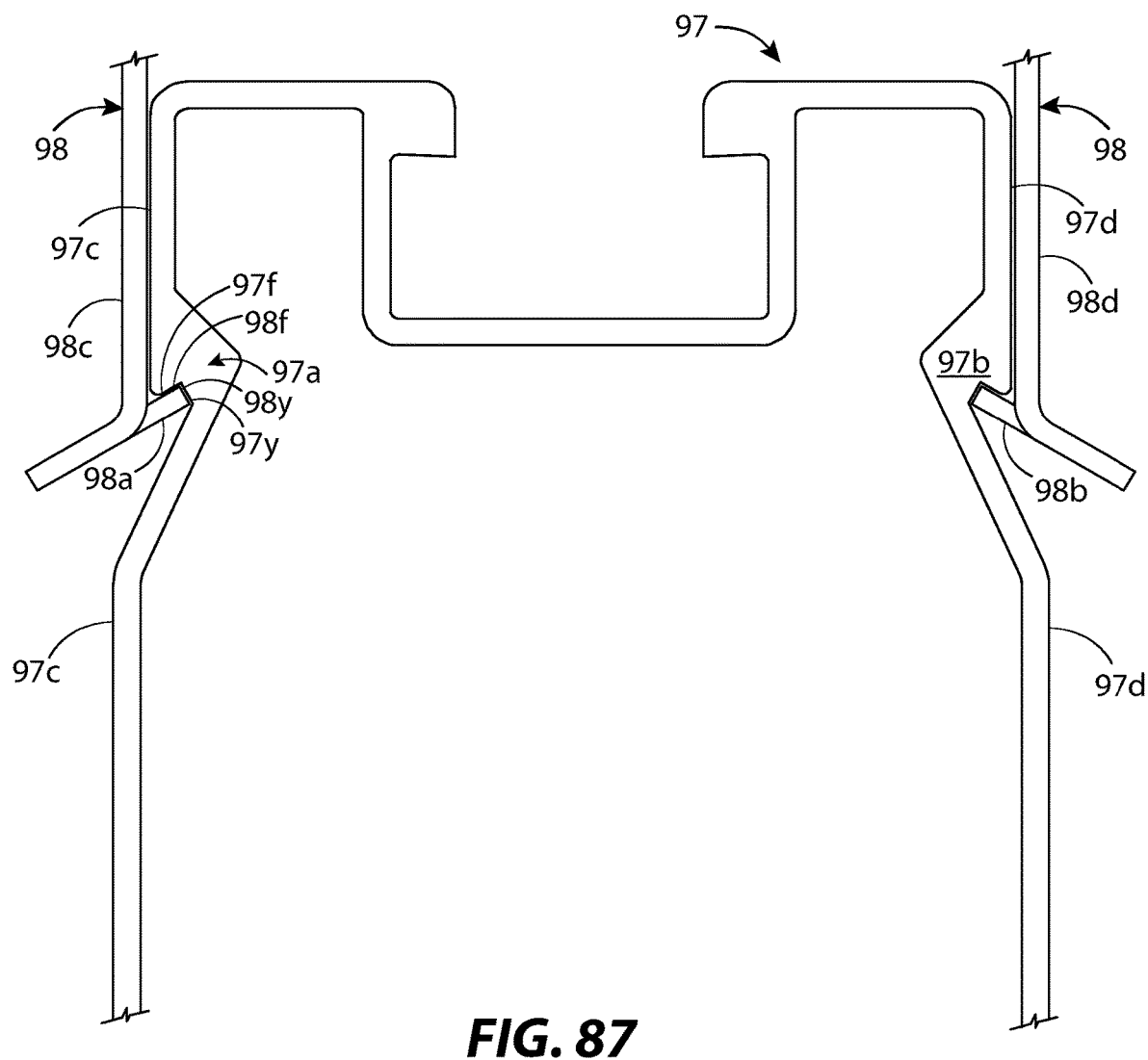
FIG. 87 illustrates the rail of FIG. 84 with a portion of an alternative panel clamp.

It is within the scope of this disclosure to structurally and angularly modify the upper detented portions or the lower detented portions of the rails to accommodate corresponding structural and angular variations in the panel clamps. Rail 97, which is an example of one such variation, is illustrated in FIGS. 84-86. FIG. 87 illustrates a portion of panel clamp 98 with upper detented portion 97*a* and upper detented portion 97*b* of rail 97.

As illustrated, the difference between rail 12 of FIG. 4 and rail 97 of FIG. 84 is the structure of the detented portions. For the sake of this example, the remaining structure of rail 12 and rail 97 can remain the same. For example, referring to FIG. 84, rail 97 can include a hollow interior extending between rail side 97*c*, rail side 97*d*, rail top 97*e*, and rail bottom 97*i*. Rail side 97*c* and rail side 97*d* can extend downward from opposing sides of rail top 97*e* and extend upward from opposing sides of rail bottom 97*i* to form opposing outside-facing surfaces of rail 97. This is similar to FIG. 4 where the pair of rail sides (i.e., rail side 12*c* and rail side 12*d*) extends downward from opposing sides of rail top 12*e* and extends upward from rail bottom 12*i* to form opposing outside-facing surfaces of rail 12. Referring to FIG. 84, the upper detented portion 97*a* is located on rail side 97*c* and upper detented portion 97*b* is located on rail side 97*d* on the upper region of rail 97 (i.e., the heightwise upper half of the rail). This is similar to FIG. 4 where upper detented portion 12*a* is located on rail side 12*c* and upper detented portion 12*b* is located on rail side 12*d* on the upper region of rail 12 (i.e., the heightwise upper half of the rail). Referring to FIG. 84, lower detented portion 97*n* is located on rail side 97*c* and lower detented portion 97*o* is located on rail side 97*d* on the lower region of rail 97 (i.e., the heightwise lower half of the rail). This again, is similar to FIG. 4 where lower detented portion 12*n* is located on rail side 12*c* and lower detented portion 12*o* is located on rail side 12*d* on the lower region of rail 12 (i.e., the heightwise lower half of the rail). In FIG. 84, the rail top 97*e* can include a rail slot 97*h* that extends lengthwise along the rail 97. The is similar to rail slot 12*h* extending lengthwise along rail top 12*e*.

FIG. 85 illustrates upper detented portion 97*a* in more detail and illustrates the differences from upper detented portion 12*a* and upper detented portion 12*b* of FIG. 12. Referring to FIG. 85, upper detented portion 97*a* includes upper first sloped surface 97*f*, upper second sloped surface 97*g*, and also includes upper third sloped surface 97*y*. Upper first sloped surface 97*f* projects upward and inward at an angle A5 with respect its respective rail side, rail side 97*c*. Upper second sloped surface 97*g* projects downward and outward at an angle A2 with respect to rail side 97*c*. Angle A5 and angle A2 are illustrated as acute (i.e., less than 90°). Upper first sloped surface 97*f* is shown positioned above upper second sloped surface 97*g*. Both upper first sloped surface 97*f* and upper second sloped surface 97*g* are positioned between two portions of their respective rail side, rail side 97*c*. Upper third sloped surface 97*y* is positioned between upper first sloped surface 97*f* and upper second sloped surface 97*g* and positioned downward and inward with respect to upper first sloped surface 97*f*. Panel clamps resist upward movement in part because of the structure of upper first sloped surface 97*f*, upper second sloped surface 97*g*, and upper third sloped surface 97*y* as described above. Upper third sloped surface 97*y* can help resist movement of tabbed panel clamps; for example, panel clamp 98 of FIG. 87 that uses tab portion 98*a*. Continuing to refer to FIG. 85, upper third sloped surface 97*y* is optionally shown making a right angle (i.e., 90° angle) with upper first sloped surface 97*f*. This can help accommodate right-angled tabs or other right-angled structures.

FIG. 87 illustrates leg portion 98*c*, leg portion 98*d*, tab portion 98*a*, and tab portion 98*b* of panel clamp 98 engaged and secured to rail 97. In FIG. 87, tab portion 98*a* engages against upper detented portion 97*a*. Tab portion 98*b* engages against upper detented portion 97*b*. The shape and angular configuration of upper detented portion 97*a* and upper detented portion 97*b* causes rail 97 to resist upward movement of panel clamp 98. For example, upper side 98*f* of tab portion 98*a* engages against upper first sloped surface 97*f*. End portion 98*y* of tab portion 98*a* engages against upper third sloped surface 97*y* of rail 97. Upper first sloped surface 97*f* resists upward movement of upper side 98*f* of tab portion 98*a*. Upper third sloped surface 97*y* is shown optionally engaging end portion 98*y* planarly, to help seat tab portion 98*a* in upper detented portion 97*a*. This helps resist upward movement of upper side 98*f* against upper first sloped surface 97*f* and prevent slippage of tab portion 98*a*.

Similarly, the upper first sloped surface, the upper second sloped surface, and the upper third sloped surface of upper detented portion 97*b* resist upward movement and slippage of tab portion 98*b*.

Referring to FIG. 84, lower detented portion 97*n* and lower detented portion 97*o* are formed and positioned in the lower region of rail side 97*c* and rail side 97*d*, respectively (i.e., the lower region being the heightwise lower half of the rail). Lower detented portion 97*n* and lower detented portion 97*o* can also include a lower third sloped surface. An example of the lower third sloped surface is illustrated in FIG. 86. Referring to FIG. 86, lower detented portion 97*n* includes lower first sloped surface 97*p*, lower second sloped surface 97*q*, and lower third sloped surface 97*z*. Lower first sloped surface 97*p* extends inward and downward from rail side 97c. Lower second sloped surface 97q extends upward and outward from the bottom of the lower first sloped surface 97p. Lower third sloped surface 97z is positioned between lower first sloped surface 97p and lower second sloped surface 97q. Lower first sloped surface 97p extends at angle A4 with respect to rail side 97c. Lower second sloped surface 97q extends at angle A6 with respect to rail side 97c. Lower detented portion 97o similarly includes lower first sloped surface, lower second sloped surface, and lower third sloped surface as described for lower detented portion 97n. As illustrated, angle A6 of FIG. 86 does not equal angle A3 of FIG. 6, however, they could be equal depending on the application. Referring to FIG. 86, the angle and structure of lower third sloped surface 97z can depend on the angle and structure of the corresponding engaging surface of clamping portion 57a of FIG. 25.

Referring to FIG. 5, where upper first sloped surface 12f and upper second sloped surface 12g intersect is illustrated as forming a lengthwise radius edge. Alternatively, upper first sloped surface 12f and upper second sloped surface 12g can intersect in a lengthwise vertex edge.

Upper detented portion 12a and upper detented portion 12b of FIG. 4 are typically symmetrical and horizontally aligned. However, they may be asymmetrical and non-horizontally aligned to engage panel clamps with non-horizontally aligned or asymmetrical clamping portions. For example, a panel clamp might include a pair of clamp body arms with one of the clamp body arms longer than the other. The matching upper detented portions could be non-horizontally aligned to accommodate this. Similarly, a panel clamp could have clamping portions that are structured differently from one another. In this case, the first detented portion and the second detented portion of the rail could be asymmetrical to accommodate the asymmetrical clamping portions.

Figure 88:
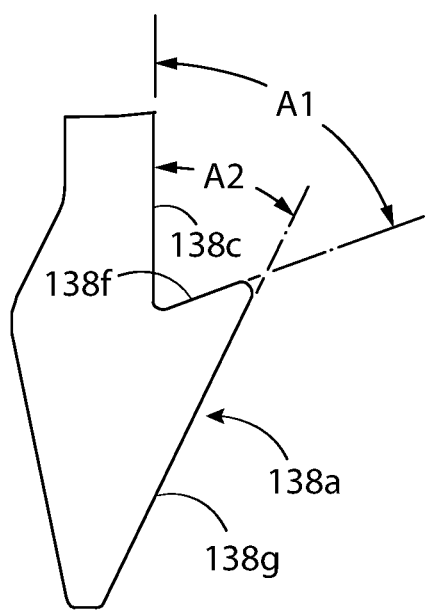
FIG. 88 illustrates an enlarged view of an alternative clamping portion.
Figure 89:
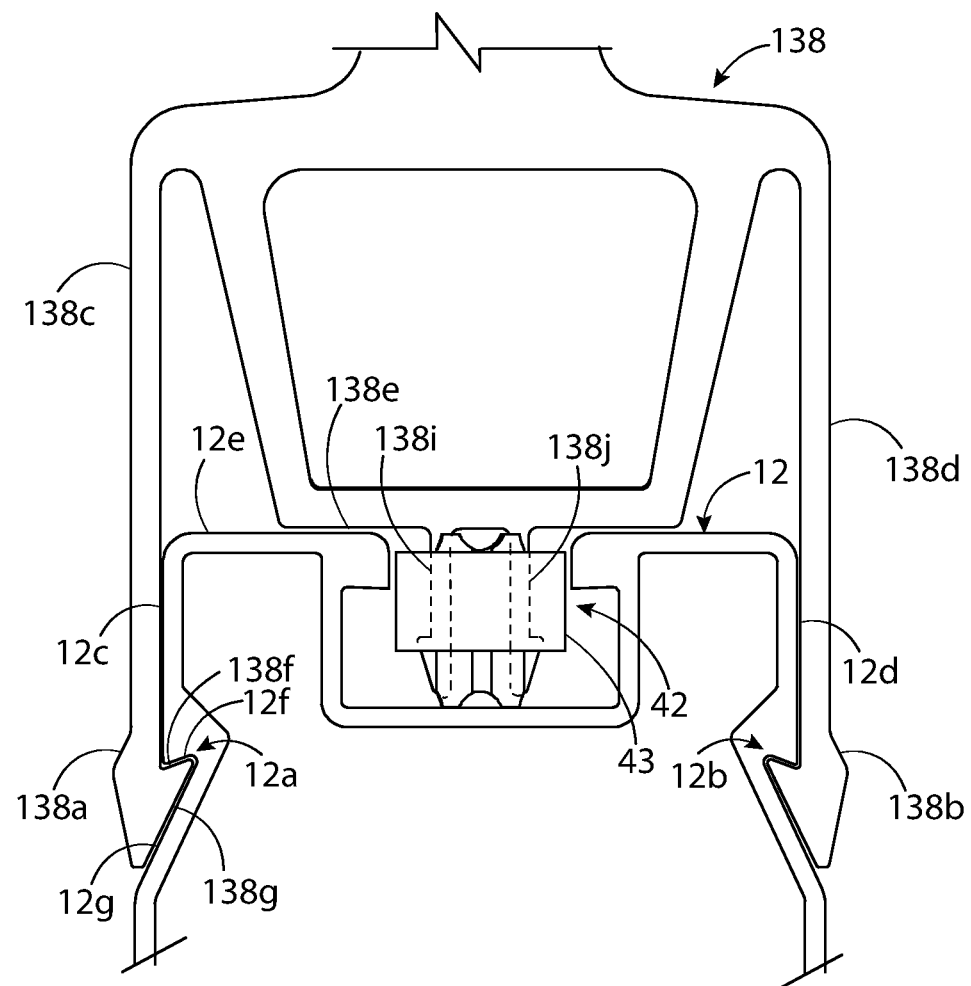
FIG. 89 illustrates a clamp body that utilizes the alternative clamping portion of FIG. 88 with the clamping body secured to the rail of FIG. 4.

The clamping portion 38a of FIG. 11 is illustrated with a planar surface between first sloped surface 38f and second sloped surface 38g. This planar surface can be angled to engage upper third sloped surface 97y of upper detented portion 97a of rail 97. FIG. 88 shows an alternative example of a clamping portion. First sloped surface 138f and second sloped surface 138g of clamping portion 138a meet with a radiused edge rather than a blunt or planar edge. To be compatible the upper detented portion 12a and upper detented portion 12b of rail 12 of FIG. 4 and upper detented portion 13a and upper detented portion 13b of rail 13 of FIG. 7, first sloped surface 138f can make an angle A1 and second sloped surface 138g can make an angle A2 with respect to with clamp body arm 138c. FIG. 89, illustrates clamping portion 138a and clamping portion 138b engaged and secured to upper detented portion 12a and upper detented portion 12b, respectively of rail 12. Clamping portion 138b can include surfaces structured and angled like first sloped surface 138f and second sloped surface 138g, including the radius between them. First sloped surface 138f planarly engages upper first sloped surface 12f of rail 12. Second sloped surface 138g planarly engages upper second sloped surface 12g. The radius edge between first sloped surface 138f and the second sloped surface 138g can be structured in size and shape to engage the surface of the radius edge between upper first sloped surface 12f and upper second sloped surface 12g. The remainder of the clamp body 138 can be otherwise the same as clamp body 38 of FIG. 11. For example, the clamp body 138 can include clamp body arm 138c that engages rail side 12c, clamp body arm 138d that engages rail side 12d, base 138e that engages rail top 12e, and spring clip 138i and spring clip 138j that engage the bonding block 43 of bonding assembly 42. The clamping portion 138a can also be used in place of clamping portion 39a and clamping portion 39b of clamp body 39 of FIG. 13 and clamping portion 41a of clamp body 41 of FIG. 18. Clamping portion 138a can be applied to any examples that utilize the above-mentioned clamping portions.

It is possible to implement features described in separate examples in combination within a single example. Similarly, it is possible to implement features described in a single example either separately or in combination in multiple examples. For example, L-foot adapter body 57 of FIG. 25 can be used in place of L-foot adapter body 51 throughout the examples in this disclosure. Rail 13 of FIG. 7 can be used in place of rail 12 of FIG. 4 in FIGS. 10, 12, 13, 14, 18, and 20. In addition, rail 13 can be used in place of rail 12 in FIGS. 17, 27-34, 51-55, 57-59, 61-64, 69, 70-74, and 76-80, as long as the width D4 of L-foot adapter body 51 of FIG. 24 equals the width D3 as measured at the bottom of rail 13 of FIG. 7. The inventors envision that these variations fall within the scope of the claims.

While the solar panel racking system of this disclosure is illustrated mounted to different types of roof structures. The solar panel racking system is not limited to these roof structures. Because the common components of the solar panel racking system are independent of L-foot assemblies and other mounting structures, the solar panel racking system can be mounted to various commercial and residential roof types such as metal roofs, shingle roofs, tile roofs, flat concrete roofs. For example, the solar panel racking system can be mounted to a tile roof using the L-foot adapter assembly 17 of FIG. 26 in combination with a tile roof mount device such as the tile roof mount device of U.S. Pat. No. 8,776,456 (Schrock). It can be mounted to shade structures such as awnings or carports directly using the L-foot adapter assembly 17 of FIG. 26 or by using an L-foot assembly, such as those illustrated in FIGS. 71-83. It can be mounted to commercial, residential, and utility-scale ground-mounted structures, for example by using the L-foot adapter assembly 17 of FIG. 26 combined with braces that engage the ground mount structure.

While the examples and variations are helpful to those skilled in the art in understanding the claims, the scope of the claims is defined by the following claims and their equivalents.

What is claimed is:
1. A device for mounting a solar panel, comprising:
   a panel clamp including a clamp body and a clamping member adjustably attached to the clamp body, the clamping member disposed to clamp a top surface of the solar panel;
   the clamp body includes a top, a first clamp body arm, and a second clamp body arm;
   the first clamp body arm and the second clamp body arm extend downward from opposite sides of the top;
   the first clamp body arm includes a first clamping portion projecting inward and upward from a first end of the first clamp body arm and a first clamp body arm portion projecting directly upward from the first clamping portion;
   the second clamp body arm includes a second clamping portion projecting inward and upward from a second end of the second clamp body arm and a second clamp body arm portion projecting directly upward from the second clamping portion;
   the first clamp body arm portion and the second clamp body arm portion are parallel to each other;

a bonding block secured to the clamp body and positioned widthwise between the first clamp body arm and the second clamp body arm above the first clamping portion and the second clamping portion; and a bonding pin extending through the bonding block.

2. The device of claim 1, wherein:
the first clamp body arm and the second clamp body arm are parallel to each.

3. The device of claim 1, wherein:
the bonding block includes an aperture therethrough; and
the clamp body includes spring clips extending downward between the first clamp body arm and the second clamp body arm and positioned between to receive and secure the bonding block to the clamp body through the aperture.

4. The device of claim 1, wherein:
a lengthwise portion of the bonding block is extended beyond the first clamp body arm and the second clamp body arm.

5. The device of claim 1, wherein:
the bonding pin is positioned through a lengthwise portion of the bonding block that is extended beyond the first clamp body arm and the second clamp body arm.

6. A device for mounting a solar panel to a rail, comprising:
a panel clamp including a clamp body and a clamping member adjustably attached to the clamp body, the clamping member disposed to clamp a top surface of the solar panel;
the clamp body includes a top, a first clamp body arm with a first clamping portion projecting inward and up from a first end of the first clamp body arm, and a second clamp body arm with a second clamping portion projecting inward and upward from a second end of the second clamp body arm;
the first clamp body arm and the second clamp body arm extend downward from opposite ends of the top and each include portions engaging planarly against opposite outside-facing sides of the rail;
a bonding block secured to the clamp body and positioned widthwise between the first clamp body arm and the second clamp body arm above the first clamping portion and the second clamping portion; and
a bonding pin extending through the bonding block.

7. The device of claim 6, wherein:
the first clamping portion and the second clamping portion are so shaped that when engaged within detented portions of the opposite outside-facing sides of the rail, the clamp body resists upward movement.

8. The device of claim 6, wherein:
the first clamp body arm and the second clamp body arm are parallel to each other.

9. The device of claim 6, wherein:
the first clamp body arm and the second clamp body arm extend perpendicularly downward from the top.

10. The device of claim 6, wherein:
the first clamping portion and the second clamping portion are positioned equidistant from the top.

11. The device of claim 6, wherein:
the bonding pin is positioned through a lengthwise portion of the bonding block, the lengthwise portion of the bonding block is extended beyond the first clamp body arm and the second clamp body arm.

12. A device for mounting a solar panel, comprising:
a rail that includes a first rail side with a first detent therein and a second rail side with a second detent therein, the first rail side and the second rail side forming opposing outside surfaces of the rail;
a panel clamp that includes a clamp body and a clamping member adjustably attached to the clamp body, the clamping member disposed to clamp a top surface of the solar panel;
the clamp body includes a top, a first clamp body arm with a first clamping portion projecting inward and upward from a first end of the first clamp body arm, and a second clamp body arm with a second clamping portion projecting inward and upward from a second end of the second clamp body arm;
the first clamp body arm and the second clamp body arm extend downward from opposite ends of the top, the first clamp body arm includes a first portion that engages planarly against the first rail side, the second clamp body arm includes a second portion that engages planarly against the second rail side;
a bonding block secured to the clamp body, the bonding block is positioned widthwise between the first clamp body arm and the second clamp body arm and positioned heightwise to seat within a rail slot; and
a bonding pin extending through the bonding block, the bonding pin is positioned bond the solar panel to the rail when the solar panel is secured to the rail by the panel clamp.

13. The device of claim 12, wherein:
the first detent is complementary in shape to the first clamping portion and the second detent is complementary in shape to the second clamping portion.

14. The device of claim 13, wherein:
the first clamping portion and the second clamping portion are positioned equidistant from the top.

15. The device of claim 12, wherein:
the bonding block includes an aperture therethrough; and
the clamp body includes spring clips extending downward between the first clamp body arm and the second clamp body arm and positioned between to receive and secure the bonding block to the clamp body through the aperture.

16. The device of claim 12, wherein:
a lengthwise portion of the bonding block is extended beyond the first clamp body arm and the second clamp body arm.

17. The device of claim 12, wherein:
the bonding pin is positioned through a lengthwise portion of the bonding block that is extended beyond the first clamp body arm and the second clamp body arm.

* * * * *